United States Patent
Itoh et al.

(10) Patent No.: US 8,622,261 B2
(45) Date of Patent: Jan. 7, 2014

(54) MOLTEN METAL SUPPLY CYLINDER, MOLTEN METAL SUPPLY APPARATUS INCORPORATING SUCH A SUPPLY CYLINDER AND MOLTEN METAL SUPPLY METHOD

(75) Inventors: Motoyuki Itoh, Saitama (JP); Kenichi Kubo, Saitama (JP)

(73) Assignee: Hitachi Metals, Ltd., Tokyo (JP)

( * ) Notice: Subject to any disclaimer, the term of this patent is extended or adjusted under 35 U.S.C. 154(b) by 273 days.

(21) Appl. No.: 12/737,727

(22) PCT Filed: Aug. 7, 2009

(86) PCT No.: PCT/JP2009/003797
§ 371 (c)(1),
(2), (4) Date: Apr. 28, 2011

(87) PCT Pub. No.: WO2010/018674
PCT Pub. Date: Feb. 18, 2010

(65) Prior Publication Data
US 2011/0210483 A1   Sep. 1, 2011

(30) Foreign Application Priority Data

Aug. 14, 2008  (JP) .................. 2008-208912
Jan. 20, 2009  (JP) .................. 2009-009414
Jan. 20, 2009  (JP) .................. 2009-009415
Feb. 26, 2009  (JP) .................. 2009-044076
Mar. 31, 2009  (JP) .................. 2009-086725
Apr. 17, 2009  (JP) .................. 2009-100446

(51) Int. Cl.
B22D 37/00  (2006.01)

(52) U.S. Cl.
USPC ........................... 222/590; 222/594

(58) Field of Classification Search
USPC .................. 222/590, 591, 594
See application file for complete search history.

(56) References Cited

U.S. PATENT DOCUMENTS 6,663,923 B2 * 12/2003 Futagami et al. ............... 428/34

FOREIGN PATENT DOCUMENTS

| JP | 59-44670 | 3/1984 |
|---|---|---|
| JP | 63-185230 | 11/1988 |
| JP | 11-170038 | 6/1999 |
| JP | 2001-001136 | 1/2001 |
| JP | 2002-167243 | 6/2002 |
| JP | 2002-167244 | 6/2002 |
| JP | 2002-167245 | 6/2002 |
| JP | 2002-167246 | 6/2002 |
| JP | 2002-255591 | 9/2002 |
| JP | 2004-111607 | 4/2004 |
| JP | 2004-322109 | 11/2004 |
| JP | 2005-331673 | 12/2005 |
| JP | 2006-136946 | 6/2006 |
| JP | 2006-305622 | 11/2006 |
| JP | 2008-098364 | 4/2008 |
| WO | WO 00/58234 | 10/2000 |

* cited by examiner

Primary Examiner — Scott Kastler
(74) Attorney, Agent, or Firm — Paul F. Neils; Edwards Neils PLLC

(57) ABSTRACT

A molten metal supply cylinder for melting a low melting point metallic material in a solid phase and supplying the molten metal material, including a melting section to be directly or indirectly brought into contact with a low melting point metallic material to produce molten metal, and a substantially tubular flow path that has a first opening formed at an end thereof in the melting section and a second opening at the other end thereof and allows the molten metal produced in the melting section to flow. An oxide of the surface layer of the low melting point metallic material is removed by an oxide removing section before the low melting point metallic material is molten in the melting section.

3 Claims, 39 Drawing Sheets (a)　　　　　　　　　　(b)

(a)

(b)

(a)

(b)

(a)

(b)

(a)

(b)

(a)

(b)

(a)

(b)

(c)

(a)

(b)

(a)    (b)

(c)

(a)

(b)

(a)

(b)

(a)

(b)

(a)

(b)

(a)

(b)

(a)

(b)

(a)

(b)　(c)

(d)　(e)

MOLTEN METAL SUPPLY CYLINDER, MOLTEN METAL SUPPLY APPARATUS INCORPORATING SUCH A SUPPLY CYLINDER AND MOLTEN METAL SUPPLY METHOD

CROSS-REFERENCE TO RELATED APPLICATIONS

The present invention is a 35 U.S.C. 371 National Stage Entry of PCT/JP2009/003797, filed Aug. 7, 2009, which claims priority from Japanese Patent Application No. 2008-208912, filed on Aug. 14, 2008; Japanese Patent Application No. 2009-009415, filed on Jan. 20, 2009; Japanese Patent Application No. 2009-009414, filed on Jan. 20, 2009; Japanese Patent Application No. 2009-044076, filed on Feb. 26, 2009; Japanese Patent Application No. 2009-086725, filed on Mar. 31, 2009; and Japanese Patent Application No. 2009-100446, filed on Apr. 17, 2009, the contents of which are all herein incorporated by reference.

TECHNICAL FIELD

The present invention relates to a molten metal supply cylinder for melting a low melting point metallic material such as solder or indium and supplying it to a member made of glass, ceramic or metal, a molten metal supply apparatus incorporating such a supply cylinder and a molten metal supply method.

BACKGROUND ART

FIGS. 51(a) and 51(b) schematically illustrate a glass panel for forming a vacuum container or a multilayer glass panel (so-called double glass). Glass panel W includes a pair of glass substrates w3 and w4 having respective main surfaces S1 and S2 disposed oppositely with gap holding members Q (e.g., glass balls or resin balls) interposed between them so as to produce a gap of dimension g in the direction of the thickness of the panel and a bonding section n bonded to both of the main surfaces S1 and S2 at outer peripheral section (to be referred to outer peripheral gap hereinafter) k of the gap between the glass substrates w3 and w4 to seal the outer peripheral gap k and form an airtight chamber. The bonding section n is conventionally formed by glass frit. However, it has been proposed in recent years to form the bonding section n with a low melting point metal such as indium or solder from the viewpoint of improving the airtightness and the sealing quality including a low outgassing level. While the present invention is described below in terms of a technique of manufacturing a glass panel hereinafter, the following description by no means limits the scope of the present invention.

A glass panel for forming a vacuum container or a multilayer glass panel is manufactured by way of the following steps. (1) Preparing two rectangular glass substrates w3 and w4. (2) Supplying molten metal obtained by melting a low melting point metallic material such as indium or solder to the surface to be bonded of either one of or the both glass substrates along the outer peripheral edge or edges thereof in the form of a frame to form a bonding section. (3) Aligning the glass substrates w3 and w4 so as to make the bonding surfaces thereof exactly face each other. (4) Putting the two glass substrates w3 and w4 together and bonding them by way of the bonding section.

PTL 1 and NPL 1 disclose techniques relating to the above step (2) of supplying molten metal. More specifically, PTL 1 discloses an apparatus for applying a molten metal sealing/bonding material (which corresponds to a low melting point metallic material in this specification) to the surfaces to be bonded of a front substrate and a rear substrate (both are glass substrates) of a vacuum container of an image display apparatus, while applying ultrasonic waves thereto, in order to form a bonding member of the metal sealing/bonding material on the surfaces to be bonded for directly or indirectly bonding the front substrate and the rear substrate. NPL 1 discloses a technique of directly bonding bodies to be bonded having oxidized surfaces such as glass substrates, using a Pb—Sn based solder material containing one or more easily oxidizable elements selected from Zn, Al, Si, Ti and so on as bonding member, considering that such easily oxidizable elements enhance the bonding performance between a Pb—Sn based solder material and a glass substrate, and an ultrasonic soldering technique of removing the air bubbles existing at the contact interface of molten solder and a glass substrate by applying ultrasonic vibrations to improve the bonding performance between solder and a glass substrate.

Application of ultrasonic waves at the time when applying a molten low melting point metallic material ("a molten low melting point metallic material" will be referred to simply as "a molten metal" hereinafter in this specification unless noticed otherwise) provides an advantage of removing the air bubbles and the foreign objects existing at the surface of a glass substrate to improve the bonding performance at the bonding interface of the glass substrate and a bonding member.

Meanwhile, oxidation can proceed quickly to produce an oxide on the surface of a metal material regardless if it is in a solid phase or in a liquid phase. This phenomenon also occurs to a low melting point metallic material stored in the atmosphere in a solid phase. When the material is molten in order to form a bonding section, the oxide produced on the surface gets into the bonding interface of the bonding section and a glass substrate and/or is mixed into the molten metal material. The mixed oxide gives rise to defects at the interface of the glass substrate and the bonding section and also in the inside of the bonding section, which entail a problem of degrading the airtightness of the bonding section, the strength of the interface of the glass substrate and the bonding section and also the strength of the bonding section itself. Particularly, the above problem becomes remarkable when a bonding member is formed by utilizing ultrasonic vibrations as in the case of the techniques according to PTL 1 and NPL 1, because the oxide that is mixed into the molten metal is stirred by ultrasonic vibrations.

Exemplar techniques for dissolving the above problem are described in PTLs 2 and 3. PTL 2 discloses a configuration of disposing a pair of glass plates face to face and one above the other with a gap interposed between them and bonding the glass plates together by supplying a molten metal material that is stored in storage section with its surface held in contact with an inert gas atmosphere from the storage section to the outer peripheral gap to fill the gap for the purpose of providing a method of bonding a metal material and a glass plate, while suppressing generation of any oxide of the metal material and a method of manufacturing a glass panel that can be airtightly sealed on a stable basis by using the method.

PTL 3 discloses a method of manufacturing an image display apparatus that can suppress generation of oxide film on the surface of a metal sealing/bonding material and improve the wettability of metal sealing/bonding material relative to the sealing/bonding surface to make it possible to realize a complete sealing/bonding effect and a sealing/bonding material filling apparatus including a support table for positioning and supporting an object to be sealed/bonded having a sealing/bonding surface, a closed storage section for storing a molten metal sealing/bonding material, a nozzle for filling the sealing/bonding surface with the molten metal sealing/bonding material fed from the storage section and a filling head having a gas supply means for supplying stabilizing gas to the front end surface and its periphery of the nozzle to establish a stable gas atmosphere there.

PTL 4 discloses a different technique relating to the above-described step (2). PTL 4 describes a method of filling molten solder, using a metal supply cylinder having a discharge port for discharging a stored molten metal material (molten solder) and a lead-in plate for injecting molten solder into an outer peripheral gap disposed at a center section of the discharge port from the discharge port, the method including confining the gap formed between the discharge port and the corresponding end facets of a pair of glass plates to not greater than ten times the gap between the glass plates in order to reliably fill the outer peripheral gap with molten solder, suppressing any leak of molten solder if the gap between a pair of glass plates is small. PTL 4 describes that it is possible with the filling method according to the PTL 4 to fill molten solder into the outer peripheral gap, while suppressing the spread of molten solder to an unintended area if the gap of the glass plates is small.

Furthermore, PTL 5 discloses a still different technique relating to the above-described step (2). PTL 5 describes a method of manufacturing a glass panel including arranging spacers between a pair of glass plates to form a gap between the glass plates, filling a single molten metal material into a peripheral section of the gap to directly bond the pair of glass plates and the metal material and airtightly sealing the gap, wherein at least a part of a plate-shaped or rod-shaped guide for guiding the molten material is inserted into an outer peripheral gap in order to supply the molten metal material to the outer peripheral gap of the pair of glass plates.

PTL 5 also describes that, since a metal material injecting operation that is difficult particularly when the outer peripheral gap is narrow is accelerated and made easy by the guide and additionally the injecting speed is raised, the metal material and the glass substrates can be bonded directly with ease. PTL 5 further describes that a molten metal material can reliably be filled into an outer peripheral gap by appropriately selecting the size and the shape of the guide according to the outer peripheral gap.

Furthermore, PTL 5 describes a method of manufacturing a glass panel from a pair of glass plates having different sizes, the edges of one of the glass plates projecting beyond the corresponding respective edges of the other glass plates, wherein molten solder is made to permeate from the projection sections of the one of the glass plates toward the outer peripheral gap by means of a capillary phenomenon to fill the molten solder into the outer peripheral gap. PTL 5 also describes that such a capillary phenomenon can be produced by applying vibrations to at least either the molten solder or the glass plates to improve the wettability of the molten solder relative to the glass plates.

Additionally, a specific solder supply apparatus is described in Example 14 of PTL 5. The solder supply apparatus feeds molten solder by means of the self weight of the latter from a solder melting tank into an outer peripheral gap of a pair of glass plates disposed to form a gap of 0.2 mm between the main surfaces thereof to be bonded to a metal material by way of a pipe having an inner diameter of 3 mm, inserting a 0.15 mm-thick metal-made and plate-shaped guide fitted to the front end of the pipe into the outer peripheral gap by about 5 mm and filling molten solder into the outer peripheral gap along the outer peripheral edge of the glass plate. The width of the outer peripheral gap sealed by molten solder by means of the solder supply apparatus is about 5 mm from the outer peripheral edge and no problem is observed as a result of a leak test, a measurement of the heat transmission coefficient, a migration test of lead and a measurement of the oxygen content.

CITATION LIST

Patent Literatures

PTL 1: Jpn. Pat. Appln. Laid-Open Publication No. 2002-184313
PTL 2: Jpn. Pat. Appln. Laid-Open Publication No. 2002-255591
PTL 3: Jpn. Pat. Appln. Laid-Open Publication No. 2005-331673
PTL 4: Jpn. Pat. Appln. Laid-Open Publication No. 2002-167245
PTL 5: WO00/58234 Publication Non-Patent Literature NPL 1: Nikkei Electronics, Oct. 18, 1976, pp. 92-113

DISCLOSURE OF THE INVENTION

Problems to be Solved by the Invention

[Problem No. 1]

Both of the techniques described in the above-cited PTLs 2 and 3 relate to handling molten metal in a non-oxidizing atmosphere and provide an advantageous effect in that they can suppress the generation of oxide in a process of melting a low melting point metallic material and a process of supplying molten metal and thereby suppress generation of defects attributable to the oxide generated in those processes. However, the oxide that already exists on the surface of a low melting point metallic material in a solid phase cannot be removed completely by handling the molten metal material in a non-oxidizing atmosphere by means of either of the techniques of PTLs 2 and 3 and is mixed into the molten metal material. In short, these techniques cannot completely overcome the problem of PTL 1 and NPL 1. Additionally, when a bonding material containing one or more easily oxidizable elements is directly bonded to a body to be bonded having an oxidized surface as disclosed in NPL 1, oxygen is required to exist to a predetermined extent between the oxidized surface and the bonding material in order to secure the bonding performance between them. On the other hand, the oxygen promotes oxidation of the molten bonding material to consequently generate oxide film between the bonding material and the body to be bonded to degrade the bonding performance. The techniques of PTLs 2 and 3 cannot solve this trade-off problem because, according to them, various operations need to be conducted in a non-oxidizing atmosphere.

Therefore, the first object of the present invention is to provide a molten metal supply cylinder having a simple configuration when compared with the configurations of the prior art and being able to suppress the mixing of oxide into molten metal when melting a low melting point metallic material in a solid phase and supplying the molten metal material, and a molten metal supply apparatus and a molten metal supply method for supplying molten metal by suppressing intermingling of oxide by means of such a supply cylinder.

[Problem No. 2]

In view of the known techniques described in the above-cited PTLs 4 and 5, the second object of the present invention is to provide a molten metal supply cylinder that is improved relative to the prior art in terms of supplying molten metal to an outer peripheral gap between a pair of plate-shaped bodies that are objects to be bonded having respective main surfaces disposed with a gap between them, a molten metal supply apparatus incorporating such a supply cylinder and a molten metal supply method.

[Problem No. 3]

When forming a bonding section by filling molten solder into an outer peripheral gap between a pair of glass plates, the molten solder discharge port needs to be separated from the corresponding end facets of the glass plates for a certain distance as pointed out in PTL 4. In such a case, molten solder is filled in a state where the gap formed between the discharge port and the end facets of the glass plates is also filled. Then, molten solder leaks out from the gap to produce a state where molten solder is not only filled into an outer peripheral gap of glass plates w3 and w4 but also molten solder n1 is made to adhere to the end facts of the glass plates w3 and w4 as shown in FIG. 51(b). As the quantity of molten solder that leaks out from the gap produced between the discharge port and the end facets of the glass plates increases, the molten solder n1 adhering to the end facets rises high and can eventually flow down along the end facet of the glass plate w4 in an extreme instance. Such a glass panel is not only favorable in terms of appearance but also detrimental to installation thereof. Additionally, if the molten solder that leaks out drops onto the mounting surface of a member on which the glass plates are to be mounted, there arise a quality problem that the molten solder contaminates the surface of the glass plate w4 that is required to be clean and an industrial production problem that the positioning accuracy of the glass plate w4 is degraded in the vertical direction when the glass plate w4 is mounted on the member receiving the glass plate.

While these problems can be dissolved by providing a properly dimensioned gap between the molten solder discharge port and the end facets of the glass plates or selecting an appropriate molten solder supplying rate, it is very difficult and costly to determine proper conditions for glass panels of various shapes and dimensions from the viewpoint of industrial production.

Therefore, the third object of the present invention is to provide a molten metal supply cylinder that hardly allows molten metal to adhere to the corresponding end facets of a pair of plate-shaped bodies that are objects to be bonded having respective main surfaces disposed with a gap between them when supplying molten metal to an outer peripheral gap between the plate-shaped bodies, a molten metal supply apparatus incorporating such a supply cylinder and a molten metal supply method.

[Problem No. 4]

In addition to the above problem No. 3, if a method of injecting molten solder into an outer peripheral gap of a pair of glass plates by utilizing a capillary phenomenon as described in PTL 5 is employed, when the pair of glass plates have different dimensions and the edges of one of the glass plates project beyond the corresponding respective edges of the other glass plate as shown in FIG. 51(d), molten solder n2 leaks out to cover most of the projecting part of the glass plate w4 as shown in FIG. 51(d), although the molten solder may hardly flow down along the end facet of the glass plate w4. Additionally, there arises a problem that the width of the bonding section n is not stable and can vary between 2.5 and 4 mm as described in Example 1 of PTL 5.

Thus, the fourth object of the present invention is to provide a molten metal supply cylinder that hardly allows molten metal to adhere to the corresponding end facets of a pair of plate-shaped bodies that are objects to be bonded having respective main surfaces disposed with a gap between them when supplying molten metal to an outer peripheral gap between the plate-shaped bodies, a molten metal supply apparatus incorporating such a supply cylinder and a molten metal supply method. More particularly, the fourth object is to provide a molten metal supply cylinder that, when the pair of plate-shaped bodies have different dimensions and the edges of one of the plate-shaped bodies project beyond the corresponding respective edges of the other plate-shaped bodies, hardly allows molten metal to leak out and can stably supplying molten solder into the outer peripheral gap with a constant width, a molten metal supply apparatus incorporating such a supply cylinder and a molten metal supply method.

[Problem No. 5]

When inserting a guide as described in PTL 5 into an outer peripheral gap and filling a molten metal material there, the molten metal material flows in the gap formed between the guide and the glass substrates before the molten metal material is filled into the outer peripheral gap. The flow resistance increases as the gap between the guide and the glass substrates decreases. Then, the molten solder flowing through the gap can hardly get to the front end of the guide. Additionally, since the guide moves in a direction orthogonal relative to the direction in which the molten metal material is supplied, the rate at which molten solder flows through the gap between the guide and the glass substrates falls toward the front end of the guide. As a result of these, it is difficult to stably supply the molten metal material into the outer peripheral gap with a constant width when the outer peripheral gap is made narrow. The inventor of the present invention found that, when the gap between the guide and the glass substrates is narrowed to such an extent that, when the guide is moved, molten solder moves to follow the guide, the bonding strength of the bonding section and the glass plates is increased and specifically the gap that can increase the bonding strength is about between 0.01 and 0.005 mm. However, when the gap between the guide of PTL 5 and the glass substrates is made to be about between 0.01 and 0.005 mm, there arises a problem that molten solder gets to the front end of the guide by only a small quantity and the width thereof is not stable. Additionally, there also arises a problem that a defect of line-shaped or dot-shaped voids appears along the bonding interfaces of the glass substrates and the bonding section due to an insufficient supply of molten solder to consequently reduce the bonding strength.

Thus, the fifth object of the present invention is to provide a molten metal supply cylinder that can stably supplying molten metal with a constant width into an outer peripheral gap of a pair of plate-shaped bodies that are objects to be bonded having respective main surfaces disposed with a gap between them when supplying molten metal into the outer peripheral gap, a molten metal supply apparatus incorporating such a supply cylinder and a molten metal supply method.

Means for Solving the Problems (1) A molten metal supply cylinder according to the present invention that achieves the above first object is for melting a low melting point metallic material in a solid phase and supply the molten metal material and characterized by including a melting section to be directly or indirectly brought into contact with a low melting point metallic material to produce molten metal and a substantially tubular flow path that has a first opening formed at an end thereof in the melting section and a second opening at the other end thereof and allows the molten metal produced in the melting section to flow, wherein the oxide on the surface of the low melting point metallic material is removed by an oxide removing section before/ when the low melting point metallic material is molten in the melting section.

The supply cylinder as defined in (1) above operates in a manner as described below. Namely, a low melting point metallic material in a solid phase is molten to produce molten metal as the low melting point metallic material is brought into contact with the melting section and the molten metal flows into the flow path through the first opening and the molten metal flows through the flow path before it flows out from the second opening. Since the flow path is closed except the first opening and the second opening, molten metal is not brought into contact with the atmosphere when the molten metal is being supplied so that generating of oxide is suppressed and mixing of oxide into molten metal is avoided. Additionally, since any oxide in the surface layer of the low melting point metallic material is removed by the oxide removing section before the low melting point metallic material is molten in the melting section, the oxide adhering to the surface of the low melting point metallic material is prevented from entering the flow path. As far as this specification is concerned, "a low melting point metal" refers to a metal that melts at a relatively low temperature generally not higher than 400° C. such as Sn, In, Zn, Ga or the like.

(2) Preferably, in the supply cylinder according to (1) above, the oxide removing section and the melting section are arranged close to each other in order to prevent an oxide from being produced on the surface of the low melting point metallic material from which the oxide has been removed. Preferably, the oxide removing section and the melting section are arranged integrally so as to remove the oxide on the surface of the low melting point metallic material when the low melting point metallic material melts.

(3) Preferably, in the supply cylinder according to (2) above, the first opening is open to the oxide removing section and the area of the first opening is less than the area by which the low melting point metallic material contacts the melting section. As the area of the first opening is less than the area by which the low melting point metallic material contacts the melting section so that the low melting point metallic material contacts the melting section so as to close the first opening, the oxide adhering to the surface of the low melting point metallic material is removed at an outer peripheral section of the first opening and the oxide entering the flow path is blocked.

(4) Preferably, in the supply cylinder according to (2) or (3) above, an oxide capturing section is arranged around the first opening so as to capture the oxide and not to allow the oxide to move in order to prevent the oxide that has been blocked from entering the flow path from moving and entering the flow path once again.

(5) Preferably, in the supply cylinder according to (2) or (3) above further includes an oxide discharging section that discharges oxide from around the first opening in order to prevent the oxide blocked from entering the flow path from accumulating in an unopened area around the first opening and entering the flow path once again.

(6) Preferably, in the supply cylinder according to (1) above, the oxide removing section is provided as a separate body so as to remove the oxide on the surface of the low melting point metallic material before the low melting point metallic material melts.

(7) In the supply cylinder according to (6) above, the oxide removing section may include an edge section that removes the surface layer of the low melting point metallic material, (8) a plasma irradiation means or (9) a shot blasting means.

(10) Preferably, in the supply cylinder according to (1) above, the surface of the flow path is subjected to a process for improving the wettability thereof relative to molten metal in order to stably and smoothly supplying molten metal. The process may be a metal layer forming process of Cr, Al, Mo, W, V, Nb, Ta, Ti or the like, using a plating technique or a CVD or PVD or some other sputtering technique when using solder as a low melting point metal.

(11) Preferably, in the supply cylinder according to (1) above, the surface of the flow path is subjected to an anti-corrosion treatment relative to molten metal in order to prevent contamination by molten metal so that the surface of the flow path may not be corroded by flowing molten metal and no impurity may be mixed into molten solder M1. When the supply cylinder is made of steel or a similar material, a technique of nitriding the surface of the flow path or a technique of coating the surface of the flow path with ceramic such as TiN may be employed.

(12) Preferably, in the supply cylinder according to (1) above further includes a guide section that guides the molten metal produced from the melting section and discharged from the second opening so as to stably supply the molten metal flowing out from the second opening to a work.

Such a guide section is preferably fitted to the second opening of the supply cylinder from which molten metal flows out from the viewpoint of reliably supplying a desired quantity of molten metal to the outer peripheral gap and stabilizing the width of the supplied molten metal. Furthermore, as will be described in detail below by way of best modes of carrying out the invention, any oxide is prevented from being mixed into the molten metal that is being supplied from the second opening to the outer peripheral gap in certain cases.

(13) Preferably, in the supply cylinder according to (12) above, the guide section is substantially flat plate-shaped when molten metal is to be supplied to the surface of a plate-shaped member and/or the gap between a pair of plate-shaped members.

(14) Preferably, in the supply cylinder according to (12) above, the guide section is substantially pillar-shaped or substantially cylinder-shaped when molten metal is supplied into a void formed in a work.

(15) Preferably, in the supply cylinder according to any of (12) through (14) above, the guide section has a tapered profile in order to smoothly guide molten metal and supply the molten metal to a work without interruption.

(16) Preferably, in the supply cylinder according to any of (12) through (14) above, guide grooves are formed in the guide section for molten metal in order to smoothly guide molten metal and supply the molten metal to a work without interruption.

(17) Preferably, in the supply cylinder according to any of (12) through (14) above, a contact surface is formed on the guide section so as to contact the surface to which molten metal is to be supplied in order to remove the air bubbles and the foreign object existing on the surface of a work, activate the surface of the work and improve the wettablity of the molten metal relative to the surface of the work.

(18) Preferably, in the supply cylinder according to (12) above for supplying molten metal to an outer peripheral gap of a pair of plate-shaped bodies having respective main surfaces disposed with a gap between them, the guide section includes a trowel section that has a first plane surface for facing the main surface of one of the plate-shaped bodies with a first gap interposed between them and a second plane surface for facing the main surface of the other plate-shaped body with a second gap interposed between them and is able to be inserted into an outer peripheral gap of the pair of plate-shaped bodies, a first contact section that projects from the first plane surface of the trowel section so as to be contactable to the main surface of one of the plate-shaped bodies and/or a second contact section that projects from the second plane surface of the trowel section so as to be contactable to the main surface of the other plate-shaped body for the purpose of achieving the above second object.

With the supply cylinder according to (18) above, the molten metal supplied to an outer peripheral gap of a pair of plate-shaped bodies is supplied there by the trowel section of the guide section that is inserted into the outer peripheral gap and moved along the corresponding outer peripheral edges of the pair of plate-shaped bodies. In this operation of supplying molten metal, the molten metal injected into the first gap and the second gap respectively formed between the main surfaces of the plate-shaped bodies and the first plane surface and the second plan surface of the trowel section is pressed by the trowel section against and applied to the main surfaces of the plate-shaped bodies as the trowel section is moved along the outer peripheral edges of the plate-shaped bodies. The molten metal is provided with fluidity by the applying operation and accelerates activation of the main surfaces to improve the wettablity of the main surfaces relative to molten metal and, at the same time, remove the air bubbles and the foreign objects existing at the contact interferences of the molten metal and the main surfaces to consequently improve the quality of bonding of the plate-shaped bodies to be bonded and the bonding section.

Additionally, the first contact section is so formed in the guide section as to project from the first plane surface of the trowel section and be contactable to the main surface of one of the plate-shaped bodies, whereas the second contact section is so formed in the guide section as to project from the second plane surface of the trowel section and be contactable to the main surface of the other plate-shaped body. Because of this arrangement, if the trowel section is moved relatively in the direction of the thickness of the outer peripheral gap due to a problem of operation accuracy, for example, of the mechanism for positioning the pair of plate-shaped bodies or of the mechanism for moving the guide section, the trowel section is prevented from directly contacting the main surfaces because the contact sections respectively contact the main surfaces to consequently protect the main surfaces against damage and improve the quality of bonding of the plate-shaped bodies and the bonding section. The guide section may be provided only with the first contact section or the second contact section or with both of the contact sections depending on the required level of operation accuracy of the peripheral equipment for driving the guide section and/or that of dimensional accuracy of the outer peripheral gap produced when the plate-shaped bodies are combined.

Preferably, in the supply cylinder according to (18) above, the guide grooves as defined in (16) above are formed at the contact sections. The reason for this will be described below. For supplying molten metal to an outer peripheral gap, for example, molten metal may be supplied to the outer peripheral gap in front of the guide section in the sense of the moving direction of the guide section moving along the corresponding outer peripheral edges of the pair of plate-shaped bodies and subsequently the moving trowel section may be immersed in the supplied molten solder. However, with this arrangement, molten metal flows into the outer peripheral gap before the trowel section is immersed and then it is difficult to supply molten metal with a constant width due to fluctuations of the pressure of the molten metal being supplied and/or unevenness of the wettability of molten metal relative to the plate-shaped bodies to give rise to a risk of making the width of the bonding section uneven when the bonding section is formed. Additionally, there can be occasions where molten solder cannot be supplied sufficiently when the outer peripheral gap becomes narrow. On the other hand, in the above-described preferable mode of carrying out the invention, molten metal flows directly and smoothly to the trowel section by way of the guide grooves formed in the contact sections and the width of the area wetted with molten metal is restricted to the range of the trowel section because the trowel section is wetted with molten metal so that molten metal is supplied with a constant width to make it possible to provide the bonding section with a uniform width. Additionally, as will be described in detail hereinafter, the oxide produced on the surface of the molten metal supplied to the outer peripheral gap is prevented from being rolled in to provide an effect of improving the quality of bonding of the bonding section and the plate-shaped bodies in certain cases.

(19) Preferably, in the supply cylinder according to (18) above, the first contact section contacts the main surface of one of the plate-shaped bodies and the second contact section contacts the main surface of the other plate-shaped body when the guide section is inserted into the outer peripheral gap. With this preferable arrangement, the first contact section and the second contact section constantly contact the respective main surfaces of the pair of plate-shaped bodies so that the guide section is held in a state of being inserted into the outer peripheral gap by the first contact section and the second contact section. Then, the quantity of the first gap between the first plane surface of the trowel section and the main surface of one of the plate-shaped bodies is restricted by the quantity by which the first contact section projects, while the quantity of the second gap between the second plane surface of the trowel section and the main surface of the other plate-shaped body is restricted by the quantity by which the second contact section projects. Thus, the quantity of the first gap and that of the second gap respectively between the main surfaces of the plate-shaped bodies and the trowel section are always held to a constant value during the above-described supply operation so that molten metal is applied to the main surfaces always under a same condition to uniformize the bonding strength of the bonding section and the plate-shaped bodies and improve the quality of bonding.

(20) Preferably, in the supply cylinder according to (18) above, the contact surfaces of the contact sections for contacting the main surfaces of plate-shaped bodies are subjected to a process for raising the slidability of the contact sections relative to plate-shaped bodies in order to prevent the plate-shaped bodies from being damaged by a sliding motion that takes place between the plate-shaped bodies and the contact sections as the guide section is driven to move and make the contact sections slide smoothly.

(21) For the same purpose, preferably the contact sections are provided with respective recesses extending in the direction in which the guide section is inserted into the outer peripheral gap to reduce the contact area between the contact sections and the plate-shaped bodies.

(22) Preferably, in the supply cylinder according to (18) above, the contact sections are arranged at the rear end side of the guide section as viewed in the direction of inserting the guide section into the outer peripheral gap when a wiring pattern or the like is formed at an inner peripheral section of the bonding section formed on the main surfaces of the plate-shaped bodies in order to prevent the wiring pattern from being damaged as a result of contacting the contact sections.

(23) Preferably, the contact sections are arranged at the front end side of the guide section as viewed in the direction of inserting the guide section into the outer peripheral gap when a wiring pattern or the like is formed at an outer peripheral section of the bonding section formed on the main surfaces of the plate-shaped bodies. As will be described in detail hereinafter, in certain cases, the width of the bonding section can be highly precisely restricted by restricting the flowing move of the molten metal by the contact sections arranged at the front end side.

(24) Preferably, in the supply cylinder according to (18) above, the contact sections have elasticity of being capable of flexibly bending in the direction of the thickness of the outer peripheral gap.

This preferable mode of carrying out the invention provides an advantageous effect as described below. Namely, the plate-shaped bodies may be brought into a condition where they contact with the guide section in the above-described filling operation because the moving path of the guide section and the outer peripheral gap are poorly parallel relative to each other particularly, for example, when a sufficient degree of assembling accuracy is not secured and the outer peripheral gap of the plate-shaped bodies is bent or when the outer peripheral gap is formed linearly but a sufficient degree of accuracy of motion is not secured for the mechanism for driving the plate-shaped bodies and consequently the guide section shifts its position aside in the direction of the thickness of the outer peripheral gap as it moves so as to loose its relative parallelism of motion. However, with the above-described arrangement, the plate-shaped bodies firstly and respectively contact the first contact section and the second contact section to press the first and second contact sections in the direction of the thickness of the outer peripheral gap with force of a predetermined magnitude. Since the pressed first and second contact sections are flexibly bent due to their elasticity, the guide section moves vertically, accommodating the positional fluctuations of the outer peripheral gap in the direction of the thickness thereof. Then, as a result, the trowel section and the plate-shaped bodies are prevented from contacting each other in a condition as described above and molten metal can be reliably filled into the outer peripheral gap.

(25) Preferably, in the supply cylinder according to (12) above for supplying molten metal to an outer peripheral gap of a pair of plate-shaped bodies having respective main surfaces disposed with a gap between them, the guide section is fitted so as to cross the second opening and divide the second opening into an upper discharge port and a lower discharge port by the guide section and the quantity of molten metal discharged from the lower discharge port is smaller than the quantity of molten metal discharged from the upper discharge port for the purpose of achieving the above third object. With this arrangement, of the molten metal discharged from the discharge ports, the quantity of molten metal held in a downwardly released state can be reduced to make it possible to prevent molten metal from rising up or sinking down at the corresponding end facets of the plate-shaped bodies.

(26) Preferably, in the supply cylinder according to (25) above, the area of the lower discharge port is smaller than that of the upper discharge port.

(27) Preferably, in the supply cylinder according to (25) above, the guide section is inserted from the second opening into the flow path by a predetermined depth and the flow path is divided into an upper flow path and a lower flow path by the guide section in such a way that the volume of the lower flow path is smaller than the volume of the upper flow path.

(28) Preferably, in the supply cylinder according to (25) above, the guide section is inserted into the flow path in a state of being downwardly offset from the center of the second opening.

(29) Preferably, in the supply cylinder according to (25) above, the guide section is inserted into the flow path, crossing the second opening at or near the center thereof, and a barrier plate is fitted to the discharge port forming plane of the flow path located below the guide section in order to make the area of the lower discharge port smaller than the area of the upper discharge port.

(30) Preferably, in the supply cylinder according to (25) above, the guide section is inserted into the flow path, crossing the second opening at or near the center thereof, and a barrier member is formed in the lower flow path of the flow path in order to make the volume of the lower flow path smaller than the volume of the upper flow path.

(31) Preferably, in the supply cylinder according to (12) above for supplying molten metal to an outer peripheral gap of a pair of plate-shaped bodies having respective main surfaces disposed with a gap between them, the guide section is fitted at a lower section of the second opening or at a position lower than the second opening so as to allow the molten metal discharged from the second opening to flow out from the top surface of the guide section for the purpose of achieving the above fourth object. Thus, the molten metal discharged from the second opening is made to flow only from the top surface of the guide section and not along the bottom surface thereof. Then, if the pair of plate-shaped bodies is arranged in such a way that the lower one of them projects from the upper one to produce a projecting part, molten metal scarcely leaks and adheres to the projecting part. If the pair of plate-shaped bodies is arranged in such a way that the edges thereof are located side by side, the quantity of molten metal held in a downwardly released state is small so that it is possible to prevent molten metal from rising up or sinking down at the corresponding end facets of the plate-shaped bodies.

(32) Preferably, in the supply cylinder according to (31) above, a through path section that leads molten metal from the top surface toward the bottom surface side is formed at a front end section of the guide section.

(33) Preferably, in the supply cylinder according to (31) above, the guide section has a slope section extending from the front end section and the front end section and the slope section form an obtuse angle or a right angle to show a bent profile.

(34) Preferably, in the supply cylinder according to (31) above, the guide section has a slope section extending from the front end section and a base end section extending from the slope section and the front end section and the base end section are parallel relative to each other or form an obtuse angle so that the guide section is bent twice to show a stepped profile.

(35) Preferably, in the supply cylinder according to (31) above further includes a cut out surface produced by axially cutting out a lower section thereof including the flow path from the side of the second opening by a predetermined length, wherein the guide section is fitted with its top surface held in contact with the cut out surface, and when the cut out flow path is exposed to the bottom surface side of the guide section, a member is fitted to seal the gap there.

(36) Preferably, the supply cylinder according to (31) above further includes a plane surface section which does not expose the flow path, at a lower section thereof within an axial range of a predetermined length from the second opening, wherein the guide section is fitted with its top surface held in contact with the plane surface section.

(37) Preferably, in the supply cylinder according to (31) above, the pair of plate-shaped bodies are arranged one above the other in such a way that the edges of the lower plate-shaped body project beyond the corresponding respective edges of the upper plate-shaped body.

(38) Preferably, in the supply cylinder according to (12) above for supplying molten metal to an outer peripheral gap of a pair of plate-shaped bodies having respective main surfaces disposed with a gap between them, a cut out section is formed at the front end section of the guide section at the side facing the moving direction of the guide section in order to achieve the above fifth object.

With the above-described configuration, molten metal can partly be made to flow from the main surface of the guide section to a lateral surface of the cut out section and then further to the front end of the guide section along the lateral surface. Then, the molten metal flowing along the lateral surface gets to the front end of the guide section so as to flow further along the front end of the guide section to make it possible to stably obtain a bonding section with a predetermined width because the molten metal is positionally restricted by the front edge of the guide section and longitudinally limited by the length of the guide section. Additionally, the quantity of molten metal at the front end side of the guide section increases to improve the bonding strength between the bonding section and the plate-shaped bodies.

(39) Preferably, in the supply cylinder according to (38) above, the cut out section has an oblique facet facing rearward relative to the moving direction of the guide section.

(40) Preferably, in the supply cylinder according to (38) above, the cut out section has an oblique facet facing rearward relative to the moving direction of the guide section and a facet that is smoothly linked to the oblique facet and substantially extends in parallel with the moving direction of the guide section.

(41) Preferably, in the supply cylinder according to (38) above, the cut out section has an oblique facet facing rearward relative to the moving direction of the guide section and a facet that is smoothly linked to the oblique facet and substantially orthogonally intersects the moving direction of the guide section.

(42) Preferably, in the supply cylinder according to (38) above, the cut out section is formed by straight lines, a curved line or a combination thereof.

(43) Preferably, in the supply cylinder according to (12) to (42) above, the surface of the guide section that contacts molten metal is subjected to a process for enhancing its wettability relative to molten metal.

(44) A molten metal supply apparatus according to the present invention for achieving the above-described first object is characterized by including a molten metal supply cylinder according to any of (1) through (43) above.

(45) Preferably, in the supply apparatus according to (44) above, the supply cylinder is indirectly or directly supported by a floating mechanism. In this preferable mode of carrying out the invention, the floating mechanism can accommodate the variation of shape of the work to which molten metal is applied and the variation of attitude of the supply cylinder to make it possible to stably apply molten metal to the work.

(46) A molten metal supply apparatus according to the present invention and incorporating a molten metal supply cylinder according to any of (1) to (11) to achieve the above-described first object is characterized by including a plate-shaped body arranging means for arranging a pair of plate-shaped bodies in a state of producing a predetermined gap between them and a supply cylinder positioning means for positioning the supply cylinder in a state where the second opening and the gap are substantially connected to each other.

The supply apparatus in this mode of carrying out the invention operates in a manner as described below in terms of a case where the pair of plate-shaped bodies is a pair of rectangular glass substrates. Firstly, two glass substrates are arranged in a state where a predetermined gap is formed between them by the plate-shaped body arranging means. Next, the supply cylinder is positioned in such a way that the second opening and the gap are substantially connected to each other by the supply cylinder positioning means. Then, molten metal is supplied into the gap of the two glass substrates by way of the second opening of the supply cylinder. Since the second opening of the supply cylinder is arranged so as to be substantially connected to the gap of the two glass substrates, the molten metal that is supplied by way of the second opening is filled into the gap without touching the atmosphere so that the oxidation of the molten metal that takes place in the course of being supplied is suppressed. "A state where the second opening and the gap are substantially connected to each other" as described above means that not only a state where the second opening and the gap is closely connected to each other but also a state where a void gap is produced between the second opening and the corresponding end facets (that are perpendicular to the gap) of the two glass substrates and the second opening and the gap are not closely connected to each other but the molten metal flown out from the second opening does not leak out from the void gap are included within the scope of the present invention.

(47) A molten metal supply apparatus according to the present invention and incorporating a molten metal supply cylinder according to any of (12) through (43) above to achieve any of the above-described second through fifth objects is characterized by including a plate-shaped body arranging means for arranging a pair of plate-shaped bodies in a state of producing a predetermined gap between them and a supply cylinder positioning means for inserting the guide section into the gap formed between the pair of plate-shaped bodies. The supply apparatus as defined above can smoothly supply molten metal into the gap between the plate-shaped bodies by way of the guide section.

(48) Preferably, in the supply apparatus according to (46) or (47) above, the second opening has a diameter exceeding the thickness of the outer peripheral gap. The supply apparatus in this mode of carrying out the invention operates in a manner as described below in terms of a case where the pair of plate-shaped bodies is a pair of glass substrates. The molten metal supplied by way of the second opening is not only supplied to the gap between the glass substrates but also to areas other than the gap, or the end facts (that are perpendicular to the gap) of the two glass substrates that are included in the second opening. Therefore, an excess material section of molten metal is formed outside the molten metal supplied to the gap to serve as a barrier and consequently to provide an effect of suppressing the progress of oxidation that otherwise takes place as the supplied molten metal contacts the atmosphere. Additionally, with this arrangement, molten metal can be made to adhere to the outer peripheral end facets of the pair of plate-shaped bodies to form a bonding section having a sealing effect of consequently covering the outer peripheral end facets. Hence, this arrangement is suitable when the bonding section is required to show an anti-leak effect.

(49) Preferably, in the supply apparatus according to (46) or (47), the second opening has a diameter not greater than the thickness of the outer peripheral gap when it is not desirable to form a sealing section at the outer peripheral end facets from the viewpoint of installation of the glass panel and appearance.

(50) Preferably, in the supply apparatus according to (46) or (47), the guide section is indirectly or directly supported by a floating mechanism from the viewpoint similar to the one as described above for the floating mechanism of the supply apparatus according to (45) above.

(51) Preferably, in the supply apparatus according to (50) above, the floating mechanism is so arranged as to constrain the guide section in terms of movement in a plane parallel to the gap formed between the pair of plate-shaped bodies.

With the supply apparatus in this desirable mode of carrying out the invention, the guide section is supported by a floating mechanism that constrains the guide section in terms of movement in a plane parallel to the gap formed between the pair of plate-shaped bodies. In other words, the guide section can move in the direction of the thickness of the outer peripheral gap and around the insertion axis of the guide section. Then, as a result, if the position of the outer peripheral gap of the plate-shaped bodies is shifted, the guide section is made to move vertically in the direction of the thickness of the outer peripheral gap to follow the shift by the floating mechanism so as to maintain the gaps formed between the main surfaces of the plate-shaped bodies and the trowel section so that molten metal is stably filled into the outer peripheral gap.

(52) Preferably, the supply apparatus according to (46) or (47) further includes an ultrasonic wave application means for applying ultrasonic waves to the interface of the molten metal and the plate-shaped bodies because it is desirable that the air bubbles and the foreign objects existing at the interface of the molten metal and the plate-shaped bodies are removed in order to improve wettability of the molten metal supplied to the gap by way of the guide section relative to the plate-shaped bodies and thereby improve the bonding reliability.

(53) A molten metal supply method according to the present invention that achieves the above first object is a method of supplying molten metal by means of a molten metal supply cylinder according to any of (1) through (11) above, characterized by including a plate-shaped body arranging step of arranging a pair of plate-shaped bodies in a state of producing a predetermined gap between them, a supply cylinder positioning step of positioning the supply cylinder in a state where the second opening and the gap are substantially connected to each other and a molten metal supply step of supplying molten metal to the gap by way of the second opening.

The supply method in this mode of carrying out the invention operates in a manner as described below in terms of a case where the pair of plate-shaped bodies is a pair of glass substrates. Firstly, two glass substrates are arranged in a state where a predetermined gap is formed between them in the plate-shaped body arranging step. Next, the supply cylinder is positioned in such a way that the second opening and the gap are substantially connected to each other in the supply cylinder positioning step. Then, molten metal is supplied into the gap of the two glass substrates by way of the second opening of the supply cylinder in the molten metal supply step. Since the second opening of the supply cylinder is arranged so as to be substantially connected to the gap of the two glass substrates, the molten metal that is supplied by way of the second opening is filled into the gap without touching the atmosphere so that the oxidation of the molten metal that takes place in the course of being supplied is suppressed.

(54) A molten metal supply method according to the present invention that achieves any of the above second through fifth objects is a method of supplying molten metal by means of a molten metal supply cylinder according to any of (12) through (43) above, characterized by including a plate-shaped body arranging step of arranging a pair of plate-shaped bodies in a state of producing a predetermined gap between them, a supply cylinder positioning step of inserting the guide section into the gap formed between the pair of plate-shaped bodies and a molten metal supply step of supplying molten metal into the gap by way of the second opening. This supply method can smoothly supply molten metal into the gap between the plate-shaped bodies by way of the guide section.

(55) Preferably, in the supply method according to (53) or (54) above, ultrasonic waves are applied to the interface of the molten metal and the plate-shaped bodies because it is desirable that the air bubbles and the foreign objects existing at the interface of the molten metal and the plate-shaped bodies are removed in order to improve wettability of the molten metal supplied to the gap by way of the guide section relative to the plate-shaped bodies and thereby improve the bonding reliability.

Advantages of the Invention

As described above, the problems to be solved by the present invention can be solved by means of a molten metal supply cylinder, a molten metal supply apparatus incorporating such a supply cylinder and a molten metal supply method according to the present invention.

BEST MODES OF CARRYING OUT THE INVENTION

Now, the present invention will be described in greater detail by referring to the accompanying drawings that illustrate preferred embodiments of the invention. Note that the embodiment will be described below in terms of a case where a glass panel is manufactured by supplying molten solder of an Sn Ag Al based alloy that is a low melting point metallic material into an outer peripheral gap of a pair of glass substrates that are plate-shaped bodies and subsequently bonding the pair of glass substrates as objects to be bonded. However, the present invention can provide similar advantages and effects when the glass substrates are replaced by metal substrates or ceramic substrates. Additionally, the present invention can provide similar advantages and effects when solder of any of various compositions containing Sn, Zn, Ti and/or In based alloy or the like as low melting point metal is used. The present invention is by no means limited to these embodiments, which can be modified in different ways within the spirit and scope of the present invention.

[First Mode of Carrying Out the Invention]

Firstly, preferable modes of carrying out the invention for a molten metal supply cylinder as described above in (1) above, a molten metal supply apparatus incorporating such a supply cylinder and a molten metal supply method will be described below by way of Example No. 1-1, Example No. 1-2 and Example No. 1-3.

Example No. 1-1

A molten metal supply cylinder and a molten metal supply apparatus incorporating such a supply cylinder will be described below as Example No. 1-1 by referring to FIGS. 1 to 8 and 50.

Figure 50:
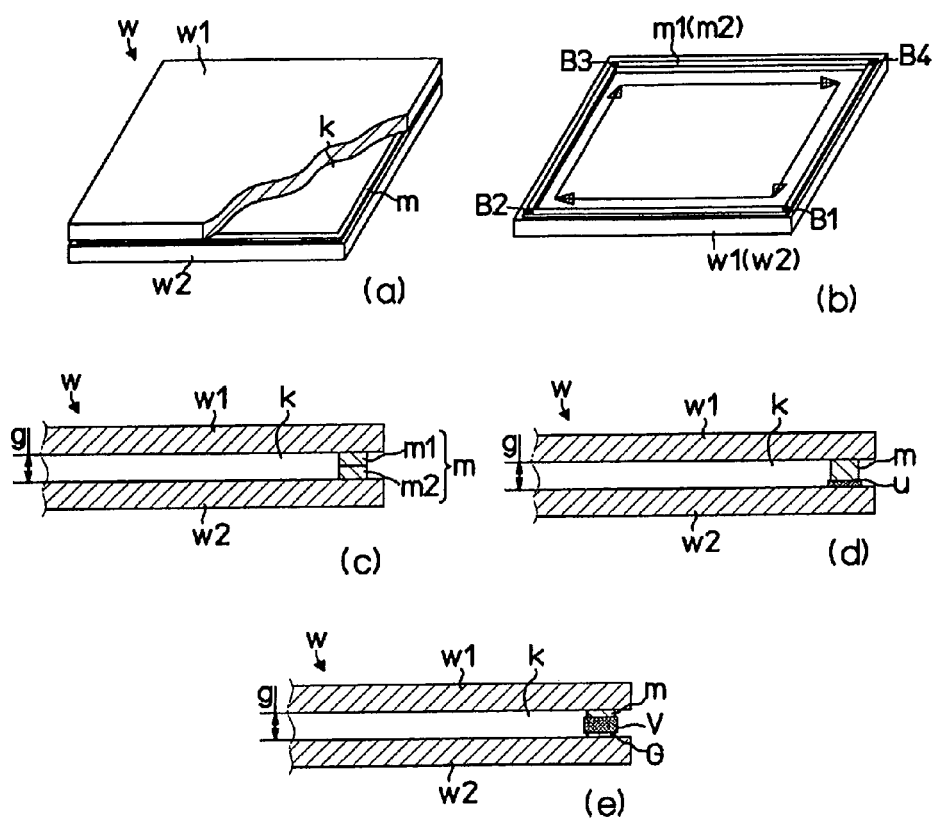
FIG. 50 is a schematic illustration of the configuration of a glass panel.

The configuration of a glass panel manufactured by means of the supply apparatus of Example No. 1-1 will be described by referring to FIG. 50. In FIGS. 50(a) and 50(c), reference symbol W denotes a glass panel manufactured by using the supply apparatus of Example No. 1-1. Reference symbols w1 and w2 respectively denote paired glass substrates whose main surfaces face each other with a gap of predetermined dimension g disposed between them. Reference symbol m denotes a frame-shaped bonding section arranged at an outer peripheral section of the oppositely disposed glass substrates w1 and w2, more specifically slightly inside the outer peripheral edges of the glass substrates, so as to be directly bonded to the main surface to produce an airtight chamber to be described later. As shown in FIGS. 50(b) and 50(c), the bonding section m is produced as bonding section m1 formed on the glass substrate w1 and bonding section m2 formed on the glass substrate w2 are bonded at the bonding surfaces thereof and brought into a unified state. An SnAgAl based alloy which is a low melting point metal showing an excellent bonding performance relative to the glass substrates w1 and w2 and contains specifically Ag by 8.5% and Al by 0.35% in terms of mass %, Sn taking the balance, is employed for the bonding section m. The space defined by the glass substrates w1 and w2 and the bonding section m constitutes an airtight chamber and a vacuum atmosphere or predetermined gas or liquid is sealed in the airtight chamber according to the application of the glass panel W.

Note, however, that the configuration of the glass panel W is not limited to the above-described one and a configuration where glass panel W is produced by directly bonding a bonding section m only to one of the glass substrates, or glass substrate w1, and subsequently boding the molten bonding section m to the other glass substrate w2 by way of under layer u that is highly wettable relative to the bonding section m as shown in FIG. 50(d), and a configuration where glass panel W is produced by directly bonding a bonding section m only to one of the glass substrates, or glass substrate w1, and subsequently boding the molten bonding section m to the other glass substrate w2 by way of frame member V made of metal or glass to secure the gap between the glass substrates w1 and w2 and glass frit G as shown in FIG. 50(e) are not excluded. In other words, the supply apparatus and the supply method of Example No. 1-1 are applicable to any glass panel W where bonding section m is directly bonded to one of a pair of glass substrates w1 and w2.

Now, a manufacturing line for manufacturing glass panel W as described above will be described below by referring to FIG. 1. Reference symbol 1 denotes the manufacturing line for glass panel W that includes the supply apparatus as described above by way of Example No. 1-1 and the manufacturing line 1 includes a preloading chamber 1a containing glass substrates w1 and w2 and a predetermined atmosphere, a preprocessing chamber 1b for conducting a heat treatment, a plasma irradiation treatment and so on onto the glass substrates w1 and w2 in order to remove the foreign objects and the moisture adhering to the surfaces thereof, a molten solder supply chamber 1c incorporating the supply apparatus as described above by way of Example No. 1-1, a bonding chamber 1d for bonding the glass substrates w1 and w2 to produce a glass panel, a cooling chamber 1e for cooling the glass panel, an unloading chamber 1f for discharging the glass panel, the chambers 1a through 1f being arranged sequentially in the above-described order, and a conveyer means for conveying the glass substrates w1 and w2 treated in each of the above-described chambers to the next step. On the manufacturing line 1, the prepared glass substrates w1 and w2 are put into the preloading chamber 1a and subsequently treated sequentially in the preprocessing chamber 1b, the molten solder supply chamber 1c, the bonding chamber 1d, the cooling chamber 1e and the unloading chamber 1f in the above mentioned order to manufacture a glass panel W.

Figure 2:
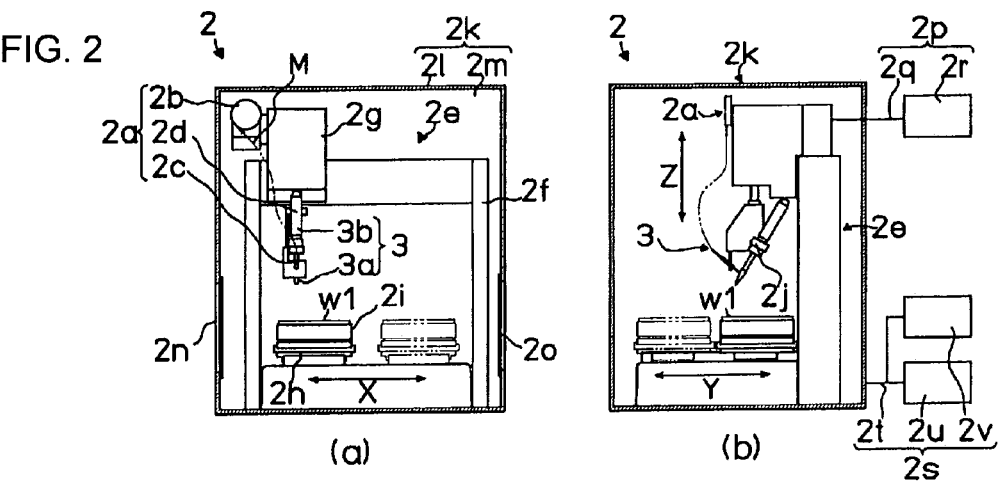
FIG. 2 is a front view and a lateral view of the molten metal supply apparatus of Example No. 1-1.

The supply apparatus of Example No. 1-1 incorporated in the molten solder supply chamber 1c will be described below by referring to FIGS. 2 through 6. In FIG. 2, reference symbol 2 denotes the supply apparatus. The supply apparatus 2 includes a thread solder supply means 2a, a heating/melting means 3, a moving means 2e, an airtight chamber 2k containing the above listed means, a control means 2p for controlling the operation of each of the means and an atmosphere control means 2s for controlling the atmosphere in the airtight chamber 2k. Now, each of the above listed components will be described below by way of an example where molten solder is supplied to one of the glass substrates, or glass substrate w1.

[Thread Solder Supply Means]

Reference symbol 2b denotes a bobbin-shaped thread solder feeding section that carries a wire-shaped material made of an SnAgAl based alloy (to be referred to as thread solder hereinafter) wound around it and is adapted to be driven to rotate by a motor or the like (not shown) and quantitatively feed out thread solder M. Reference symbol 2c denotes a substantially tubular thread solder guide section having a through hole that is a guide path through which thread solder M can pass and which has two open ends. Thread solder M formed with a diameter of about 2 mm is employed in the supply apparatus 2. In the initial state, the thread solder M is set in a state where it is wound around the thread solder feeding section 2b and a front end part of the thread solder M that is drawn out from the thread solder feeding section 2b is inserted into the guide path from the upper end opening of the thread solder guide section 2c and projecting from the lower end opening (see FIG. 3).

Figure 6:
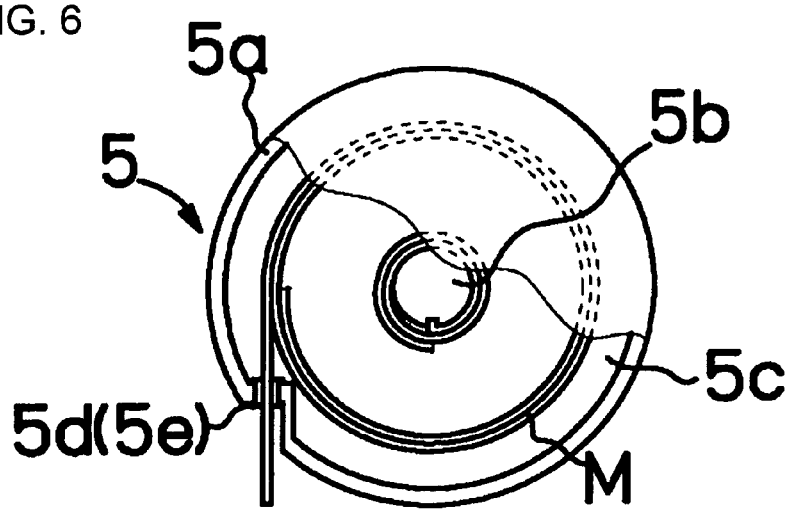
FIG. 6 is an exemplar modified thread solder feeding section of FIG. 1.

A preferable exemplar thread solder feeding section 2b will be described below by referring to FIG. 6. The thread solder feeding section 5 shown in FIG. 6 is a package for storing thread solder M in a non-oxidizing atmosphere and includes a rotatable winding core 5b around which the thread solder M is wound to show a coil-shaped profile, a hollow cylindrical case 5a containing the thread solder M wound around the winding core 5b, a hole section 5d formed at the lateral surface of the case 5a and a drawing out member 5e fitted into and engaged with the hole section 5d. A drawing out hole having a diameter smaller than that of the thread solder M is bored through the drawing out member 5e and the drawing out member 5e is made of an elastic material such as rubber. Thus, when the free end of the thread solder M is drawn out from the drawing out hole, the inner surface of the drawing out hole tightly contacts the outer peripheral surface of the thread solder M to maintain the airtightness of the container chamber 5c of the thread solder feeding section 5 that is a package. Preferably, the atmosphere in the container chamber 5c is a vacuum atmosphere or an inert atmosphere and the container chamber 5c contains active carbon or a moisture removing agent in order to maintain the humidity ratio of the container chamber 5c to a constant level.

Figure 3:
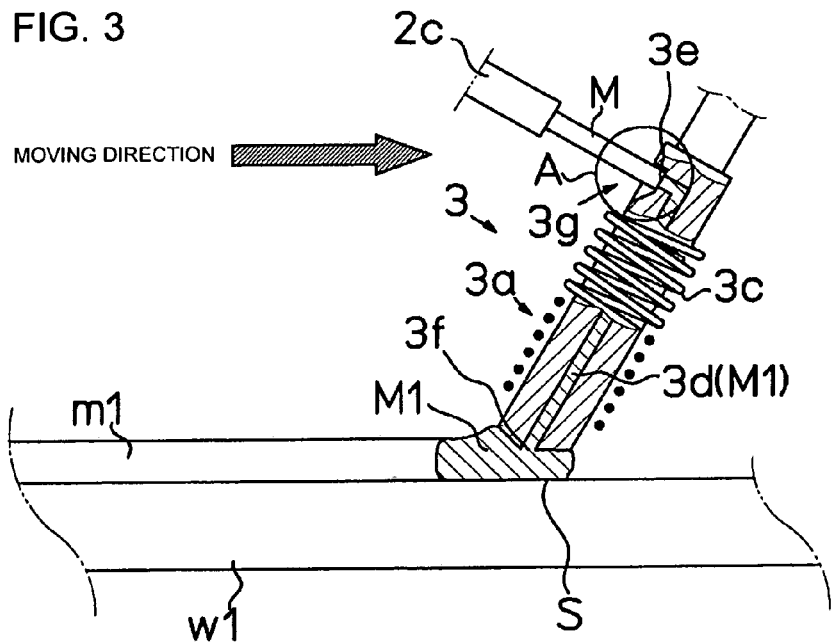
FIG. 3 is an enlarged partial lateral view of FIG. 2.
Figure 4:
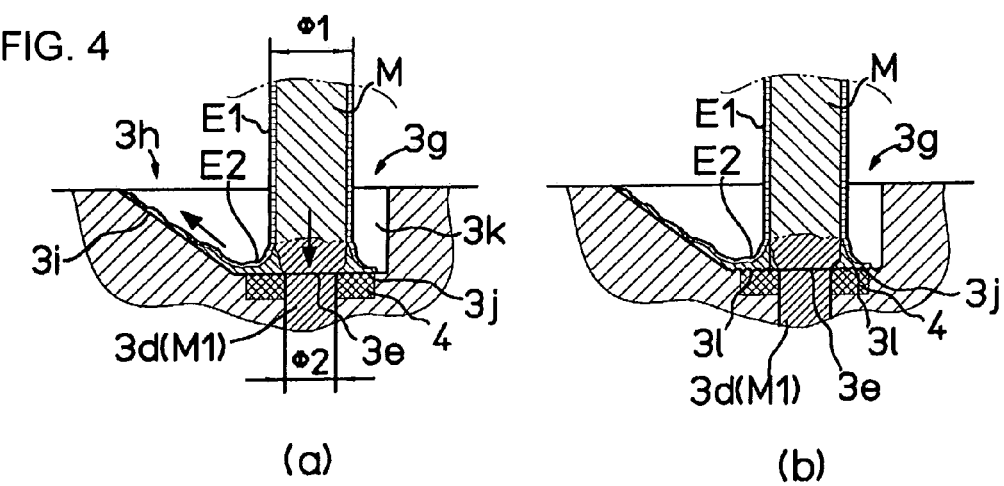
FIG. 4 is an enlarged partial view of FIG. 3.

In FIG. 2, reference symbol 2d denotes an ultrasonic wave applying section for irradiating ultrasonic waves to the contact interface of molten solder M1 and the main surface S of glass substrate w1 by way of the molten solder M1 produced by melting thread solder M by the heating/melting means 3 (see FIG. 3). Note that the ultrasonic wave applying section 2d is incorporated in the heating/melting means 3 for the convenience of forming the supply apparatus 2 in such a way that ultrasonic waves can be applied by way of a supply cylinder 3a of the heating/melting means 3.

[Heating/Melting Means]

Reference symbol 3a of the heating/melting means 3 denotes a supply cylinder for supplying molten solder M1 to the main surface S of the glass substrate w1 on which a bonding section is to be formed. As shown in FIG. 3, the supply cylinder 3a shows a substantially pillar-shaped profile and has a core member made of stainless steel showing a high thermal conductivity. A Cr layer that is highly wettable relative to molten solder M1 is formed on the outer peripheral surface of the core member and an Ni layer that is poorly wettable relative to molten solder M1 is formed on the Cr layer except the bottom surface of the supply cylinder 3a. The supply cylinder 3a is arranged in such a way that its bottom surface where the second opening 3f is formed faces the main surface S of the glass substrate w1 so as to supply molten solder M1 to the main surface S. Reference symbol 3c denotes a heater wound around the outer periphery of the supply cylinder 3a to heat the supply cylinder 3a to a temperature not lower than the melting point of thread solder M. In FIG. 2, reference symbol 3b denotes a main body section to which the supply cylinder 3a is rigidly secured and where the heat emitting circuit of the heater 3c etc. is incorporated. As described above, the ultrasonic wave generating unit, the control circuit and so on of the ultrasonic wave applying section 2d are contained in the main body section 3b.

As shown in FIG. 3, the supply cylinder 3a is provided at the top (one of the end sections thereof) with a melting section 3g where thread solder M contacts it to produce molten solder M1 and one of the openings (the first opening) 3e is open. The other opening (the second opening) 3f is open at the bottom surface (the other end surface). A substantially cylindrical flow path 3d is arranged in the supply cylinder 3a so as to be closed except the first opening 3e and the second opening 3f. Thus, the molten solder M1 that is produced at the melting section 3g flows into the flow path 3d from the first opening 3e that is an inlet port for molten solder M1, flows downward through the flow path 3d, flows out from the second opening 3f that is a discharge port and is supplied to the main surface S of the glass substrate w1. A Cr layer that improves the wettability of their surfaces relative to molten solder M1 is formed on the melting section 3g and also on the flow path 3d as a preferable arrangement for smoothly flowing molten solder M1. Such a Cr layer may be replaced by a layer made of Al, Mo, W, V, Nb or Ta. Furthermore, the surface of the flow path 3d of this example is subjected to a nitriding treatment, which is an anti-corrosion treatment, so that the surface may not be corroded by molten solder M1 and impurities may not be mixed into molten solder M1 and the Cr layer is formed on the surface that is subjected to a nitriding treatment. A treatment for improving the wettablility and an anti-corrosion treatment may appropriately be selected according to the molten metal to be handled.

The melting section 3g will be described in greater detail below. As shown in FIG. 4(a), the melting section 3g is formed at an upper part of the lateral surface of the supply cylinder 3a so as to show a recessed profile and an annular oxide removing section 4 is arranged at the bottom hereof so as to be integral with the melting section 3g. While the oxide removing section 4 is cross-hatched in FIG. 4(a) for the purpose of easy understanding, the oxide removing section 4 is integrally formed with the melting section 3g without any juncture. The first opening 3e is open at a melting surface 3j that is the top surface of the oxide removing section 4 (the bottom surface of the melting section 3g) where thread solder M contacts and becomes molten. The diameter ø2 of the first opening 3e is less than the diameter ø1 of the end facet of thread solder M that contacts the melting surface 3j.

The bottom end of the thread solder guide section 2c is positioned at and rigidly secured to a securing member 2j of the moving means 2e in an attitude of being directed toward the first opening 3e of the oxide removing section 4 that is open at the melting surface 3j (see FIG. 2). When the supply apparatus 2 is in operation, thread solder M that is fed out quantitatively from the thread solder feeding section 2b is guided through the guide path of the thread solder guide section 2c and let out from the opening at the bottom end so that its end facet contacts the melting surface 3j so as to close the first opening 3e. Note that the heating/melting means 3 is positioned at and rigidly secured to the securing member 2j of the moving means 2e in such a way that the thread solder M let out from the thread solder guide section 2c and the melting section 3g can maintain the above-described positional relationship (refer to FIG. 2).

With the above-described configuration of the heating/melting means 3, the thread solder M let out from the opening at the bottom end of the thread solder guide section 2c contacts and becomes molten by the melting surface 3j that is heated by the heater 3c to produce molten solder M1. As shown in FIG. 4(a), the thread solder M contacts the melting surface 3j in such a way that its end facet closes the first opening 3e of the oxide removing section 4 formed with diameter ø2 that is smaller than its diameter ø1 and becomes molten to produce molten solder M1. Oxides E2 produced as oxides E1 produced on the outer peripheral surface of the thread solder M and driven to flow into the melting section 3g and oxides E2 produced when the thread solder M is molten exist on the surface of the molten solder M1. However, oxides E2 and clean molten solder M1 that is located at a central part and does not contain oxides are separated from each other at an outer peripheral edge of the first opening 3e of the oxide removing section 4 so that the oxides E2 are removed. Therefore, oxides E2 are prevented from flowing into the flow path 3d at the melting surface 3j found along the outer peripheral edge of the first opening 3e and only clear molten solder M1 that is not mixed with oxides E2 flows into the flow path 3d through the first opening 3e. Furthermore, the inside of the flow path 3d from the first opening 3e to the second opening 3f is closed and a non-oxidizing atmosphere is contained there so that oxidation of the molten solder M1 in the process of being supplied is suppressed and would not progress. Since the thickness of the layer of oxides E1 produced on the surface of the thread solder M that is stored in the atmosphere is normally about tens of several micrometers, it is sufficient for the difference between the diameter of the thread solder M and the diameter of the first opening 3e, of ø1-ø2, to be about 1 mm, although the difference may be selected appropriately according to the low melting point metallic material to be supplied.

As described above, the oxides E2 that are prevented from flowing into the flow path 3d are stored in the storage section 3k and remain around the first opening 3e. In this example, preferably an oxide discharging section 3h for discharging oxides E2 from around the first opening 3e is provided in order to prevent the oxides E2 from moving in the storage section 3k and flowing into the flow path 3d once again. The oxide discharging section 3h has a sloped surface 3i extending downwardly from the melting surface 3j so that the oxides E2 remaining around the first opening 3e may flow out downwardly. The oxides E2 that flow out from the oxide discharging section 3h may be collected by an appropriate means. It may be needless to say that some other means such as a configuration that discharges oxides E2 by sucking them may alternatively be employed for the oxide discharging section 3h provided that it can discharge oxides E2 from around the first opening 3e.

An oxide capturing section 3l as shown in FIG. 4(b) may be provided at the melting surface 3j in order to prevent the oxides E2 remaining around the first opening 3e from moving and flowing into the flow path 3d. The oxide capturing section 3l in FIG. 4(b) is a plurality of projections and recesses formed on the surface of the melting surface 3j and such projections and recesses capture the oxides E2 and thereby suppress the flowing movement of the oxides E2. The effect of preventing the remaining oxides E2 from flowing into the flow path 3d can be enhanced by using the oxide discharging section 3h and the oxide capturing section 3l in combination.

Figure 5:
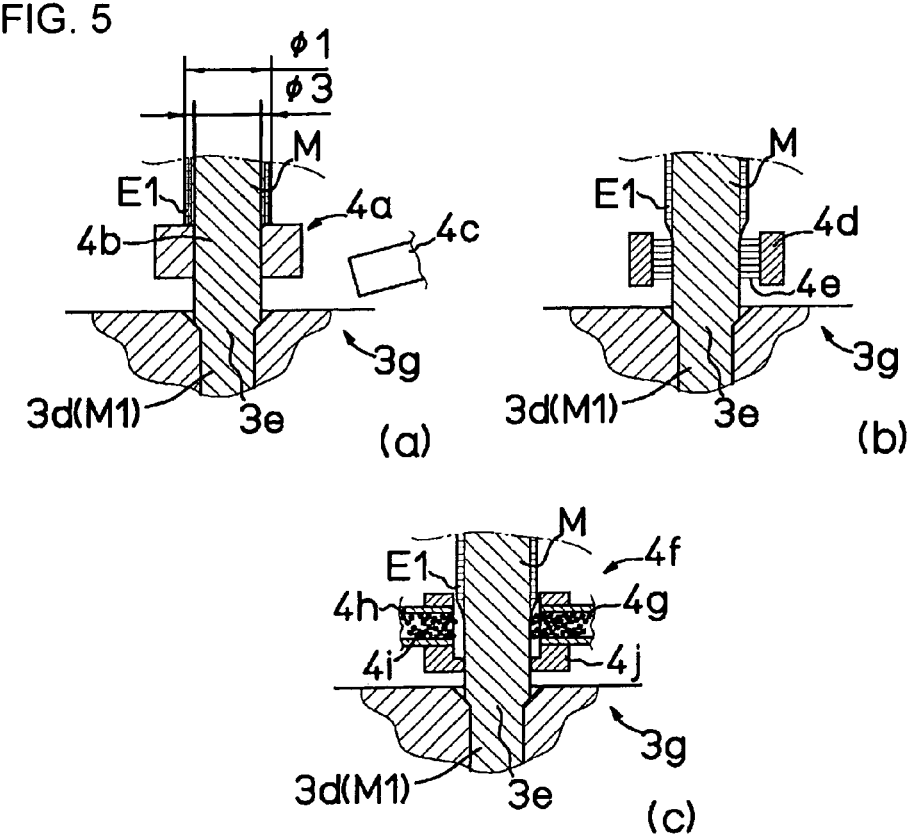
FIG. 5 is an exemplar modified oxide removing section of FIG. 4.

Exemplar modifications of the oxide removing section 4 will be described below by referring to FIG. 5. The first exemplar modified oxide removing section 4a shown in FIG. 5(a) is separated from the supply cylinder 3a. More specifically, the annular oxide removing section 4a has a through hole 4b having a top opening of a diameter ø3 smaller than the diameter ø1 of the thread solder M and the bottom opening of the through hole 4b is arranged at a position facing the first opening 3e of the flow path 3d. The outer peripheral edge of the top opening of the through hole 4b is formed as an edge section for cutting and removing the outer peripheral surface of thread solder M. Thus, the oxides E1 on the outer peripheral surface of the supplied thread solder M is removed by the edge section at the outer peripheral edge of the top opening having a diameter smaller than that of the thread solder M and a thread solder M produced by removing the oxides E1 is fed downward to contact and become molten by the melting section 3g so that clean molten solder M1 that does not contain any oxides flows into the flow path 3d through the first opening 3e. Preferably, in order to prevent oxide from being generated once again in the thread solder M from which the oxides E1 on the outer peripheral surface is removed by the oxide removing section 4a, there is provided an arrangement of causing inert gas to flow from a nozzle 4c between the oxide removing section 4a and the first opening 3e to produce a non-oxidizing atmosphere between the oxide removing section 4a and the first opening 3e.

FIG. 5(b) shows a second exemplar modified oxide removing section 4d. This oxide removing section 4d is designed to remove oxides E1 by plasma 4e. The annular oxide removing section 4d has a through hole into which thread solder M can be inserted and through which the thread solder M can pass and is connected to a plasma generation means (not shown). It is arranged as plasma irradiation means and irradiates plasma 4e from its inner surface toward its center. The oxide removing section 4d is arranged separately from the supply cylinder 3a at a position that allows the oxide removing section 4d to irradiate plasma 4e to the outer peripheral surface of thread solder M that is being supplied. The oxides E1 on the outer peripheral surface of the thread solder M supplied into the through hole of the oxide removing section 4d are removed by plasma 4e and thread solder M from which the oxides E1 are removed contacts the melting section 3g and becomes molten.

FIG. 5(c) shows a third exemplar modified oxide removing section 4f. This oxide removing section 4f is designed to remove oxides E1 by hard particles 4g. More specifically, the oxide removing section 4f includes a substantially cylindrical container 4j having a top opening into which thread solder M is inserted with oxides E1 adhering thereto so as to be tightly held in contact with the container 4j and a bottom opening from which the thread solder M, from which the oxides E1 are removed, is discharged while being tightly held in contact with the container 4j and a flow pipe 4h arranged to run through the container 4j from the right lateral surface to the left lateral surface of the container 4j and having a particle supply path 4i. The right end of the flow pipe 4h is connected to a hard particle supply means for supplying gas containing hard particles 4g such as ceramic particles, for example, at a predetermined flow rate and the oxide removing section 4f is arranged as a shot blasting means for causing hard particles 4g to flow from the right side to the left side of the flow pipe 4h. The oxide removing section 4f is arranged separately from the supply cylinder 3a at a position that allows the oxide removing section 4f to irradiate hard particles 4g to the outer peripheral surface of the thread solder M that is being supplied. The oxides E1 on the outer peripheral surface of the thread solder M supplied into the through hole of the oxide removing section 4f are removed by hard particles 4g and thread solder M from which the oxides E1 are removed contacts the melting section 3g and becomes molten. Preferably, the thread solder M is supplied to the oxide removing section 4f while the thread solder M is being driven to rotate around the axial core thereof because the oxides E1 can be removed uniformly.

[Moving Means]

As shown in FIG. 2, the moving means 2e includes a gate-like support body 2f, a lifting section 2g secured to a top edge part of the support body 2f, a horizontally moving section 2h arranged between the lateral sides of the support body 2f so as to be able to move both in vertical directions and horizontal directions relative to the sheet of the drawing and a table 2i that is arranged at the horizontally moving section 2h and on which a glass substrate w1 can be placed in a horizontal attitude of facing its main surface upward, on which a bonding section m1 is to be formed. As described above, the thread solder guide section 2c and the heating/melting means 3 are connected to the bottom section of the lifting section 2g by way of a securing member 2j. Note that, as shown in FIG. 2(a), the upward and downward moving direction of the lifting section 2g is referred to as Z-axis direction and the moving direction of the horizontally moving section 2h running in parallel with the sheet of the drawing is referred to as X-axis direction, while the moving direction of the horizontally moving section 2h that is orthogonal relative to both the X-axis and the Z-axis is referred to as Y-axis direction hereinafter.

The table 2i may be provided with a panel-shaped heat emitting body that can heat the entire surface of the glass substrate w1. Then, the glass substrate w1 can be prevented from being damaged by the stress generated due to the temperature difference between the molten solder M1 and the glass substrate w1 and the wettability of molten solder M1 relative to the glass substrate w1 is raised to by turn improve the bonding performance of the bonding section m1 relative to the glass substrate w1 by heating the glass substrate w1 to about the melting temperature of the molten solder M1 by means of this heat emitting body.

[Control Means]

As shown in FIG. 2, the control means 2p includes a control section 2r connected to the above components of the supply apparatus 2 by way of electric communication lines 2q to control the operation of each of the components. More specifically, the control section 2r is a computer. The processing section (CPU) of the computer reads out and appropriately processes the operation program and the command data stored in the memory of the computer so as to direct the motor incorporated in the thread solder feeding section 2b, the heater 3c and the lifting section 2g and the horizontally moving section 2h of the moving means 2e to respectively control the quantity of thread solder M to be supplied, the heating temperature of the heater 3c and the moving routes and the moving speeds of the lifting section 2g and the horizontally moving section 2h.

[Airtight Chamber]

As shown in FIG. 2, the airtight chamber 2k includes a cabinet 2l that produces an airtight space 2m for containing the above listed components of the supply apparatus 2 and a delivery entrance 2n and a delivery exit 2o arranged at opposite lateral walls of the cabinet 2l respectively for putting glass substrate w1 into the supply apparatus 2 and moving the glass substrate w1 out. Note that the delivery entrance 2n and the delivery exit 2o are provided with respective airtight doors in order to secure the airtightness of the airtight chamber 2k.

[Atmosphere Control Means]

As shown in FIG. 2, the atmosphere control means 2s includes a gas supply section 2u that is equipped with a supply pump and can supply predetermined gas under predetermined pressure, a vacuum pump 2v for producing a vacuum condition in the airtight space 2m of the airtight chamber 2k and a supply cylinder 2t for connecting the gas supply section 2u, the vacuum pump 2v and the airtight space 2m to control the airtight space 2m so as to make it have a predetermined atmosphere. Note that the gas supply section 2u can separately contain gases of a plurality of different kinds to be used selectively according to the application of the glass substrate w1 including, for example, argon gas and nitrogen gas, which are inert gases, hydrogen gas and carbon monoxide gas, which are reducing gases, and oxygen gas, which is an oxidizing gas. The gas supply section 2u can also mix any of such gases to a predetermined ratio and supply the mixture gas to the airtight space 2m by means of the mixing valve with which the gas supply section 2u is equipped.

Now, the operation of the supply apparatus 2 of Example No. 1-1 will be described below. Whenever necessary, the operation of the overall glass panel manufacturing line 1 will also be described below.

[Preparation Step]

Figure 1:
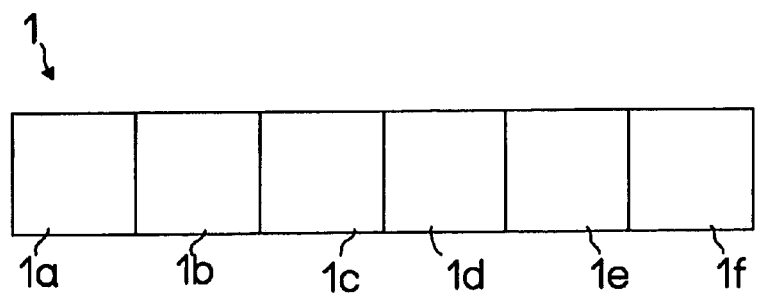
FIG. 1 is a schematic illustration of the configuration of a glass panel manufacturing line including a molten metal supply apparatus as described below in Example No. 1-1.

Firstly, as shown in FIG. 1, prepared glass substrates w1 and w2 are put into the preloading chamber 1a. After supplying the glass substrates w1 and w2, the inside of the preloading chamber 1a is brought into vacuum once and the vacuum is then replaced by argon gas to produce an inert atmosphere there. Note that the preprocessing chamber 1b, the bonding section forming chamber 1c, the bonding chamber 1d, the cooling chamber 1e and the unloading chamber 1f that are arranged downstream are also made to contain an inert atmosphere.

[Cleaning Step]

Then, the glass substrates w1 and w2 are put into the preprocessing chamber 1b and the moisture and the foreign objects adhering to the surfaces of the glass substrates w1 and w2 are removed by cleaning, which may be heat treating them at a predetermined temperature or conducting a plasma cleaning process on them. When a bonding section of glass frit or the like that gives off impurity gas is formed on either or both of the glass substrates w1 and w2, a degassing process of removing the impurity gas produced from the bonding section(s) may also be conducted in the above heat treating step.

[Molten Solder Supply Step]

The glass substrates w1 and w2 that are cleaned in the preprocessing step are then put into the molten solder supply chamber 1c and molten solders M1 and M2 are supplied to form bonding sections m1 and m2 respectively on the glass substrates w1 and w2 as shown in FIG. 50(b). Since a same method of supplying molten solder is employed for both molten solders M1 and M2, the instance of supplying molten solder M1 to the glass substrate w1 will be described below.

As shown in FIG. 2, the glass substrate w1 is placed on the table 2i in a horizontal attitude of facing its main surface S upward, to which bonding section m1 is bonded. Then, the supply apparatus 2 drives the lifting section 2g and the horizontally moving section 2h to move in the directions of X-, Y- and Z-axes so as to produce a predetermined gap between the bottom surface of the supply cylinder 3a and the main surface S of the glass substrate w1 (see FIG. 3) and position the bottom surface of the supply cylinder 3a at corner section B1 that is specified as the staring point for forming a rectangular frame-like bonding section m1 (see FIG. 50(b)).

The supply apparatus 2 drives the motor of the thread solder feeding section 2b to operate and let out thread solder M from the thread solder guide section 2c. The let out thread solder M contacts the melting surface 3j that is heated by the heater 3c to become molten solder M1. Then, as described above, the oxides E1 formed on the outer peripheral surface of the thread solder M are isolated from the molten solder M1 by the melting surface 3j of the oxide removing section 4 and only the clean molten solder M1 that is not mixed with the oxides E1 flows into the flow path 3d and flows out from the second opening 3f so as to be supplied onto the main surface S of the glass substrate w1.

The supply apparatus 2 drives the glass substrate w1 to move by means of the horizontally moving section 2h so as to horizontally and relatively move the supply cylinder 3a from the corner section B1 to the corner section B2 of the glass substrate w1. Since ultrasonic waves are being applied to the contact interface of the supplied molten solder M1 and the main surface S of the glass substrate w1 by the ultrasonic wave application means, the air bubbles and the foreign objects existing at the contact interface are removed to improve the wettability of molten solder M1 relative to the glass substrate w1. Thereafter, the supply apparatus 2 drives the glass substrate w1 to move by means of the horizontally moving section 2h and also drives the supply cylinder 3a to horizontally move along the moving route terminating at the corner section B1, which is the starting point, by way of corner sections B3 and B4 of the glass substrate w1 (see FIG. 50(b)) so as to supply molten solder M1 to form a rectangular frame-like block of molten solder.

[Bonding Step]

Figure 7:
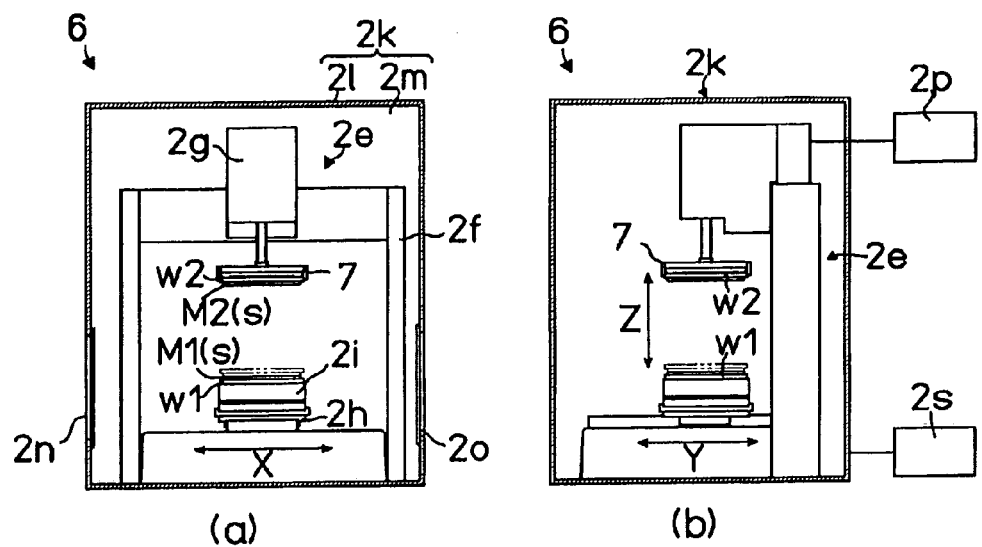
FIG. 7 is a front view and a lateral view of the glass substrate bonding apparatus included in the glass panel manufacturing line of FIG. 1.
Figure 8:
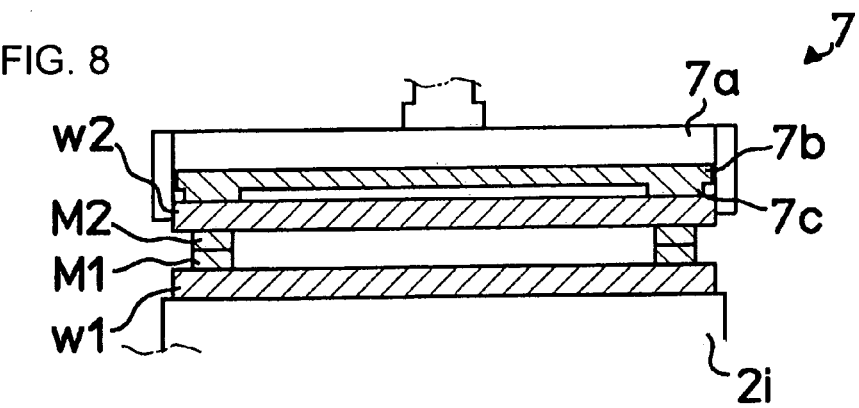
FIG. 8 is an enlarged partial front view of FIG. 7.

Then, the glass substrates w1 and w2 that are supplied respectively with molten solders M1 and M2 in the above molten solder supply step are then put into the bonding chamber 1d shown in FIG. 1 and bonded to each other by means of glass substrate bonding apparatus 6 shown in FIGS. 7 and 8.

As shown in FIG. 7, like the supply apparatus 2, the bonding apparatus 6 includes a moving means 2e that is placed in internal space 2m of airtight chamber 2k whose atmosphere is controlled by an atmosphere control means 2s and is driven and controlled by a control means 2p. Table 2i of the moving means 2e is arranged in such a way that glass substrate w1 can be placed on the table 2i in a horizontal attitude of facing its main surface S upward, onto which molten solder M1 is supplied. A holding means 7 for holding the glass substrate w2 in a horizontal attitude of facing its main surface S downward, onto which molten solder M2 is supplied, is incorporated into a lifting section 2g.

As shown in FIG. 8, the lifting means 7 includes a holding section 7a that can hold the glass substrate w2 in the above attitude and a panel-shaped heat emitting section 7b that is arranged between the holding section 7a and glass substrate w2 and adapted to emit heat as it is electrically energized. Note that FIG. 8 shows the glass substrates w1 and w2 and the heat emitting section 7b in cross-sectional view for the purpose of easy understanding of the positional relationship among them.

A rectangular frame-like projecting section 7c that corresponds to the molten solder M2 supplied to the main surface of the glass substrate w2 is formed at the heat emitting section 7b. When the projecting section 7c is brought into contact with the surface of the glass substrate w2 that is opposite to the surface onto which molten metal M2 is supplied at the position corresponding to the molten solder M2 in a horizontal plane and made the heat emitting section 7b emit heat while the glass substrate w2 is being held by the holding section 7a, only the molten solder M2 is efficiently heated by way of the projecting section 7c and the molten state of the molten solder M2 is maintained.

The operation of the above bonding apparatus 6 will be described below. Firstly, glass substrate w1 is placed on the table 2i in an attitude of facing its main surface S upward, on which molten solder M1 is disposed, and the holding section 7a is made to the hold glass substrate w2 in an attitude of facing its mains surface S downward, on which molten solder M2 is disposed. At this time, the heat emitting body of the table 2i and the heat emitting section 7b of the holding means 7 are electrically energized and emit heat so that the molten solders M1 and M2 maintain a molten state. Then, the bonding apparatus 6 drives the lifting section 2g and the horizontally moving section 2h in the directions of the X-, Y- and Z-axes so as to make the surfaces of the molten solders M1 and M2 exactly face each other and also drives the lifting section 2g downward to slightly apply pressure to the contact interface of the molten solders M1 and M2. Then, as a result, the molten solders M1 and M2 are bonded to each other and unified at the contact interface. Thereafter, the bonding apparatus 6 stops electrically energizing the heat emitting body of the table 2*i* and the heat emitting section 7*b* of the holding means 7 and cools and solidifies the unified molten solders M1 and M2 to form bonding section m. As a result of the above procedures, a glass panel W as shown in FIG. 50(*a*) is obtained.
[Cooling Step]

The glass panel W formed by way of the above-described glass substrate bonding step is then put into the cooling chamber 1*e* and held there until the glass panel W is cooled to the room temperature.
[Discharging Step]

The cooled glass panel W is then put into the unloading chamber 1*f*. The argon gas in the unloading chamber 1*f* is replaced by the atmosphere and then the glass panel W is discharged to the outside.

Example No. 1-2

The supply cylinder and the molten metal supply apparatus incorporating the supply cylinder of Example No. 1-2 of the present invention will be described below by referring to FIGS. 9 through 11 and 51.

A glass panel W that is manufactured by the supply apparatus of Example No. 1-2 is basically same as a glass panel W that is manufactured by the glass panel manufacturing line of Example No. 1-1. However, it differs from the latter glass panel W in that no bonding interface exists in the bonding section n for bonding glass substrates w3 and w4 and the bonding section n is formed integrally and that a gap maintaining member Q is provided to form a gap between the glass substrates w3 and w4. Note that the glass substrates w3 and w4 are assumed to have same dimensions in the following description.

Figure 9:
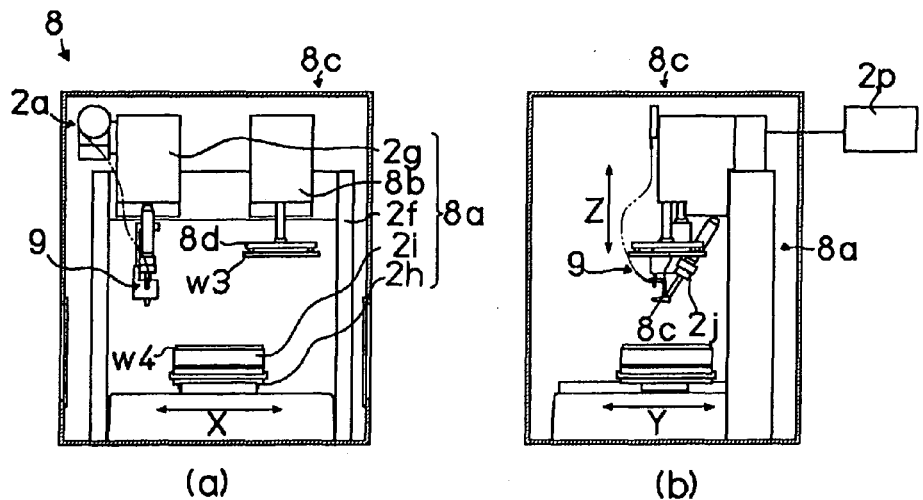
FIG. 9 is a front view and a lateral view of the molten metal supply apparatus of Example No. 1-2.

As shown in FIG. 9, the supply apparatus 8 of Example No. 1-2 includes a thread solder supply means 2*a*, a heating/melting means 9, a moving means 8*a*, an airtight chamber 8*c* and a control means 2*p* and additionally a holding means 8*d* for holding glass substrate w3 in a predetermined attitude is incorporated there. Note that, of the components of the supply apparatus 8 including the thread solder supply means 2*a*, the moving means 8*a*, the airtight chamber 8*c* and the control means 2*p*, those whose configurations are same as those of the corresponding components of the above-described supply apparatus 2 are denoted respectively by the same reference symbols and will not be described in detail.
[Holding Means, Moving Means]

Figure 10:
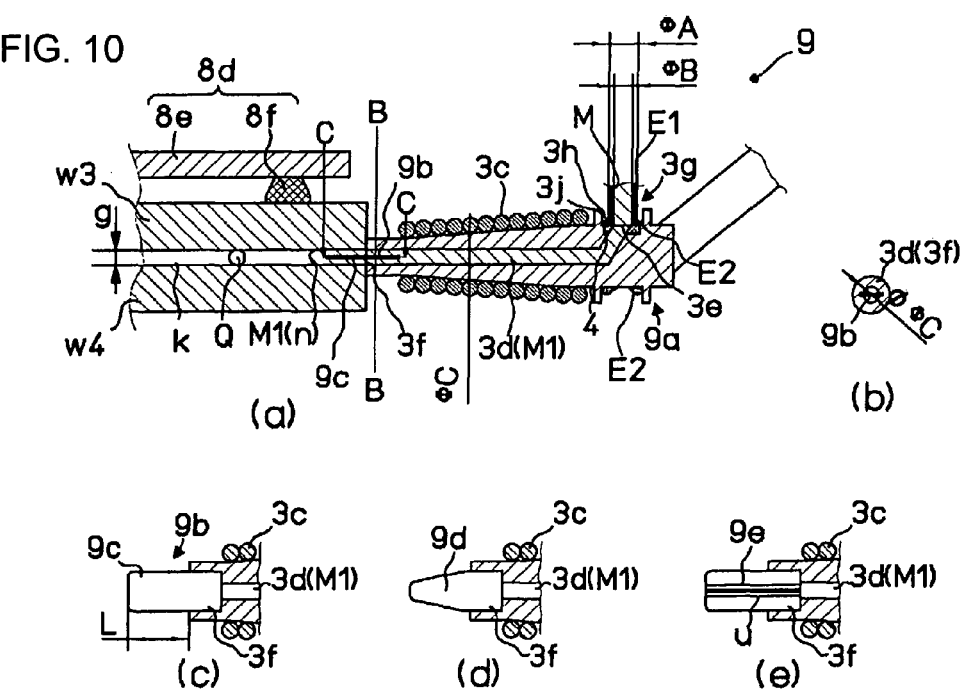
FIG. 10 is an enlarged partial view of FIG. 9.

As shown in FIGS. 9 and 10, the holding means 8*d* includes a plurality of adsorption sections 8*f* that can adsorb glass substrate w3 in a horizontal attitude of facing its main surface downward, onto which a bonding section n is to be bonded, and a substantially flat plate-shaped support section 8*e* to which the adsorption sections 8*f* are rigidly secured. The moving means 8*a* of the supply apparatus 8 includes a first lifting section 2*g* secured to the left end of the top edge of support body 2*f* and a second lifting section 8*b* secured to the right end of the top edge and the holding means 8*d* is fitted to the bottom of the second lifting section 8*b*. The above-described second lifting section 8*b* and horizontally moving section 2*h* are adapted to cooperate and constitute a positioning means for positioning glass substrate w3 relative to glass substrate w4 in such a way that the glass substrates w3 and w4 are oppositely disposed in horizontal directions and the their end facets located side by side are substantially aligned with each other while the glass substrates w3 and w4 are vertically positioned with a predetermined gap formed between them. After completing the operation of vertically positioning the glass substrates w3 and w4, the glass substrate w3 is released from the state of being adsorbed by the adsorption sections 8*f* but the gap between the glass substrates w3 and w4 are maintained by the gap maintaining member Q.
[Airtight Chamber]

The airtight chamber 8*c* that contains the thread solder supply means 2*a*, the heating/melting means 9 and the moving means 8*a* differs from the airtight chamber 2*k* of the supply apparatus 2 in that the inside of the former airtight chamber is held to the atmosphere (an oxidizing atmosphere), whereas the inside of the latter airtight chamber is held to an inert atmosphere under the control of the atmosphere control means. This is because molten solder M1 can be supplied to the glass substrates w3 and w4 while progress of oxidation in the supply process that is conducted in the atmosphere, or in an oxidizing atmosphere, is suppressed due to the structure of the supply cylinder 9*a* of the supply apparatus 8.
[Heating/Melting Means]

The basic configuration of the heating/melting means 9 of this example resembles that of the above-described heating/melting means 3 but differs from the latter in terms of the structure of the supply cylinder and its attitude relative to the glass substrates w3 and w4. Namely, as shown in FIG. 10(*a*), a melting section 3*g* with which thread solder M contacts to produce molten solder M1 is arranged at a right end section (an end section) of the supply cylinder 9*a* of the heating/melting means 9 and a substantially round tubular flow path 3*d* is arranged in the inside of the melting section 3*g* with an opening (a first opening) 3*e* located at oxide removing section 4 (cross-hatched part) arranged integrally with the melting section 3*g* and another opening (a second opening) 3*f* located at the left end facet of the melting section 3*g*. More specifically, the melting section 3*g* is formed at the right end of the top surface of the supply cylinder 9*a* to show a recessed profile and the first opening 3*e* is located at the bottom surface of the melting section 3*g* that is melting surface 3*j* which thread solder M contacts to melt, or the top surface of the oxide removing section 4. The diameter øB of the first opening 3*e* is less than the diameter øA of the end facet of the thread solder M that contacts the melting surface 3*j* and the diameter øC of the second opening 3*f* is not greater than the size g of the outer peripheral gap k between the glass substrates w3 and w4. It is so arranged that, after thread solder M is let out from the opening at the bottom end of the thread solder guide section, its end facet is made to contact the melting surface 3*j* in an attitude of closing the first opening 3*e*.

As illustrated in FIGS. 10(*a*) and 10(*c*) showing the area indicated by arrows C in FIG. 10(*a*), a substantially flat plate-shaped guide section 9*b* that extends in a horizontal direction along the center axis of the flow path 3*d* is arranged in the supply cylinder 9*a* of Example No. 1-2. The guide section 9*b* has a projecting part 9*c* projecting by a predetermined length L from the second opening 3*f*. The projecting length L of the projecting part 9*c* depends on the width of the bonding section n to be formed and the thickness of the projecting part 9*c* is less than the size g of the outer peripheral gap k to be formed between the glass substrates w3 and w4. The guide section 9*b* has a function of smoothly supplying the molten solder M1 flowing out from the second opening 3*f* to the outer peripheral gap k between the glass substrates w3 and w4. Thus, as shown in FIG. 10(*b*), which is a cross-sectional view taken along line B-B in FIG. 10(*a*), the base end of the guide section 9*b* needs to be included in the second opening 3*f*. On the other hand, a gap that allows molten solder M1 to flow out needs to be provided between the guide section 9*b* and the flow path 3*d* so that the guide section 9*b* may not obstruct the molten solder M1 flowing out from the second opening 3*f*. Furthermore, to smoothly supply molten solder M1 to the outer peripheral gap k, the front surface of the guide section 9*b* is preferably treated to improve its wettability relative to molten solder M1 like the melting section 3*g* and the flow path 3*d*. While the supply cylinder 9*a* is described as having a guide section 9*b* in the supply apparatus 8 of this example, such a guide section is not an indispensable component in a case where molten solder wets glass substrates well and spreads smoothly between them because molten metal is highly wettable or because the size g of the outer peripheral gap k is relatively large.

The supply cylinder 9*a* is held in a horizontal attitude that allows the projecting part 9*c* to be inserted into the outer peripheral gap k between the oppositely disposed glass substrates w3 and w4 and when molten solder M1 is supplied into the outer peripheral gap k, the second opening 3*f* is positioned by the moving means 8*a* so as to be in a state of being connected to the outer peripheral gap k by making the left end facet where the second opening 3*f* is formed contacts both of the corresponding end facets of the glass substrates w3 and w4. With this arrangement, the flow path 3*d* is directly connected to the outer peripheral gap k of the glass substrates w3 and w2 into which molten solder M1 is to be supplied and the molten solder M1 flowing through the flow path 3*d* is filled into the outer peripheral gap k without being brought into contact with the surrounding atmosphere (oxygen) as shown in FIG. 10(*a*). Furthermore, because a guide section 9*b* is provided, the molten solder M1 flowing out from the second opening 3*f* is highly smoothly filled into the outer peripheral gap k. The melting section 3*g* of the supply cylinder 9*a* has a configuration similar to the above-described supply cylinder 3*a* so that it may be needless to say that the oxides E1 existing on the outer peripheral surface of the thread solder M1 is prevented from being mixed into the molten solder M1.

Exemplar modifications of the guide sections 9*b* will be described below by referring to FIGS. 10(*d*) and 10(*e*). Guide section 9*d* of FIG. 10(*d*) is so arranged as to realize an improved molten solder supply performance by tapering the guide section 9*d* toward the front end along the center axis of the flow path 3*d* so that the molten solder M1 that flows out from the second opening 3*f* can more smoothly flow into the outer peripheral gap k. Guide section 9*e* of FIG. 10(*e*) is formed by providing the surface of the guide section 9*b* with guide grooves u for leading molten solder M1 toward the outer peripheral gap k also in order to realize an improved molten solder supply performance. While a plurality of linear guide grooves u are formed substantially in parallel with the center axis of the flow path 3*d* in FIG. 10(*e*), alternatively a plurality of guide grooves may be formed radially or a plurality of curved guide grooves may be formed.

Now, the operation of the supply apparatus 8 of Example No. 1-2 will be described below. Note that the glass substrates w3 and w4 that are put into the supply apparatus 8 have already been subjected to a preprocessing step and any moisture and foreign objects are removed from the surfaces thereof.

[Substrate Positioning Step]

The glass substrate w3 is held by the holding means 8*d* in a horizontal attitude with its main surface downward, to which a bonding section n is to be bonded, and the glass substrate w4 is placed on the table 2*i* in a horizontal attitude with its main surface upward, to which the bonding section n is to be bonded. The supply apparatus 8 moves the second lifting section 8*b* and the horizontally moving section 2*h* to dispose the glass substrates w3 and w4 face to face in a horizontal direction in such a way that their relevant outer peripheral end facets are vertically aligned and a predetermined gap is produced between the glass substrates w3 and w4. Thereafter, the supply apparatus 8 releases the glass substrate w3 from the state of being adsorbed by the adsorption section 8*f* and moves the holding means 8*d* away from above the table 2*i* by raising the second lifting section 8*b*.

[Molten Solder Supply Step]

The supply apparatus 8 causes the heat emitting body contained in the table 2*i* to emit heat and heat the glass substrates w3 and w4 to about the melting temperature of molten solder M1. Then, the supply apparatus 8 drives the first lifting section 2*g* and the horizontally moving section 2*h* to move and insert the projecting part 9*c* of the guide section 9*b* into the outer peripheral gap k at a corner of the glass substrates w3 and w4 that is held by the gap maintaining member Q while positioning the supply cylinder 9*a* so as to produce a state where the left end facet of the guide section 9*b* contacts both of the corresponding end facets of the glass substrates w3 and w4.

Thereafter, the supply apparatus 8 drives the motor of the thread solder feeding section so as to let out thread solder M from the thread solder supply section. The thread solder M that is let out is then brought into contact with the melting surface 3*j* that is heated by the heater 3*c* to produce molten solder M1. The oxides E1 formed on the outer peripheral surface of the thread solder M are separated from the molten solder M1 by the oxide removing section 4 and only clean molten solder M1 that is not mixed with oxides E1 flows into the flow path 3*d*. Then, the molten solder M1 flowing through the flow path 3*d* that is closed except the first opening 3*e* and the second opening 3*f* then flows out from the second opening 3*f* without contacting the atmosphere and is further guided by the guide section 9*b* so that clean molten solder M1 that is prevented from being oxidized in the supply process is supplied into the outer peripheral gap k of the glass substrates w3 and w4.

Then, as the horizontally moving section 2*h* moves the glass substrates w3 and w4 in such a way that the supply cylinder 9*a* makes a full turn around the outer periphery of the glass substrates w3 and w4, while the positional relationship in the vertical direction of the supply cylinder 9*a* and the glass substrates w3 and w4 is maintained, molten solder M1 is supplied to and filled in the entire outer peripheral gap k of the glass substrates w3 and w4 to show a rectangular frame-like profile.

The holding means 8*d* may be provided with a function of heating the glass substrate w3 and the second lifting section 8*b* may be so arranged as to be able to move in the directions of the X- and Y-axes so that molten solder M1 can be supplied to the outer peripheral gap k of the glass substrates w3 and w4 by way of a sequence of operations similar to the above-described one without using a gap maintaining member Q.

[Bonding Step]

The electric energization of the heat emitting body of the table 2*i* is suspended to cool the glass substrates w3 and w4 and solidify the molten solder M1 in order to produce a bonding section n. As described above, clean molten solder M1 that is prevented from being mixed with the oxides E1 of the thread solder M and the oxides produced in the supply process is supplied to the outer peripheral gap k so that defective bonding hardly occurs at the bonding interfaces of the glass substrates w3 and w4 and the bonding section n to make it possible to obtain a glass panel W that is excellent in terms of airtightness and bonding strength.

While the glass substrates w3 and w4 have same dimensions in the above description for the purpose of easy understanding, the bonding apparatus can be made to adapt itself to glass substrates having different dimensions by appropriately devising the structure of the supply cylinder 9*a*. More specifically, when the glass substrates w3 and w4 have different dimensions and their relevant end facets are not aligned and produce a step if they are properly positioned, the left end facet of the supply cylinder 9a may be made to show a profile that matches the step.

Figure 11:
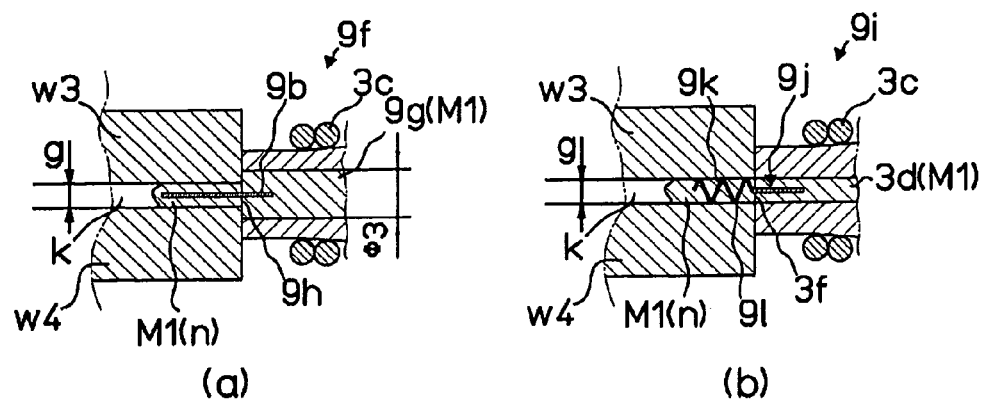
FIG. 11 is an enlarged partial view of FIG. 10.

Now, preferable arrangements of the supply cylinder 9a of Example No. 1-2 will be described below by referring to FIG. 11. The supply cylinder 9f of FIG. 11(a) is adapted to form a glass panel W having a bonding section n that includes an excess solder section n1 bulging out from the end facets in addition to the solder in the outer peripheral gap k of the glass substrates w3 and w4. The supply cylinder 9f shown in FIG. 11(a) has a second opening 9h of a diameter ø3 greater than the size g of the outer peripheral gap k of the glass substrates w3 and w4. In other words, the supply cylinder 9f has a second opening 9h formed so as to be able to include the outer peripheral gap k so that an excess solder section n1 is formed by the part of the second opening 9h that extends beyond the outer peripheral gap k. The excess solder section n1 operates as barrier wall to the atmosphere so that the molten solder M1 supplied to the outer peripheral gap k is not exposed to the atmosphere. In other words, the excess solder section n1 provides an effect of suppressing the progress of oxidation after the molten solder M1 is supplied.

The supply cylinder 9i of FIG. 11(b) is provided with a contact surface 9l that contacts the parts of the main surfaces of the glass substrates w3 and w4 for receiving the supplied molten solder M1 in order to remove the air bubbles and the foreign objects existing on the main surfaces of the glass substrates w3 and w4 and improve the activity of the surfaces to enhance the wettability of molten solder M1 relative to the glass substrates. While the guide section 9j has a projecting part 9k showing a zigzag profile so that the contact surface 9l in FIG. 11(b) may reliably contact the main surfaces of the glass substrates w3 and w4, the contact surface 9l may be appropriately formed so as not to adversely affect the flow of molten solder M1 in the outer peripheral gap k.

Example No. 1-3

The molten metal supply cylinder and the molten metal supply apparatus incorporating the supply cylinder of Example No. 1-3 of the present invention will be described below by referring to FIGS. 12 and 13. Since the basic configuration of the supply apparatus is same as the one shown in FIG. 9, the overall structure of the supply apparatus and its operation will not be described here repeatedly.

Figure 12:
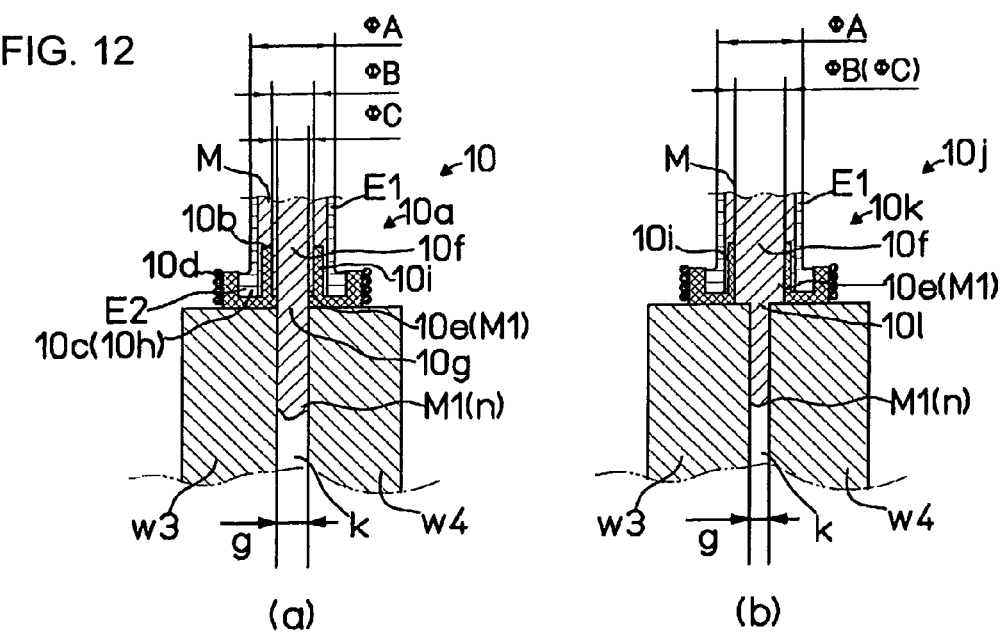
FIG. 12 is an enlarged partial front view of the molten metal supply apparatus of Example No. 1-3.
Figure 13:
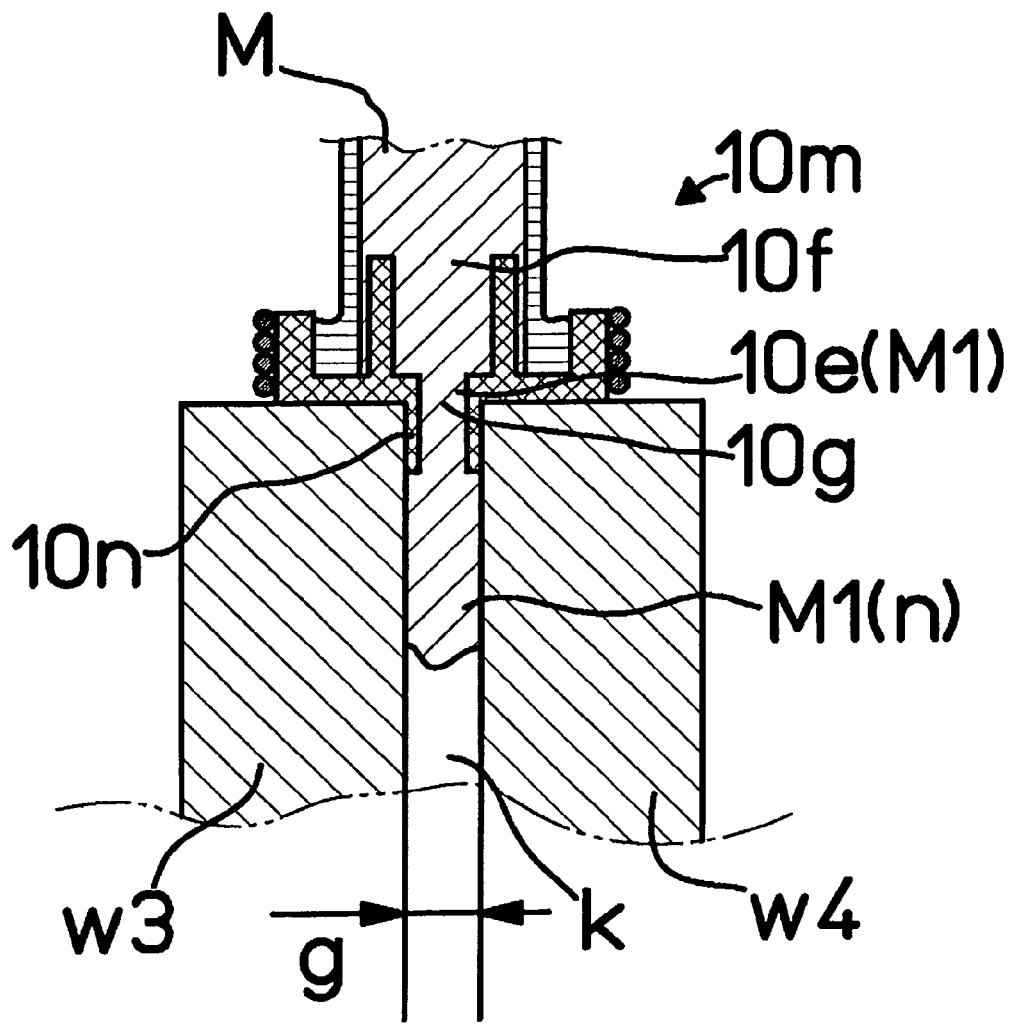
FIG. 13 is an illustration of an exemplar modified supply cylinder of FIG. 12.

While the above-described supply apparatus of Example No. 1-2 supplies molten solder M1 horizontally to the outer peripheral gap k between the glass substrates w3 and w4, the supply apparatus of Example No. 1-3 shown in FIG. 12 differs from the supply apparatus of Example No. 1-2 in that the supply apparatus of Example No. 1-3 employs a method of vertically supplying molten solder M1, utilizing gravity, and hence does not have any guide section.

The supply cylinder 10 shown in FIG. 12(a) has a shape that is like a bottomed round container having a top opening. Heater 10d for melting thread solder M is wound around the outer periphery of the supply cylinder 10. The annular projection formed at a central part of the supply cylinder 10 operates as melting section 10a for producing molten solder M1 and the top surface of the annular projection operates as melting surface 10b. An oxide removing section 10i is integrally formed at an upper part of the melting section 10a. Flow path 10e is arranged at the center of the supply cylinder 10 so as to extend between its first opening 10f disposed at the melting surface 10b and its second opening 10g disposed at the bottom surface of the supply cylinder 10. As in the case of the supply cylinder 9a shown in FIG. 10, the diameter øB of the first opening 10f is less than the diameter øA of thread solder M and the diameter øC of the second opening 10g is less than the size g of the outer peripheral gap k of the glass substrates w3 and w4. Additionally, a storage section 10c for storing the removed oxides E2 is formed around the melting section 10a as an annular groove and the oxides E2 stored in the storage section 10c is discharged by means of an oxide discharging section (not shown).

The supply cylinder 10 is held in such an attitude that the second opening 10g thereof is connected to the outer peripheral gap k of the glass substrates w3 and w4 that are disposed oppositely with their main surfaces where a bonding section n is to be formed taking an attitude of standing vertically so that the outer peripheral gap k and the flow path 10e can be connected to each other. When supplying molten solder M1 to the outer peripheral gap k, the second opening 10g is positioned so as to be brought into a state of being connected to the outer peripheral gap k as the bottom surface of the supply cylinder 10 where the second opening 10g is formed contacts both of the corresponding end facets of glass substrates w3 and w4.

With the above-described configuration of the supply means 10, the thread solder M let out from the thread solder supply section contacts the melting surface 10b to produce molten solder M1. Then, molten solder M1 is quickly supplied to the outer peripheral gap k of the glass substrates w3 and w4 by gravity. The structure of the supply cylinder 10 and its positional relationship relative to the glass substrates w3 and w4 are same as those of the above-described supply cylinder 9a. Therefore, it may be needless to say that the supply cylinder 10 can suppress mixing of the oxides E1 existing on the outer peripheral surface of the thread solder M1 with the molten solder M1 and also oxidation of the molten solder M1 during the process of supplying molten solder M1.

The supply cylinder 10j shown in FIG. 12(b) has a configuration basically same as the above-described supply cylinder 10 but differs from the latter only in that the diameter øC of the second opening 10l is greater than the size g of the outer peripheral gap k. The supply cylinder 10j having such a configuration can form a glass panel W having an excess solder section n1 just like the supply cylinder 9a described above by referring to FIG. 11(a).

The supply cylinder 10m shown in FIG. 13 also has a configuration basically same as the supply cylinder 10 but differs from the latter in that the supply cylinder 10m additionally has a tubular guide section 10n connected to below the second opening 10g. The supply cylinder 10m having such a configuration can smoothly supply molten solder M1 to the outer peripheral gap k of the glass substrates w3 and w4.

[Second Mode of Carrying Out the Invention]

A molten metal supply cylinder according to (18) described above, a molten metal supply apparatus incorporating such a supply cylinder and a molten metal supply method will be described below by way of Examples No. 2-1 and No. 2-2 showing a desirable mode of carrying out the present invention.

Example No. 2-1

A molten metal supply cylinder and a molten metal supply apparatus incorporating such a supply cylinder will be described below as Example No. 2-1 by referring to FIGS. 14 to 24. Note that the components that are common to the supply cylinder of FIG. 14 and the exemplar modified supply cylinder s shown in FIGS. 19, 20, 23 and 24 are denoted respectively by the same reference symbols and will not be described repeatedly.

The supply apparatus 11 of Example No. 2-1 is designed to manufacture a glass panel Was described earlier by referring to FIGS. 51(*a*) and 51(*b*) and includes a mounting means 11*a*, a thread solder supply means 11*d*, a molten solder supply means 12, a moving means 11*g*, a control means 11*o*, an airtight chamber 11*l* and an atmosphere control means 11*r* so as to be suitable for automation. Each of the components will be described below.

[Mounting Means]

Of the mounting means 11*a*, reference symbol 11*b* denotes a table that can place unbonded body WO of a combination of a first glass substrate (to be referred to as first substrate in Example No. 2-1 hereinafter and also in Example No. 2-2) w3 and a second glass substrate (to be referred to as second substrate in Example No. 2-1 hereinafter and also in Example No. 2-2) w4 that oppositely positioned so as to produce a predetermined gap between the main surfaces S thereof so as to make it take a horizontal attitude. As a preferable configuration of the table 11*b*, the table 11*b* contains a panel-shaped heat emitting body that can heat the unbonded body WO. Then, the glass substrates w3 and w4 can be prevented from being damaged by the stress generated due to the temperature difference between the molten solder and the glass substrates w3 and w4 and the wettability of molten solder relative to the glass substrates w3 and w4 is raised to by turn improve the bonding performance of the bonding section and the glass substrates w3 and w4 by heating the glass substrates w3 and w4 to about the melting temperature of the molten solder by means of this heat emitting body.

Figure 16:
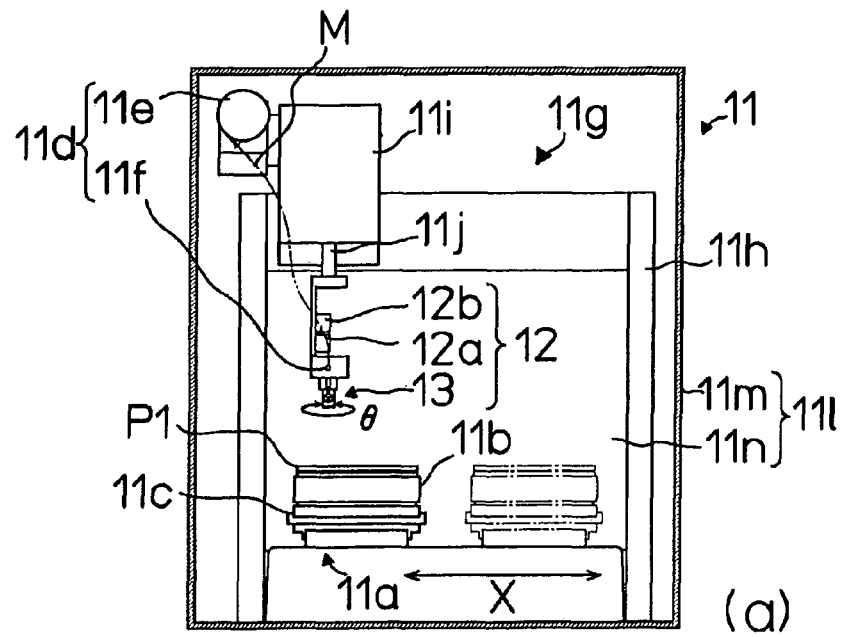
FIG. 16 is a front view and a lateral view of the molten metal supply apparatus of Example No. 2-1.
Figure 16:
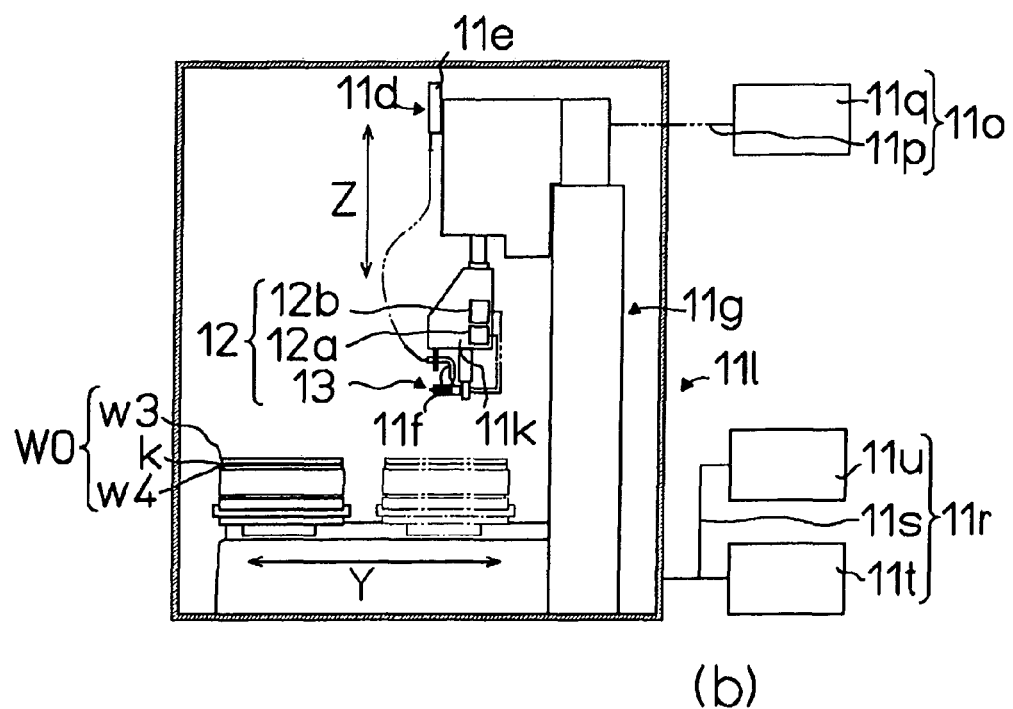

Reference symbol 11*c* denotes a table moving section at the top of which a table 11*b* is arranged and which can move the table 11*b* vertically and horizontally relative to the sheet of the drawing. Note that, as shown in FIG. 16(*a*), an axis that extends in the moving direction of the table moving section 11*c* and runs in parallel with the sheet of the drawing is referred to as X-axis and an axis that runs perpendicularly to the X-axis is referred to as Y-axis, whereas an axis that is orthogonal relative to both the X-axis and the Y-axis is referred to as Z-axis. The unbonded body WO is placed on the table 11*b* in such a way that the main surfaces S of the glass substrates w3 and w4 that constitute the unbonded body WO are substantially parallel to the plane that includes the X-axis and the Y-axis and the outer peripheral end facets of the unbonded body WO are substantially parallel to the Z-axis.

[Thread Solder Supply Means]

Of the thread solder supply means 11*d* shown as an exemplar means for supplying the material for forming molten solder, reference symbol 11*e* denotes a bobbin-shaped thread solder feeding section that carries a wire-shaped material made of an SnAgAl alloy (to be referred to as thread solder hereinafter) wound around the thread solder feeding section and is adapted to be driven to rotate by a motor or the like (not shown) and quantitatively feed out thread solder M. Reference symbol 11*f* denotes a substantially tubular thread solder guide section having a through hole that is a guide path through which thread solder M can pass and which has two open ends. The thread solder guide section is positioned and secured by the securing member 11*k* of the moving means 11*g*. Thread solder M formed with a diameter of about 2 mm is employed in the supply apparatus 11 of this example. In the initial state, the thread solder M is set in a state where it is wound around the thread solder feeding section 11*e* and a front end part of the thread solder M that is drawn out from the thread solder feeding section 11*e* is inserted into the guide path from the lead-in opening of the thread solder guide section 11*f*, projecting from a supply opening and directed toward the flow-in port 14*a* of the supply cylinder 14 (see FIG. 14).

[Molten Solder Supply Means]

Figure 14:
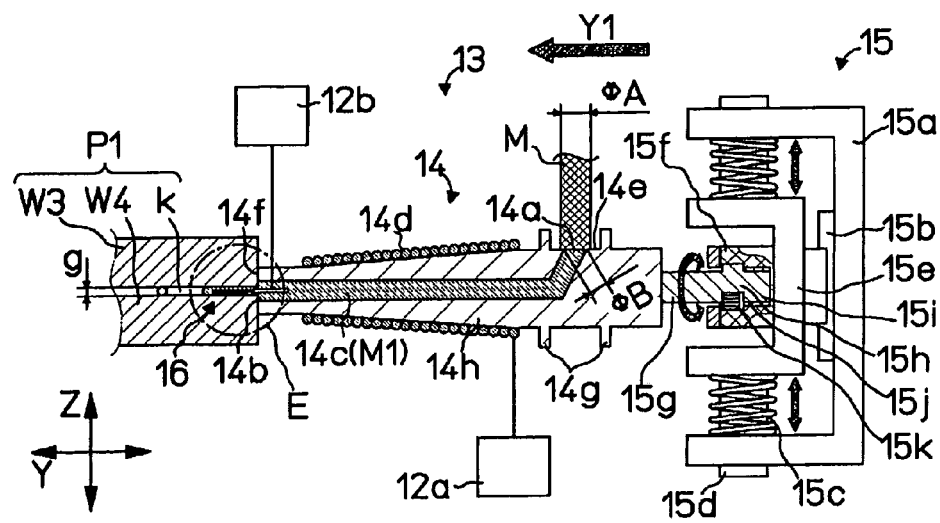
FIG. 14 is an enlarged partial cross-sectional view of the molten metal supply apparatus of Example No. 2-1.

Of the molten solder supply means 12, reference symbol 13 denotes a molten solder supply section. As shown in FIG. 14, the molten solder supply section 13 includes a supply cylinder 14, a guide section 16 fitted to the front end of the supply cylinder 14 and a support section 15 that is a floating mechanism for supporting the supply cylinder 14.

Firstly, the supply cylinder 14 will be described below. Of the supply cylinder 14, reference symbol 14*h* denotes a cylinder body having a substantially hollow cylindrical shape whose left end has a reduced diameter. The cylinder body 14*h* has a surface (to be referred to as melting surface in Example No. 2-1 and Example No. 2-2 hereinafter) 14*e* disposed at a right top section of the cylinder body 14*h* and another surface (to be referred to as ejecting surface in Example No. 2-1 and Example No. 2-2 hereinafter) 14*f* disposed at a left end section and is arranged in such a way that the ejecting surface 14*f* can be positioned in parallel with the corresponding outer peripheral end facet of the unbonded body WO with a slight gap interposed between them. A pair of annular barriers 14*g* is formed at the supply cylinder 14 of this example with the melting surface 14*e* interposed between them and the bottom surface of the recessed section sandwiched by the two barriers 14*g* operates as melting surface 14*e*. The cylinder body 14*h* is preferably made of stainless steel or the like having a high thermal conductivity and a Cr layer is preferably formed on the melting surface 14*e* and also on the ejecting surface 14*f* in order to cause molten solder M1 to smoothly flow because such a layer is highly wettable relative to molten solder M1.

Reference symbol 14*d* denotes a heating member wound around the outer peripheral surface of the cylinder body 14*h* disposed between the melting surface 14*e* and the ejecting surface 14*f* to heat the cylinder body 14*h* to not lower than the melting temperature of thread solder M. The heating member 14*d* is connected to a heating control section 12*a* for controlling the heating temperature and the heat emission pattern of the heating member 14*d*.

Reference symbol 14*c* denotes a flow path running through the inside of the cylinder body 14*h* and having a first opening 14*a* disposed at the melting surface 14*e* (to be referred to as flow-in port in Example No. 2-1 and Example No. 2-2 hereinafter) and a second opening 14*b* disposed at the ejecting surface 14*f* (to be referred to as ejection port in Example No. 2-1 and Example No. 2-2 hereinafter). The diameter, øB of the flow-in port 14*a* is less than the diameter øA of thread solder M. Note that the cross section of the flow path 14*c* is not limited to a circle and may, for example, be a rectangle.

Preferably, a Cr layer that is highly wettable relative to molten solder M1 is formed on the surface of the flow path 14*c* in order to cause molten solder M1 to flow smoothly. Such a Cr layer may be replaced by a layer made of Al, Mo, W, V, Nb, Ta, Ag or Ni. Furthermore, the surface of the flow path 14*c* is preferably subjected to a nitriding treatment, which is an anti-corrosion treatment, so that the surface may not be corroded by molten solder M1 and impurities may not be mixed into molten solder M1.

Figure 18:
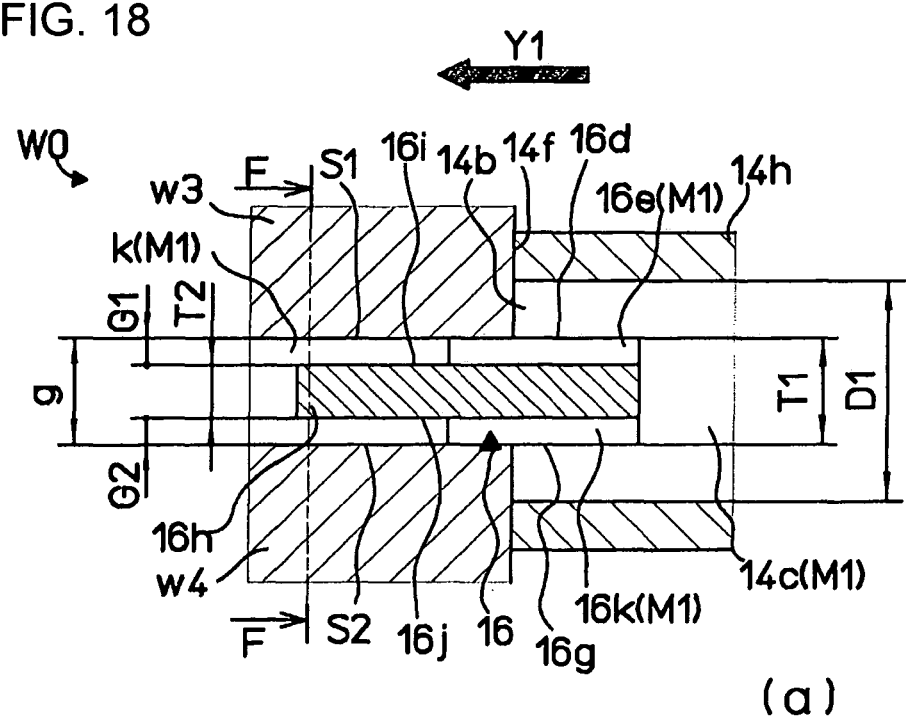
FIG. 18 is an enlarged cross-sectional view of the E section of FIG. 14 and a lateral view thereof.
Figure 18:
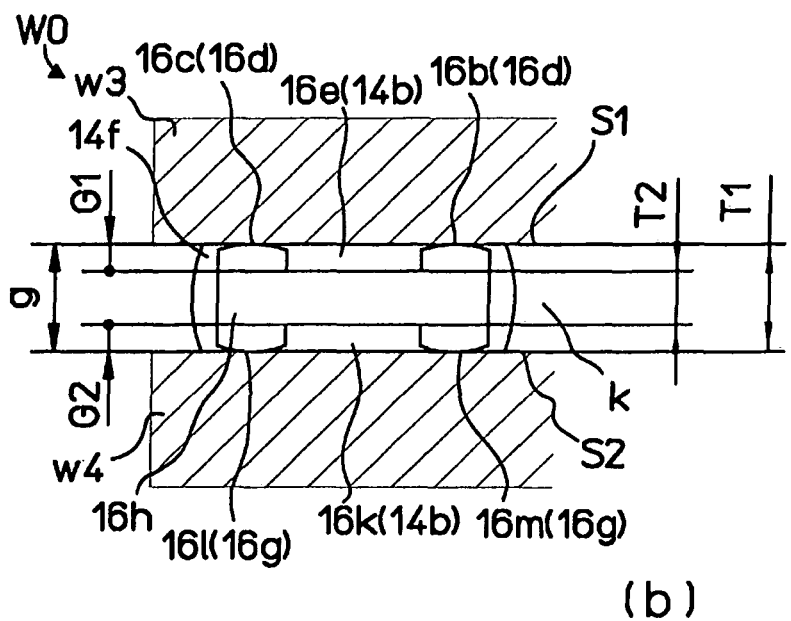
Figure 51:
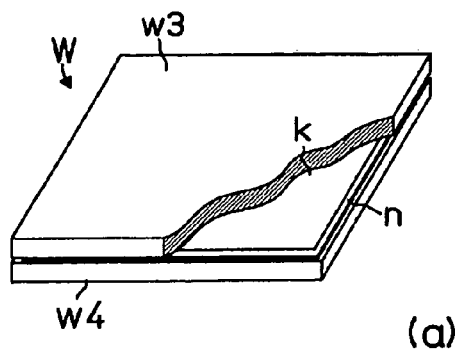
FIG. 51 is a schematic illustration of the configuration of another glass panel.
Figure 51:
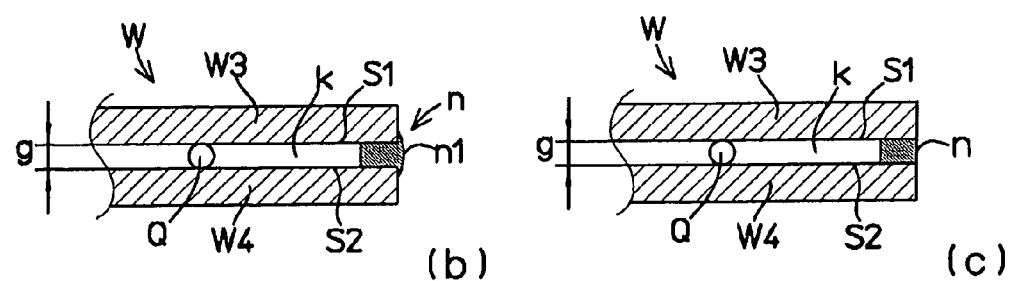
Figure 51:
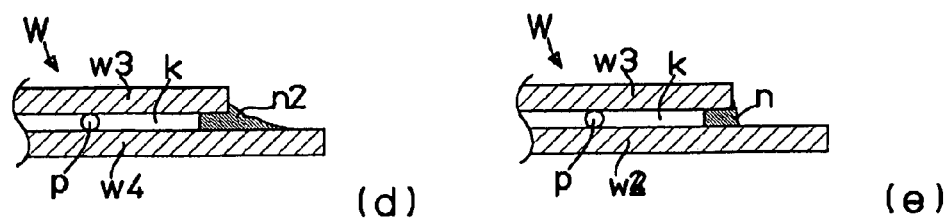

As shown in FIG. 18(*a*), from which molten solder M1 is omitted for the purpose of easy understanding, the diameter D1, of the ejection port 14*b* exceeds the size g of the outer peripheral gap k so that the molten solder M1 that gets to the ejection port 14*b* also contacts the outer peripheral end facet of the first substrate w3 and that of the second substrate w4 and hence is supplied not only into the outer peripheral gap k but also to the outer peripheral end facets of the glass substrates w3 and w4. Therefore, as shown in FIG. 51(*b*), a bonding section n that includes a projecting part n1, which tightly adheres to the outer peripheral end facets, is formed at the outer peripheral gap k of a glass panel W manufactured by using the ejection port 14*b* of this example.

Figure 19:
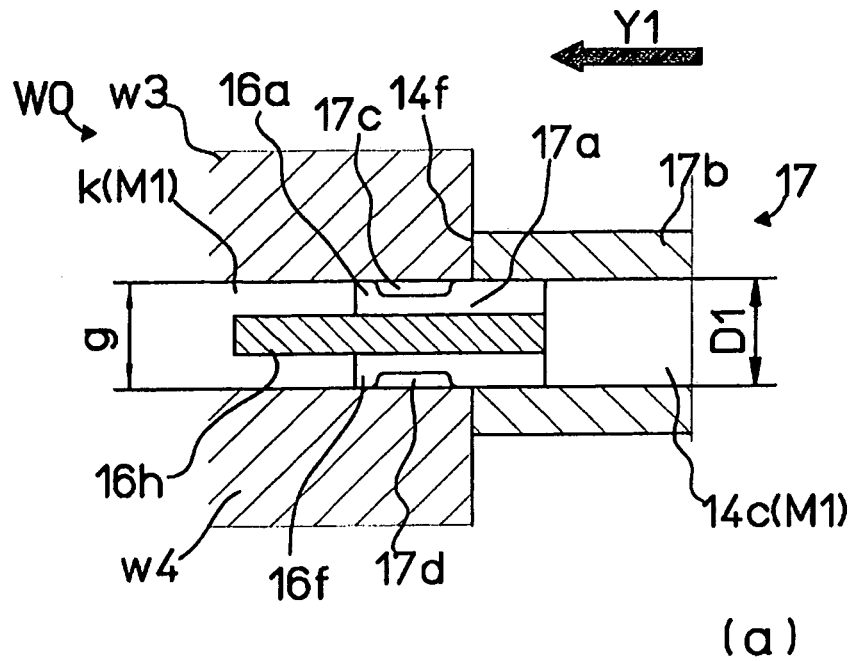
FIG. 19 is an illustration of another exemplar modified supply cylinder of FIG. 14.
Figure 19:
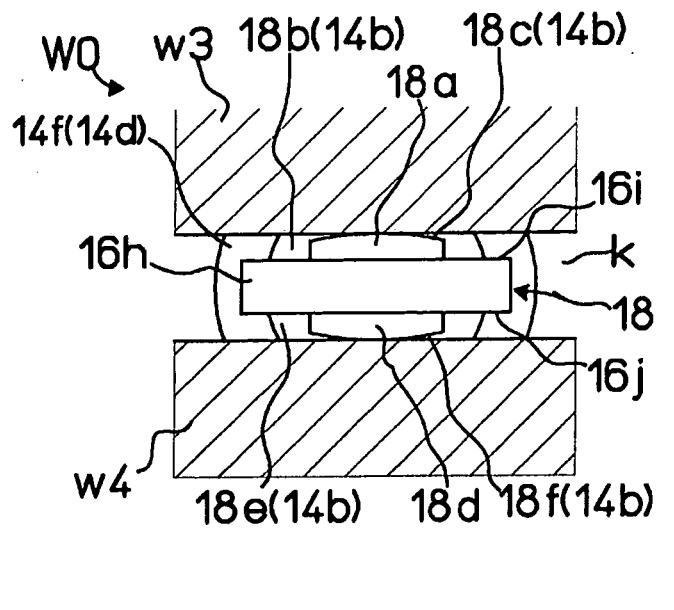
Figure 20:
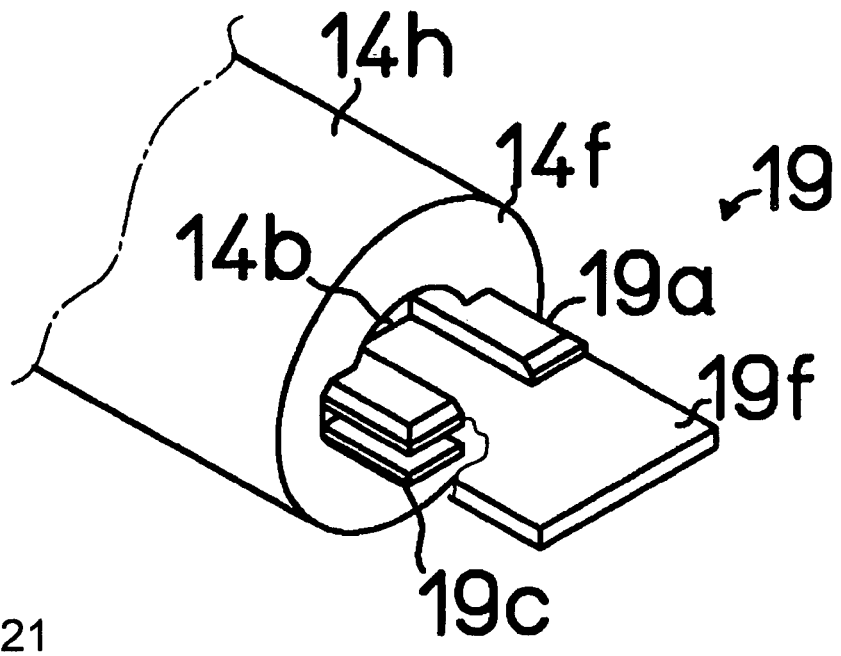
FIG. 20 is an illustration of still another exemplar modified supply cylinder of FIG. 14.

On the other hand, as shown in FIG. 19(*a*) illustrating supply cylinder 17, from which molten solder M1 is omitted for the purpose of easy understanding, the diameter D1 of the ejection port 17*a* may be made to be not greater than the size g of the outer peripheral gap k. In the case of this example, the ejection port 17*a* is open only to the inside of the outer peripheral gap k so that the molten solder M1 that gets to the ejection port 17*a* is filled only into the outer peripheral gap k. Therefore, as shown in FIG. 51(*c*), a bonding section n is formed only in the outer peripheral gap k of a glass panel W manufactured by using the supply cylinder 17 of this example. In the case of this mode of forming this ejection port 17*a*, the fluidity of molten solder M1 can fall because its flow resistance rises when the flow path 14*c* is made to have a diameter D1 that is same as the diameter of the ejection port 17*a* along all its length. Therefore, the flow path 14*c* preferably has a substantially conical profile and is tapered toward the ejecting surface 14*f* at an end part thereof so as to make the diameter of the ejection port 17*a* not greater than the size g of the outer peripheral gap k at the ejecting surface 14*f* where molten solder M1 is actually ejected.

As shown in FIG. 14, the front end of the thread solder M is set in an attitude of being directed to the flow-in port 14*a* of the supply cylinder 14 in the thread solder guide section 11*f*. Thus, the front end surface of the thread solder M that is quantitatively fed out from the thread solder feeding section 11*e* contacts the melting surface 14*e* in an attitude of closing the flow-in port 14*a*. As the thread solder M contacts the melting surface 14*e* that is heated by the heating member 14*d*, the thread solder M melts to produce molten solder M1. The molten solder M1 that flows in from the flow-in port 14*a* moves through the flow path 14*c* toward the left end and is ejected from the ejection port 14*b*. Note that the cylinder body 14*h* is positioned and secured to securing member 11*k* in such a way that the above-described positional relationship of the thread solder M fed out from the thread solder guide section 11*f* and the melting surface 14*e* can be maintained.

As described above, in the supply apparatus 11 of the example, the supply cylinder 14 itself melts the solid thread solder M that is supplied from the thread solder supply means 11*d* to produce molten solder M1. Alternatively, however, an arrangement of causing molten solder to be pushed out from a container adapted to store solider in a molten state by its own weight or under pressure can be incorporated in the supply apparatus 11. Likewise, another supply mechanism may be incorporated so long as such a mechanism is not against the object of the present invention.

Now, the guide section 16 will be described below. The guide section 16 is so formed as to be inserted into the outer peripheral gap k of unbonded body WO along a horizontal plane as shown by arrow Y1 in FIG. 14 in a direction of heading from the outer peripheral end facet of the unbonded body WO toward the inside thereof (to be referred to as inserting direction hereinafter) to guide and supply the molten solder M1 ejected from the ejection port 14*b* of the supply cylinder 14 to the outer peripheral gap k. Therefore, the guide section 16 is fitted into a fitting groove formed at about a center part of the ejecting surface 14*f* in the direction of the Z-axis so as to cross the ejection port 14*b*.

Figure 17:
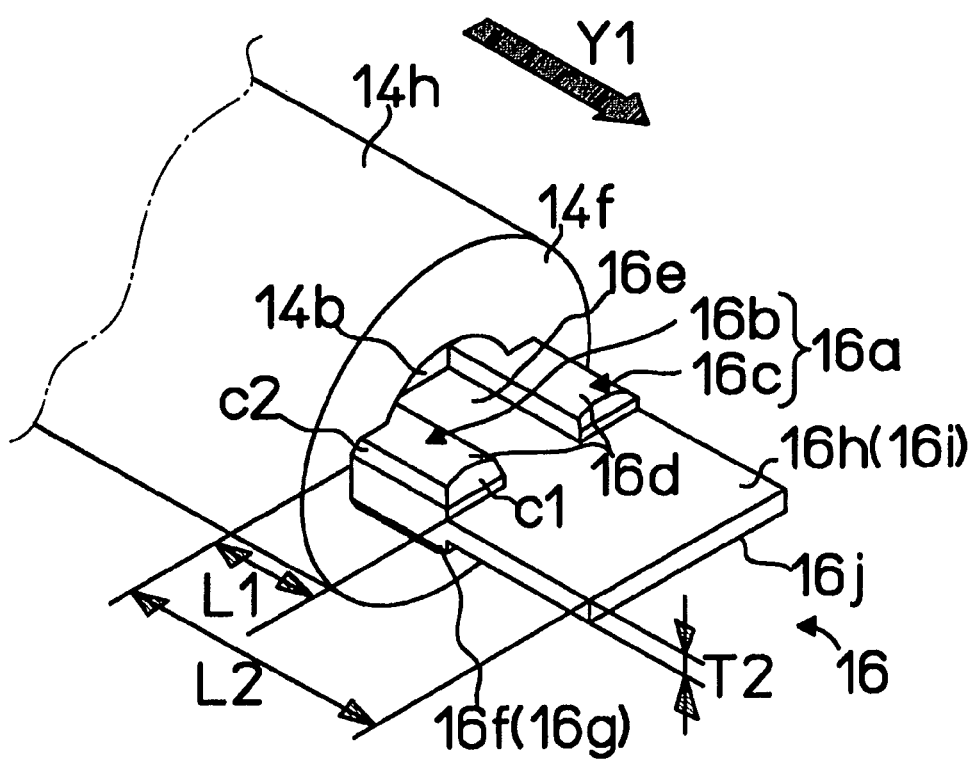
FIG. 17 is an enlarged partial perspective view of the supply cylinder of FIG. 14.

In FIGS. 17 and 18 illustrating the guide section 16 in detail, reference symbol 16*h* denotes a thin plate-like trowel section having a small thickness T2 relative to the size g of the outer peripheral gap k and projecting from the ejecting surface 14*f* of the supply cylinder 14 by length L2. The trowel section 16 includes a top surface (first plane surface) 16*i* facing the main surface S1 of the first substrate w3 of unbonded body WO placed on the mounting means 11*a* with a predetermined first gap G1 interposed between them and a bottom surface (second plane surface) 16*j* facing the main surface S2 of the second substrate w4 with a predetermined second gap G2 interposed between them. In this example, the first gap G1 and the second gap G2 are substantially of a same size. With a trowel section 16*h* having the above-described structure, the molten solder M1 supplied to the outer peripheral gap k by way of the ejection port 14*b* is injected to the top surface 16*i* and bottom surface 16*j* of the trowel section 16*h* to wet and spread between the gaps G1 and G2. However, the wetting and spreading of the molten solder M1 is limited to the front end (in FIG. 17 and the left end in FIG. 18(*a*)). Therefore, the width of the supplied molten solder M1 from the outer edge of the unbonded body WO is limited to the length L2 of the trowel section 16*h*. As the molten solder supply section 13 is moved horizontally along the outer edge of the unbonded body WO in a state where molten solder M1 is filled in the gaps G1 and G2, the molten solder M1 supplied to the gaps G1 and G2 is forced to flow by the horizontal move of the molten solder supply section 13 and thus molten solder M1 is applied to the glass substrates w3 and w4 and filled into the outer peripheral gap k along the outer edge of the unbonded body WO with a constant width due to the flowing molten solder M1.

As shown in FIGS. 14 and 16, an ultrasonic oscillation section 12*b* for transmitting ultrasonic waves to the trowel section 16*h* is incorporated in the supply apparatus 11 of this example as a preferable arrangement so as to apply ultrasonic waves to the contact interfaces of the molten solder M1 filled in the gaps G1 and G2 and the glass substrates w3 and w4, activate the molten solder M1 in order to make it fit well with the contact interfaces and remove the air bubbles and the foreign objects existing at the contact interfaces. More preferably, ultrasonic waves are applied so as to oscillate the trowel section 16*h* along the inserting direction of the guide section 16.

Preferably, a layer made of Cr, Al, Mo, W, V, Nb, Ag, Ni or Ta is arranged on the top surface 16*i* and also on the bottom surface 16*j* of the trowel section 16*h* in order to improve the wettability thereof relative to molten solder M1. Furthermore, the top and bottom surfaces 16*i* and 16*j* of the trowel section 16*h* are preferably subjected to a nitriding treatment, which is an anti-corrosion treatment, so that they may not be corroded by molten solder M1 and impurities may not be mixed into molten solder M1. Additionally, the top surface 16*i* and the bottom surface 16*j* of the trowel section 16*h* are preferably provided with projections and recesses that intersect the moving direction of the trowel section 16*h* in order to improve the follow-up performance of molten solder M1.

In the guide section 16 shown in FIGS. 17 and 18, reference symbol 16*a* denotes a first contact section and reference symbol 16*f* denotes a second contact section. The first contact section 16*a* is formed by a pair of projecting bodies 16*b* and 16*c* projecting from the top surface 16*i* of the trowel section 16*h*. Each of the projecting bodies 16*b* and 16*c* has a first contact surface 16*d* that contacts the main surface S1 of the first substrate w3 in a state where the guide section 16 is inserted into the outer peripheral gap k and its length in the direction of the X-axis is L1 as measured from the ejecting surface 14f of the supply cylinder 14 whereas its height in the direction of the Z-axis is substantially same as the size of the first gap G1.

Like the above-described first contact section 16a, the second contact section 16f is also formed by a pair of projecting bodies 16m and 16l projecting from the bottom surface 16j of the trowel section 16h. Each of the projecting bodies 16m and 16l has a second contact surface 16g that contacts the main surface S2 of the second substrate w4 in a state where the guide section 16 is inserted into the outer peripheral gap k and its length is L1 which is same as the first contact section 16a whereas its height is substantially same as the size of the second gap G2. Note that the first contact surfaces 16d and the second contact surfaces 16g are made to show a semi-cylindrical profile that is round in the transversal direction of the guide section 16 (the direction orthogonal relative to direction of inserting the guide section 16 in the horizontal plane) in view of its relationship with the floating mechanism, which will be described hereinafter.

The contact sections 16a and 16f having the above-described configuration will be described in greater detail below. As shown in FIG. 18, the thickness of the guide section 16 where the contact sections 16a and 16f are formed is T1, which is the sum of the thickness T2 of the trowel section 16h and the heights of the contact sections 16a and 16f (the height from the top surface 16i of the trowel section 16h to the first contact surfaces 16d and the height from the bottom surface 16j of the trowel section 16h to the second contact surfaces 16g). The thickness T1 is substantially equal to or slightly less than the size g of the outer peripheral gap k so that the contact sections 16e and 16f can slide in the outer peripheral gap k, respectively contacting the main surfaces S1 and S2 of the glass substrates. Thus, as the guide section 16 is inserted into the outer peripheral gap k, the contact surfaces 16d and 16g respectively contact the main surfaces S1 and S2 and the guide section 16 is brought into a state of being fitted in the outer peripheral gap k.

The height from the top surface 16i of the trowel section 16h to the first contact surfaces 16d that is the height of the first contact sections 16a is equal to the gap G1 and the height from the bottom surface 16j of the trowel section 16h to the second contact surfaces 16g that is the height of the second contact sections 16f is equal to the gap G2. Thus, as a result, when the trowel section 16h is inserted into the outer peripheral gap k, it is positioned in the direction of the Z-axis to produce the first gap G1 and the second gap G2. Then, as the molten solder supply section 13 is moved horizontally along the corresponding outer peripheral end facet of the unbonded body WO so as to supply molten solder M1 into the outer peripheral gap k, the guide section 16 moves while the contact sections 16a and 16f constantly and respectively sliding on the main surfaces S1 and S2 so that the size of the first gap G1 and that of the second gap G2 are held to a constant value.

While the height of the first contact section 16a and that of the second contact section 16f, or the size of the first gap G1 and that of the second gap G2, are equal to each other in this example, the sizes may be appropriately defined according to the characteristics of molten solder M1 and may be made different relative to each other. If such is a case, the first gap G1 is preferably made larger than the second gap G2 because the supplied molten solder M1 flows down by gravity.

Preferably, the first contact surfaces 16d and the second contact surfaces 16g are subjected to an Ni water-repellent plating process and a surface smoothing process in order to improve their slidability relative to glass substrates w3 and w4. As shown in FIG. 19(a), illustrating an exemplar modified guide section of the guide section of FIG. 14, the contact sections 16a and 16f may respectively be provided with recessed sections 17c and 17d at intermediate parts thereof as viewed in the inserting direction of the guide section 16. As such recessed sections 17c and 17d are provided respectively in the contact sections 16a and 16f to reduce the contact areas relative to the glass substrates w3 and w4 so as to reduce the slide resistance, the molten solder supply section 13 can be moved smoothly and suppress any possible damage that the glass substrates w3 and w4 may have. If necessary, the contact sections 16a and 16f may respectively be made to be brought into point contact with the main surfaces S1 and S2.

Additionally and preferably, in order to facilitate insertion of the unbonded body WO into the outer peripheral gap k, a C face or an R face is formed at each of the angled parts produced by one of the surfaces C1 facing the corresponding outer peripheral end facet of the unbonded body WO and one of the related lateral surfaces C2 in the inserting direction Y1 shown in FIG. 17. Such C faces or R faces can be formed by cutting, grinding or etching the angled parts produced by the surfaces C1 and C2.

Additionally, as will be described in detail for the supply apparatus of Example No. 2-2, the contact sections 16a and 16f preferably are provided with elasticity that allows them to be flexed by a certain quantity in the direction of the Z-axis in order to accommodate variances of the position and the size of the outer peripheral gap k of unbonded body WO.

In FIGS. 17 and 18, reference symbol 16e denotes a first guide groove formed at the top part of the trowel section 16h and reference symbol 16k denotes a second guide groove formed at the bottom part of the trowel section 16h. The guide grooves 16e and 16k are formed as rectangular grooves respectively between the projecting bodies 16b and 16c of the contact section 16a and between the projecting bodies 16m and 16l of the contact section 16f in the transversal direction of the guide section 16 in order to smoothly guide the molten solder M1 ejected from the ejection port 14b of the supply cylinder 14 to the trowel section 16h. In other words, the guide grooves 16e and 16k are arranged so as to divide the contact sections 16a and 16f along the respective centers. The guide grooves 16e and 16k directly links the trowel section 16h and the ejection port 14b.

While the profile of the guide grooves 16e and 16k including the cross section, the width and the depth thereof may be defined appropriately according to the fluidity of molten solder M1, preferably, in order to smoothly guide molten solder M1 to the trowel section 16h, the bottom surface of the guide groove 16e is made to be flush with the top surface 16i of the trowel section 16h and the bottom surface of the guide groove 16k is made to be flush with the bottom surface 16j of the trowel section 16h so as not to produce any step at the connecting sections of the guide grooves 16e and 16k and the trowel section 16h. Furthermore, a layer made of Cr, Al, Mo, W, V, Nb, Ta, Ag or Ni is formed on the inner surface of each of the guide grooves 16e and 16k in order to improve the wettability thereof relative to molten solder M1 and the inner surfaces are subjected to a nitriding treatment, which is an anti-corrosion treatment so that the inner surfaces may not be corroded by molten solder M1 and no impurity may be mixed into molten solder M1.

The configuration of the guide grooves is not limited to the mode of realization shown in FIGS. 17 and 18. Alternatively, in the case of guide 18 shown in FIG. 9(b) contact sections 18a and 18d may be arranged at a central part of the trowel section 16h in the transversal direction of the trowel section so as to provide upper two guide grooves 18b and 18c at the lateral sides of the contact section 18a and lower two guide grooves 18e and 18f at the lateral sides of the contact section 18*d* to make the ejection port 14*b* communicate with the top surface 16*i* and the bottom surface 16*j*.

While the trowel section and the contact sections may be formed as an integral structure, the trowel section and the contact sections have different functions and are required to have different characteristics. Therefore, as in the case of guide section 19 shown in FIG. 20 for example, the trowel section 19*f* may be formed by using a material that is highly wettable relative to molten solder M1 and the contact sections 19*a* and 19*c* may be formed by using a wear-resistant material that is highly slidable on glass substrates. Then, the guide section may be produced by assembling the trowel section 19*f* and the contact sections 19*a* and 19*b* that are separate from each other by bonding them or by means of screws or the like. Still alternatively, the trowel section and/or the contact sections may be formed integrally with the ejecting surface of the supply cylinder.

Figure 15:
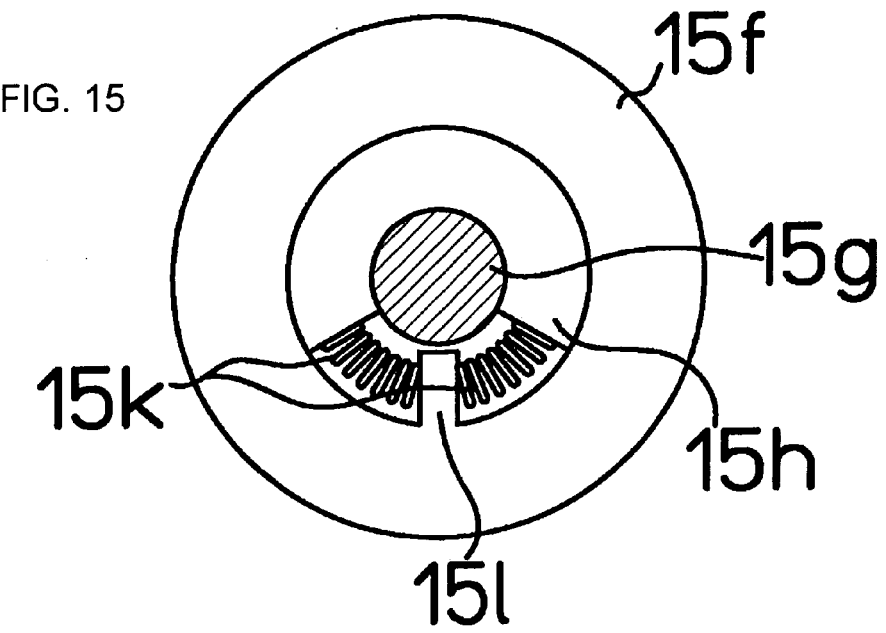
FIG. 15 is an enlarged partial cross-sectional view of the support section of FIG. 14.

Now, the support section 15 that is incorporated into the supply apparatus 11 of this example as a preferable arrangement will be described below by referring to FIGS. 14 and 15. The support section 15 of this example indirectly supports the guide section 16 by way of the supply cylinder 14 and operates as a floating mechanism that swings the guide section 16, following the force acting on the guide section 16 only in the direction of the Z-axis (the direction of the thickness of the outer peripheral gap k) and around the center axis of the supply cylinder 14 (the insertion axis of the guide section 16) (without moving the guide section 16 in a horizontal plane). Of the support section 15, reference symbol 15*g* denotes a cylindrical pillar-shaped support member connected to the right end facet of the supply cylinder 14 and a small diameter section 15*i* is formed at the right end thereof while a large diameter section 15*h* is formed adjacently relative to the small direction section 15*i* in the direction of the center axis. The small diameter section 15*i* is supported by bearing 15*j* arranged on bearing member 15*f* so as to make the support member 15*g* rotatable around the center axis of the supply cylinder 14. As shown in FIG. 15, that is an enlarged cross-sectional view of the support member 15*g* and the bearing member 15*f* of FIG. 14 as viewed from the left side, the large diameter section 15*h* shows a substantially fan-like shape formed by cutting out the lower side thereof and a pair of coil-shaped compression springs 15*k* are compressed and inserted between the opposite lateral surfaces of the projecting section 15*l* projecting from the inner surface of the bearing member 15*f* and the cut out of the large diameter section 15*h*. The pair of compression springs are so adjusted as to make the guide section 16 take a horizontal attitude in an unloaded state.

Reference symbol 15*e* denotes a U-shaped moving member that is open at its left side and the above-described bearing member 15*f* is fitted to the inner surface thereof. Reference symbol 15*b* denotes a linear guide operating as a linear drive member for moving the moving member 15*e* only in the direction of the Z-axis. A moving element is fitted to the outer lateral surface of the moving member 15*e*. Reference symbol 15*a* denotes a U-shaped casing that is open at its left side and considerably larger than the moving member 15*e*. A rail is fitted to the inside surface of the casing 15*a* for the linear guide 15*b* and the casing 15*a* is positioned at and secured to the securing means 11*k* of a moving means 11*g* (see FIG. 16). Reference symbol 15*c* denotes a pair of coil-shaped elastic compression springs respectively incorporated between the outer surface of the upper arm of the moving member 15*e* and the inner surface of the upper arm of the casing 15*a* and between the outer surface of the lower arm of the moving member 15*e* and the inner surface of the lower arm of the casing 15*a* in a compressed state. Reference symbol 15*d* denotes a pair of limiting shafts to limit radial movements of the compression springs 15*c*. One end for each of the reference symbol 15*d* is loosely wound around at through holes (not shown) bored through the upper arm and the lower arm of the casing 15*a* with the compression springs 15*c*. The opposite ends for each of the reference symbol 15*d* is also arranged on and secured to the upper arm and the lower arm of the moving member 15*e*.

Figure 22:
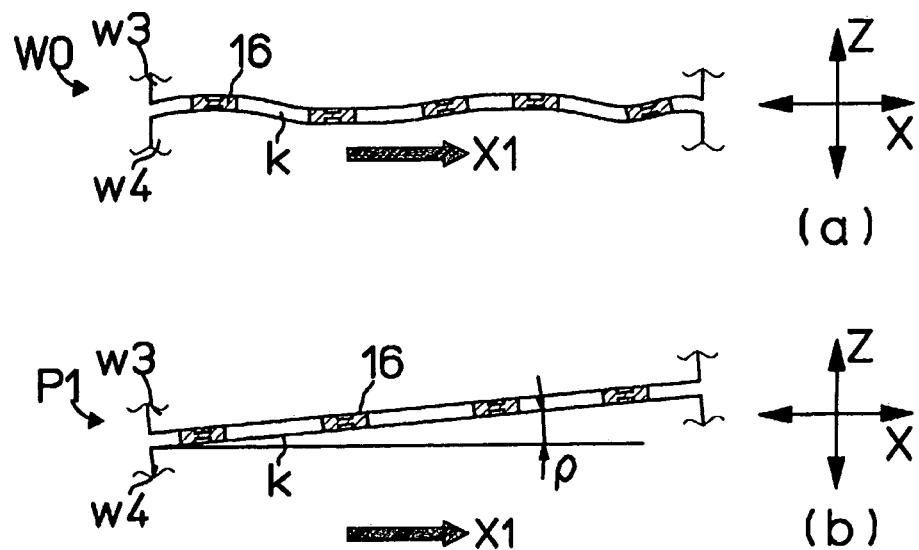
FIG. 22 is another illustration of the supply apparatus of FIG. 16 in operation.

The support section 15 having the above-described structure operates in a manner as described below. When, for example, the position of the outer peripheral gap k of unbonded body WO along the Z-axis is shifted as shown in FIG. 22 probably because the glass substrates w3 and w4 are combined or the table moving section 11*c* is driven to move only at an unsatisfactory level of accuracy, force of a predetermined magnitude acts on the guide section 16 around the center axis of the supply cylinder 14 or in the direction of the Z-axis by way of the contact sections 16*a* and 16*f* that are respectively held in contact with the glass substrates w3 and w4. The force acting around the center axis of the supply cylinder 14 is transmitted to the support member 15*g* by way of the supply cylinder 14. The support member 15*g* is restricted by the bearing member 15*f* so that the support member 15*g* can only move in the rotating direction and its large diameter section 15*h* is supported by the pair of compression springs 15*k*. Then, the support member 15*g* only moves around the center axis of the supply cylinder 14 to an extent that varies as a function of the acting force. The force acting on the guide section 16 in the direction of the Z-axis is transmitted to the moving member 15*e* by way of the supply cylinder 14 and other elements. The moving member 15*e* is restricted by the linear moving member 15*b* so that the moving member 15*e* can only move in the direction of the Z-axis and supported by the compression springs 15*c*. Then, the moving member 15*e* only moves in the direction of the Z-axis to an extent that varies as a function of the acting force.

[Moving Means]

As shown in FIG. 16, the moving means 11*g* includes a gate-like support body 11*h* and a lifting section 11*i* secured to a top edge part of the support body 11*h*. The lifting section 11*i* is provided at the bottom thereof with a lifting shaft 11*j* that can move up and down in the direction of the Z-axis in FIG. 16 and slue in the direction of O-axis. As described above, the thread solder guide section 11*f* and the molten solder supply section 13 are connected to the bottom end of the lifting shaft 11*j* by way of the securing member 11*k*.

[Control Means]

As shown in FIG. 16, the control means 110 includes a control section 11*q* connected to the above components of the supply apparatus 11 by way of electric communication lines 11*p* to control the operation of each of the components. More specifically, the control section 11*q* is a computer. The processing section (CPU) of the computer reads out and appropriately processes the program and the various data stored in the memory of the computer so as to direct the motor incorporated in the thread solder feeding section 11*e*, the heating control means 12*a*, the ultrasonic oscillation section 12*b* and the lifting section 11*i* and the table moving section 11*c* of the moving means 11*g* to respectively control the quantity of thread solder M to be supplied, the heating temperature of the heating member 14*d*, the output and the application pattern of the ultrasonic waves to be applied to the trowel section 16*h* and the moving routes and the moving speeds of the lifting section 11*i* and the table moving section 11*c* of the moving means 11*g*.

[Airtight Chamber]

As shown in FIG. 16, the airtight chamber 11*l* includes a cabinet 11*m* that produces an airtight space 11*n* for containing the above listed components of the supply apparatus 11.

[Atmosphere Control Means]

As shown in FIG. 16, the atmosphere control means 11*r* includes a gas supply section 11*t* that is equipped with a supply pump and can supply predetermined gas under predetermined pressure, a vacuum pump 11*u* for producing a vacuum condition in the airtight space 11*n* of the airtight chamber 11*l* and piping 11*s* for connecting the gas supply section 11*t*, the vacuum pump 11*u* and the airtight space 11*n* to control the airtight space 11*n* so as to make it have a predetermined atmosphere. Note that the gas supply section 11*t* can separately contain gases of a plurality of different kinds to be used selectively according to the application of the glass panel including, for example, argon gas and nitrogen gas, which are inert gases, hydrogen gas and carbon monoxide gas, which are reducing gases, and oxygen gas, which is an oxidizing gas. The gas supply section 11*t* can also mix any of such gases to a predetermined ratio and supply the mixture gas to the airtight space 11*n* by means of the mixing valve with which the gas supply section 11*t* is equipped.

Now, the operation of the supply apparatus 11 having the above-described configuration will be described below. First, a preparation step comes. As shown in FIG. 16, unbonded body WO having main surfaces S1 and S2 that face each other by way of a predetermined gap interposed between them by the gap maintaining member Q is placed at a predetermined position on the table 11*b* in a horizontal attitude. Then, the supply apparatus 11 is started. The supply apparatus 11 brings the airtight space 11*n* into an airtight state and exhausts air by means of the vacuum pump 11*u* to bring the inside of the airtight space 11*n* into a vacuum condition. Thereafter, the supply apparatus 11 supplies gas that contains oxygen to a predetermined ratio from the gas supply section 11*t* to the airtight space 11*n* to produce an atmosphere where molten solder M1 that is SnAgAl based solder containing easily oxidizable elements can be bonded to glass substrates w3 and w4 with ease. Additionally, the supply apparatus 11 makes the heat emitting body contained in the table 11*b* emit heat to heat the unbonded body WO to about the melting temperature of molten solder M1 and causes the ultrasonic oscillation section 12*b* to oscillate in order to transmit ultrasonic waves to be applied to molten solder M1 to the trowel section 16*h*.

Next comes a supply cylinder positioning step. The supply apparatus 11 lowers the lifting shaft 11*j* by means of the lifting section 11*i* and, if necessary, slues it to place the molten solder supply section 13 at a predetermined position. When the molten solder supply section 13 is positioned properly, the molten solder supply section 13 is placed at positions where the trowel section 16*h* of the guide section 16 can be inserted into the outer peripheral gap k of the unbonded body WO in the direction of the Z-axis and where the ejecting surface 14*f* of the supply cylinder 14 is held in parallel with the corresponding outer peripheral end facet of the unbonded body WO in the direction of the O-axis. Subsequently, the supply apparatus 11 places the unbonded body WO at a predetermined position by horizontally moving the table moving section 11*c* so that the ejecting surface 14*f* of the supply cylinder 14 and the corresponding outer peripheral end facet of the unbonded body WO face each other by way of a slight gap interposed between them. The guide section 16 is inserted into the outer peripheral gap k of the unbonded body WO in the process where the unbonded body WO is positioned in a horizontal plane. Since the a C face or an R face is formed at each of the angled parts of the contact sections 16*a* and 16*f* of the guide section 16 as described above, the contact sections 16*a* and 16*f* are smoothly inserted into the outer peripheral gap k. Furthermore, since the guide section 16 is supported by the support section 15 that is a floating mechanism, if the center of the outer peripheral gap k and that of the guide section 16 are displaced relative to each other in the direction of the Z-axis, for example, the guide section 16 moves vertically to compensate the displacement and the contact sections 16*a* and 16*f* are inserted into the outer peripheral gap k. When the operation of positioning the unbonded body WO is completed, the contact sections 16*a* and 16*f* are respectively held in contact with the main surfaces S1 and S2 of the glass substrates w3 and w4 so that the guide section 16 is held in a state of being fitted into the outer peripheral gap k and the trowel section 16*h* is positioned substantially at the center of the outer peripheral gap k in the direction of the Z-axis and gaps G1 and G2 are produced between the glass substrates w3 and w4 and the trowel section 16*h*.

Then comes a molten solder supply step. The supply apparatus 11 drives the motor of the thread solder feeding section 11*e* shown in FIG. 16 to let out thread solder M from the bottom end of the thread solder guide section 11*f*. The let out thread solder M contacts the melting surface 14*e* of the supply cylinder 14 that is heated by the heating member 14*d* to a temperature not lower than the melting temperature of thread solder M to produce molten solder M1. If oxides are formed at the outer peripheral surface of the thread solder M, the oxides are separated and removed by the outer peripheral edge of the flow-in port 14*a*, or the melting surface 14*e*, because the diameter øB of the flow-in port 14*a* that is open at the melting surface 14*e* is smaller than the diameter øA of thread solder M. As a result, the oxides are prevented from entering the flow path 14*c* and clean molten solder M1 that is substantially not mixed with oxides flows into the flow path 14*c*. Thereafter, the supply apparatus 11 continuously feeds out thread solder M at a predetermined rate and supplies molten solder M1 to the flow path 14*c* until the filling operation is completed. Since the oxide layer formed on the surface of thread solder M that is stored in the atmosphere is normally about tens of several µm, it is sufficient to make the difference between the diameter of the thread solder M and that of the flow-in port 14*a* (øA–øB) equal to about 1 mm.

The oxides removed at the melting surface 14*e* in the above-described supply step is accumulated around the flow-in port 14*e*, while its move is restricted by the barriers 14*g*, and subsequently pushed to flow by the following oxides to eventually get to the bottom surface of the supply cylinder 14, where it is collected by a collection means (not shown).

The molten solder M1 that flows into the flow path 14*c* as described above is ejected from the ejection port 14*b* and flows through the upper and lower guide grooves 16*e* and 16*k* of the guide section 16 and injected into the first gap G1 and the second gap G2 as shown in FIG. 18. The molten solder M1 supplied from the supply cylinder 14 passes through the guide grooves 16*e* and 16*k* and supplied into the gaps G1 and G2 in a state where the molten solder M1 is substantially sealed by the glass substrates w3 and w4 and the ejecting surface 14*f* so as not to contact oxygen. Therefore, molten solder M1 is applied to the main surfaces S1 and S2 of the glass substrates w3 and w4 in a state where oxidation of the surface of the molten solder M1 is suppressed to make it possible to raise the quality of the sealed glass panel.

Figure 21:
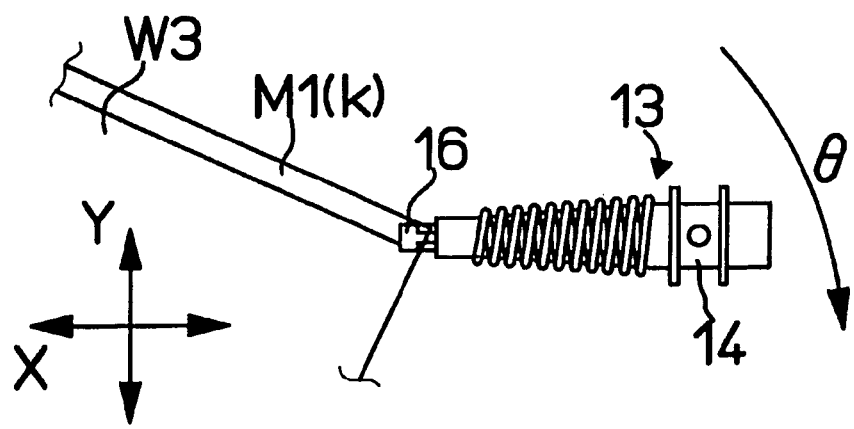
FIG. 21 is an illustration of the supply apparatus of FIG. 16 in operation.

As shown in FIG. 16, the supply apparatus 11 horizontally moves the unbonded body WO by driving the table moving section 11*c* to run in the direction of the X-axis or the Y-axis at a constant speed so as to cause the guide section 16 to make a full turn around the outer peripheral edge of the unbonded body WO and along a rectangular frame-like track, while maintaining the positional relationship between the molten solder supply section 13 and the unbonded body WO in a horizontal direction. Then, the molten solder M1 supplied to the gaps G1 and G2 wets the respective main surfaces S1 and S2 of the glass substrates w3 and w4 and becomes filled into the outer peripheral gap k with a width equal to the length L2 of the guide section 16 as the molten solder M1 is applied to the main surfaces S1 and S2. As shown in FIG. 21 that is an enlarged partial plan view of FIG. 16, the supply apparatus 11 combines the operation of controlling the move of the unbonded body WO in the directions of the X- and Y-axes by the table moving section 11c and the operation of controlling the move of the molten solder supply section 13 in the direction of the θ-axis by the lifting shaft 11j to move the guide section 16 horizontally along an arc-shaped track at the four corners of the unbonded body WO so as to fill molten solder M1 into the outer peripheral gap k also at the four corners.

While the guide section 16 is moving horizontally in the above-described supply step, the contact sections 16a and 16f are constantly and respectively held in contact with the main surfaces S1 and S2 of the glass substrates w3 and w4 and the move of the trowel section 16h in the direction of the Z-axis is restricted by the contact sections 16a and 16f. Then, as a result, the trowel section 16h does not touch the glass substrates w3 and w4 so that no damage that can adversely affect the bonding performance of the bonding section n relative to the main surfaces S1 and S2 thereof would be produced on the main surfaces S1 and S2. Furthermore, the sizes of the gaps G1 and G2 between the glass substrates w3 and w4 and the trowel section 16h that are an important factor for applying molten solder M1 well to the glass substrates w3 and w4 are maintained by the contact sections 16a and 16f projecting from the trowel section 16h to a height that is determined as a function of the gaps G1 and G2 during the supply step. As a result, uniform bonding strength can be realized for the bonding section n relative to the glass substrates w3 and w4.

Additionally, since the guide section 16 is supported by the support section 15 that is a floating mechanism, the guide section 16 moves up and down, following the vertical positional fluctuations of the outer peripheral gap k that can take place when the unbonded body WO moves such as when the outer peripheral gap k of the unbonded body WO undulates as shown in FIG. 22(a) or when the moving path of the table moving section 11c is inclined by angle ρ relative to the outer peripheral gap k as shown in FIG. 22(b). Then, as a result, the gaps G1 and G2 between the guide section 16 and the glass substrates w3 and w4 are held to a constant value.

Still additionally, as ultrasonic waves are applied to the contact interfaces of the molten solder M1 filled in the gaps G1 and G2 by way of the guide section 16 and the glass substrates w3 and w4 as shown in FIG. 14, the wettability of the molten solder M1 relative to the glass substrates w3 and w4 is raised so that molten solder M1 is sufficiently supplied into the narrow gaps G1 and G2. Furthermore, the air bubbles and the foreign objects such as oxide film existing at the contact interfaces are removed by ultrasonic vibrations to enhance the bonding strength of the bonding section relative to the glass substrates of the glass panel that is finished as product.

After the above-described supply step is completed and molten solder M1 is filled into all the outer peripheral gap k defined along the four sides of the unbonded body WO, the filled molten solder M1 is cooled and solidified in a molten solder cooling step to form a bonding section and the glass substrates w3 and w4 are bonded to each other to produce a glass panel W. The cooling step may be conducted by suspending the heat emission of the heating body while the unbonded body WO is placed on the table 11b as shown in FIG. 16 or by removing the unbonded body WO from the table 11b and moving it to some other place. From the viewpoint of automating the process of manufacturing glass panels, preferably the table 11b is made removable from the table moving section 11c and the table 11b itself on which an unbonded body WO is placed is made replaceable for each supply step.

As an example, the contact sections 16a and 16f are arranged at the rear end side of the trowel section 16h as viewed in the direction Y1 of inserting the guide section 16 in the above-described supply apparatus 11 as shown in FIGS. 17 and 18. The arrangement of the guide section 16 of this example is advantageous when the contact sections need to be driven to slide outside the bonding section in order to protect a wiring pattern as in the case of a glass panel where the wiring pattern to be incorporated in a flat type image display apparatus is formed inside the bonding section, for example. On the other hand, the bonding performance of the bonding section existing on the parts of the glass substrates w3 and w4 where the contact sections 16a and 16f respectively slide on the glass substrates will be inferior to that of the bonding section existing on the parts where the contact sections 16a and 16f do not slide on the respective glass substrates w3 and w4. Then, the bonding section existing on the former parts will be good for nothing so that a wide bonding section may need to be formed for compensation.

Figure 23:
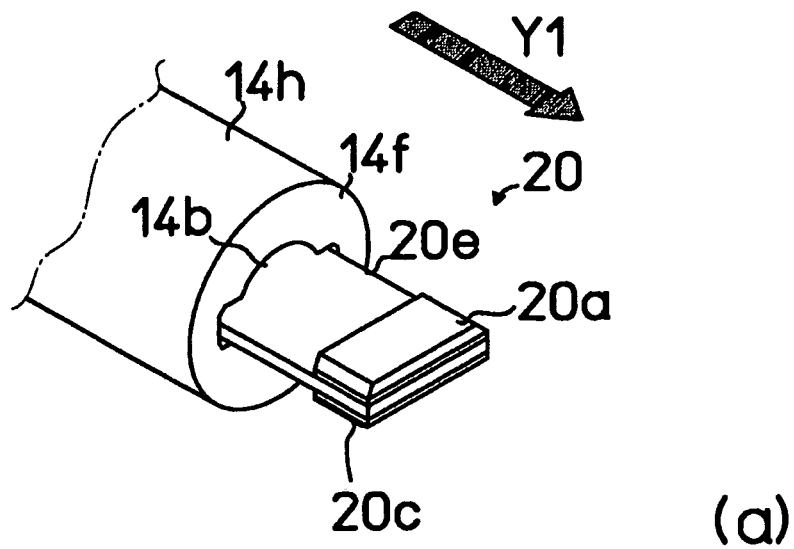
FIG. 23 is an illustration of still another exemplar modified supply cylinder of FIG. 14.
Figure 23:
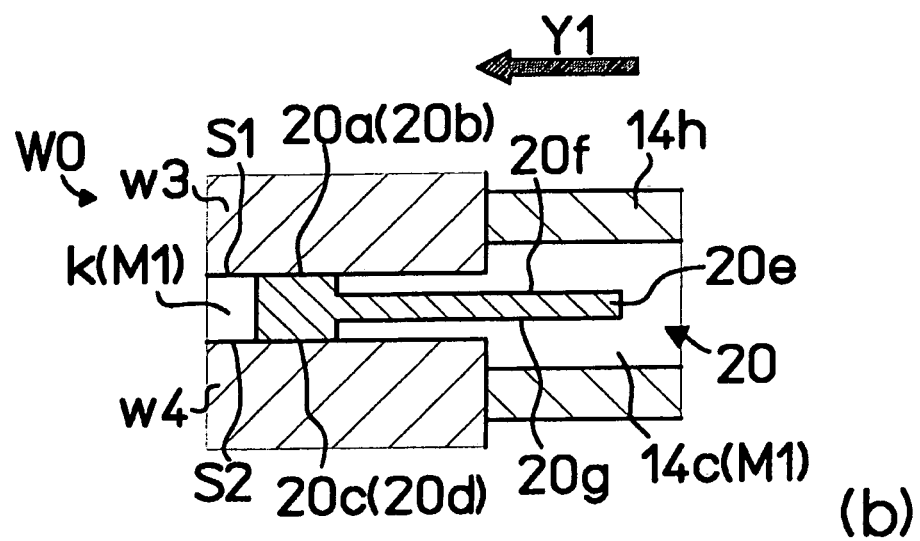

Therefore, when a relatively narrow bonding section needs to be formed, a guide section 20 as shown in FIG. 23 as an example is preferably employed. In the case of the guide section shown in FIG. 23, contact sections 20a and 20c are arranged at the front end of the trowel section 20e as viewed in the direction Y1 of inserting the guide section 20. Note that, in this example, the molten solder M1 ejected from the ejection port 14b of the supply cylinder 14 is directly supplied to the trowel section 20e so that no guide grooves are provided. When this guide section 20 is employed, the trowel section 20e does not contact the glass substrates w3 and w4 and the supplied molten solder M1 wets and spreads on the top surface and the bottom surface of the trowel section 20e and becomes filled into the gaps between the glass substrates as in the case of the above-described guide section 16 but the extent of wetting and spreading of molten solder M1 is limited by the contact sections 20a and 20c so that molten solder can be filled with a relatively narrow width from the outer edges of the unbonded body. Additionally, as the extent of wetting and spreading of molten solder is limited by the contact sections 20a and 20c, molten solder can be filled into the outer peripheral gap with a substantially constant width along the outer edges of the unbonded body.

Figure 24:
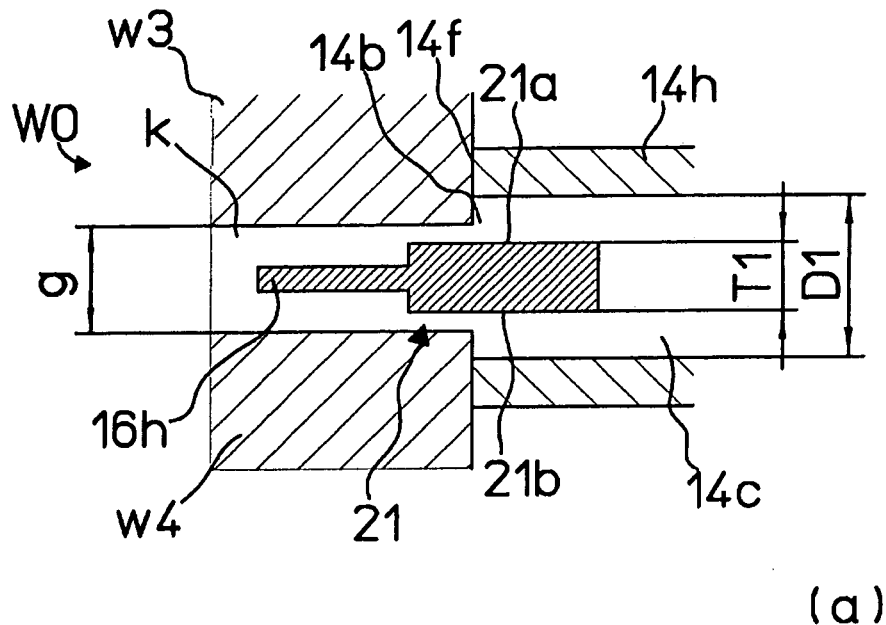
FIG. 24 is an illustration of still another exemplar modified supply cylinder of FIG. 14.
Figure 24:
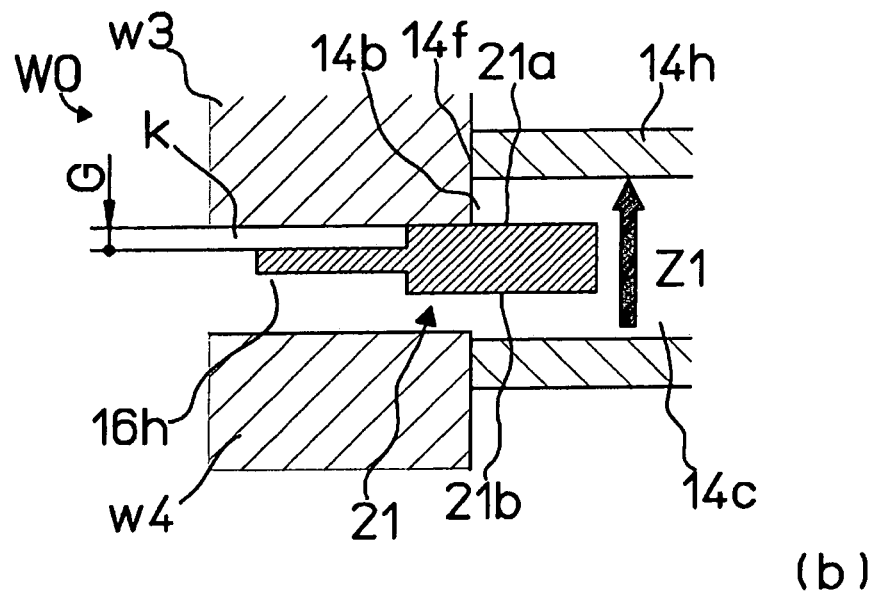

Furthermore, while the first contact section 16a and the second contact section 16f are brought into contact with the respective main surfaces S1 and S2 of the first substrate w3 and the second substrate w4 simultaneously when the guide section 16 of the above-described supply apparatus 11 is inserted into the outer peripheral gap k as shown in FIGS. 17 and 18, the contact sections 21a and 21b may be normally held way from the respective main surfaces S1 and S2 without contacting them and brought into contact with the respective glass substrates w3 and w3 only when necessary as in the case of the guide section 21 shown in FIG. 24. More specifically, the guide section 21 has a basic structure substantially same as the guide section 16 and has a trowel section 16h, a first contact section 21a projecting from the top surface of the trowel section 16h and a second contact section 21b projecting from the bottom surface of the trowel section 16h but the thickness T1 of the part of the guide section 21 located at the contact sections 21a and 21b is less than the size g of the outer peripheral gap k as shown in FIG. 24(a). Therefore, when the guide section 21 is inserted into the outer peripheral gap k, the first contact section 21a faces the main surface S1 of the first substrate w3 with a first void gap interposed between them and the second contact section 21b faces the main surface S2 of the second substrate w4 with a second void gap interposed between them so that the contact sections 21a and 21b do not contact the respective main surfaces S1 and S2 when the guide section 21 is inserted. With such a guide section 21, if the position of the guide section 21 relatively shifts in the direction of arrow Z1 along the Z-axis during a molten metal supply step as shown in FIG. 24(b), the trowel section 16h is restricted by the contact sections 21a and 21b so that the trowel section 16h does not contact the glass substrates w3 and w4 and the glass substrates w3 and w4 are prevented from being damaged to consequently enhance the bonding quality of the bonding section.

The above-described floating mechanism incorporated into the support section is not necessarily needed. Besides, the contact surfaces of the contact sections of the guide section may be made flat surfaces and only a contact section may be formed on one of the surfaces of the trowel section. With such an arrangement, the glass substrates are prevented from being damaged to consequently enhance the sealing performance of the bonding section of the finished glass panel due to the effect of avoiding any contact between the main surfaces of the glass substrates and the trowel section when the outer peripheral gap of the unbonded body shows a high degree of dimensional accuracy and/or when the table moving section shows a high degree of running accuracy.

Example No. 2-2

Figure 25:
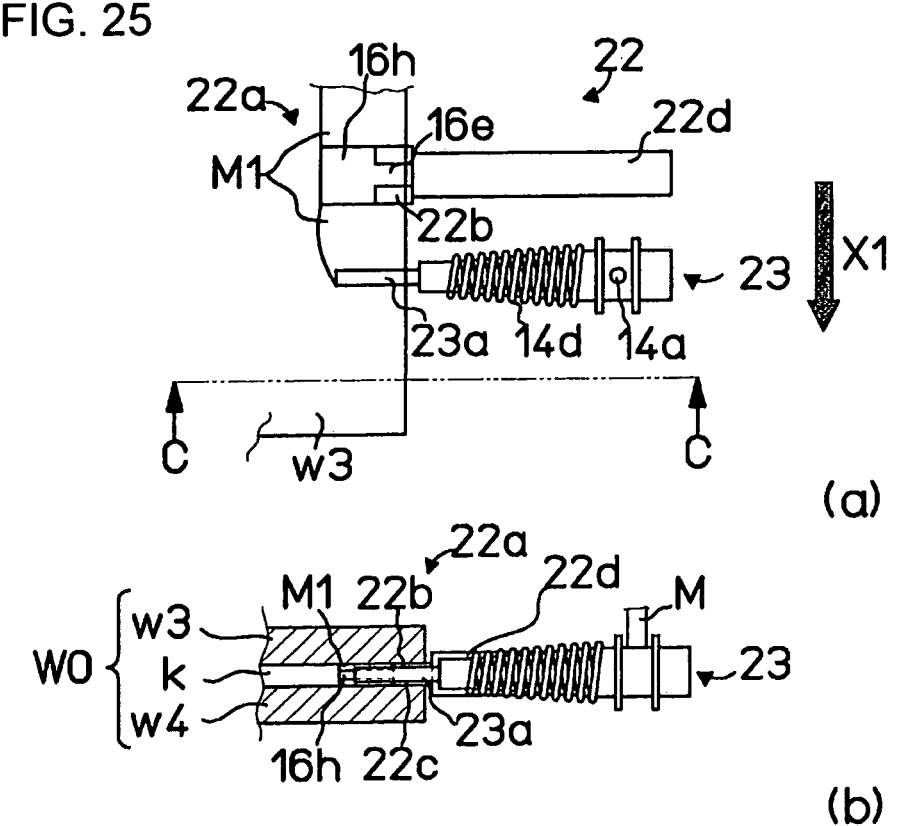
FIG. 25 is an enlarged partial plan view and a front view of the molten metal supply apparatus of Example No. 2-2.
Figure 26:
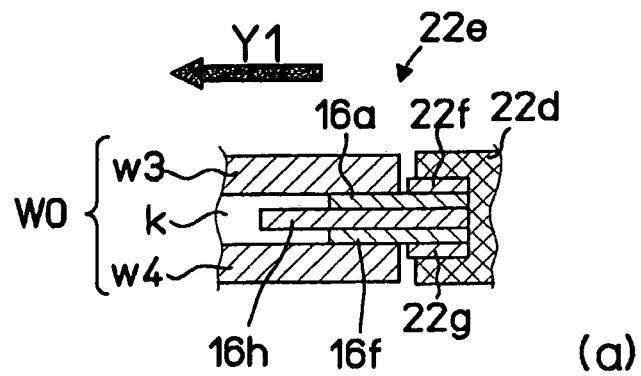
FIG. 26 is an enlarged partial cross-sectional view of FIG. 25.
Figure 26:
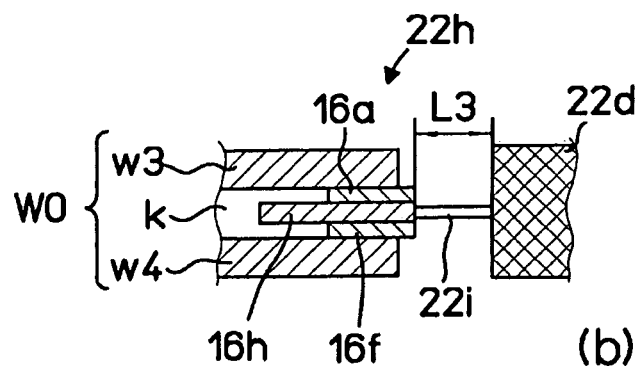
Figure 26:
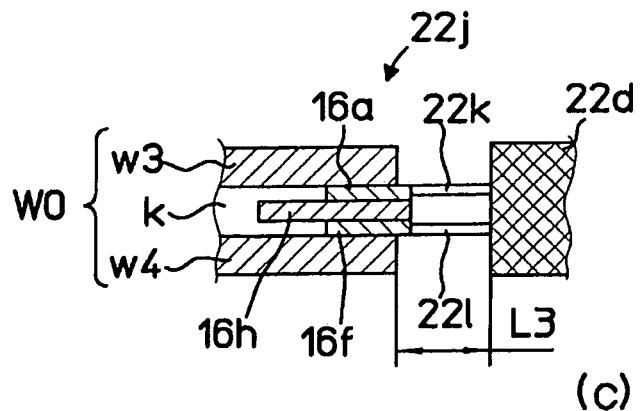

Now, a molten metal supply cylinder and a molten metal supply apparatus incorporating such a supply cylinder will be described below as Example No. 2-2 of the present invention by referring to FIGS. 25 and 26. Note that the supply apparatus of Example No. 2-2 has a configuration substantially same as the supply apparatus 11 described above by referring to FIG. 16 and differs from the latter only in terms of molten solder supply section. Therefore, FIGS. 25 and 26 show only parts related to the molten solder supply section and the other components are omitted. Additionally, the components same as those of the supply apparatus 11 are denoted respectively by the same reference symbols and their structures and operations will not be described in detail any further.

As shown in FIG. 25, the molten solder supply section 22 of the supply apparatus of Example No. 2-2 has a supply cylinder 23 having a configuration substantially same as the supply cylinder 14 and a guide section 22a arranged at the front end of support member 22d connected to a simple support section that does not operate as floating mechanism. In a supply step, the supply cylinder 23 is arranged in front of the guide section 22a in a state of being separated from the guide section 22a as viewed in the moving direction of the molten solder supply section 22 as indicated by arrow X1 in FIG. 25. The feed pipe 23a having an outer diameter that allows it to be inserted into the outer peripheral gap k of an unbonded body WO is arranged at the front end of the supply cylinder 23 to supply molten solder M1 into the outer peripheral gap k in front of the guide section 22a as viewed in the moving direction. A plurality of such feed pipes 23a may be arranged or a feed pipe having an elliptic cross section or a rectangular cross section may be employed. While the depth by which the feed pipe 23a is inserted may be determined as a function of the width of the bonding section to be formed, it is effective to use a plurality of feed pipes that can be inserted by different depths when a wide bonding section is to be formed. Preferably the feed pipe 23a is coated with resin on the surface thereof or made of a soft material so as not to damage the glass substrates w3 and w4 when the feed pipe 23a is brought into contact with them.

The guide section 22a of this example has elasticity that allows it to be flexed in the direction of the Z-axis that is the direction of the thickness of the outer peripheral gap k or around the center axis of the supply cylinder 23 instead of a floating mechanism that the supply apparatus of Example No. 2-1 has. More specifically, referring to FIG. 25, the upper and lower contact sections 22a and 22c of the guide section 22a are made of an elastic material such as metal or resin so as to make the contact sections 22a and 22c flexible so that, when the position of the outer peripheral gap k shifts, the contact sections 22b and 22c are flexed and can follow the shift. An elastic layer may be arranged on the contact surfaces of the contact sections 22b and 22c that are respectively to be brought into contact with the main surfaces S1 and S2 of glass substrates w3 and w4 if all the contact sections 22b and 22c are not made of an electric material. Such an arrangement provides an advantage of simplifying structure of the supply apparatus. It is particularly advantageous when the position of the outer peripheral gap k of the unbonded body WO fluctuates only to a relatively small extent in the direction of the Z-axis.

The guide section 22e shown in FIG. 26(a) is a first exemplar modified guide section of the above-described guide section 22a. The guide section 22e has elastic layers 22f and 22g formed respectively on the surfaces of the contact sections 16a and 16f at a rear part of the guide section 22e in the inserting direction Y1 and pinched and supported by a split front end of support member 22d. In a molten solder supply step, the contact surfaces of the contact sections 16a and 16f of the guide section 22e where the respective elastic layers 22f and 22g are not formed respectively contact the glass substrates w3 and w4 but the elastic layers 22f and 22g do not directly contact them. Therefore, the guide section 22a can accommodate any shift of the position of the outer peripheral gap k by means of the elastic layers 22f and 22g in a manner as described above. This arrangement is also advantageous in that the contact sections 16a and 16f and the elastic layers 22f and 22g can be formed by using different suitable materials so that they may effectively operate to realize their respective functions.

The guide section 22h shown in FIG. 26(b) is a second exemplar modified guide section of the above-described guide section 22a. The guide section 22h has an elastic section 22i disposed between the trowel section 16h and the contact sections 16a and 16f that are to be inserted into the outer peripheral gap k of an unbonded body WO and the support member 22d. The elastic section 22i is formed to show a thin plate-shaped profile projecting from the corresponding end facet of the support section 22d by a length of L3 so as to be flexible in the direction of the Z-axis.

The guide section 22j shown in FIG. 26(c) is a third exemplar modified guide section of the above-described guide section 22a. The guide section 22j has a pair of elastic sections 22k and 22l, or an upper elastic section 22k and a lower elastic section 22l, disposed between the trowel section 16h and the contact sections 16a and 16f that are to be inserted into the outer peripheral gap k of an unbonded body WO and the support member 22d. The elastic section 22k and the elastic section 22l are formed to show a thin plate-shaped profile and arranged respectively at the back of the contact section 16a and at the back of the contact section 16*f*. They project from the corresponding end facet of the support section 22*d* by a length of L3. This arrangement provides an advantage that, when the position of the outer peripheral gap k is shifted in the direction of the Z-axis, the elastic sections 22*k* and 22*l* of the guide section 22*j* are displaced like a link, the trowel section 16*h* and the contact sections 16*a* and 16*f* operating integrally as fulcrum, and hence the trowel section 16*h* and the contact sections 16*a* and 16*f* can follow the shift, while maintaining a horizontal attitude relative to the outer peripheral gap k.

While a guide section selected from guide sections 22*a*, 22*e*, 22*h* and 22*j* is incorporated into the supply apparatus of Example No. 2-2 that does not have any floating mechanism, a guide section selected from guide sections 22*a*, 22*e*, 22*h* and 22*j* may be incorporated into the apparatus of Example No. 2-1 that has a floating mechanism according to material to be supplied.

While the unbonded body W0 includes glass substrates w3 and w4 having same dimensions in plan views in the above description for the purpose of easy understanding, the supply apparatus of Example 2-2 can accommodate glass substrates having different dimensions. An unbonded body including two glass substrates whose dimensions are different produces a step at an end thereof when the glass substrates are placed in position. Then, it is only necessary to make the ejecting surface of the supply cylinder show a profile that matches the step.

[Third Mode of Carrying Out the Invention]

A molten metal supply cylinder according to (25) described above, a molten metal supply apparatus incorporating such a supply cylinder and a molten metal supply method will be described below by way of Examples No. 3-1 and No. 3-2 showing a desirable mode of carrying out the present invention.

Example No. 3-1

Figure 27:
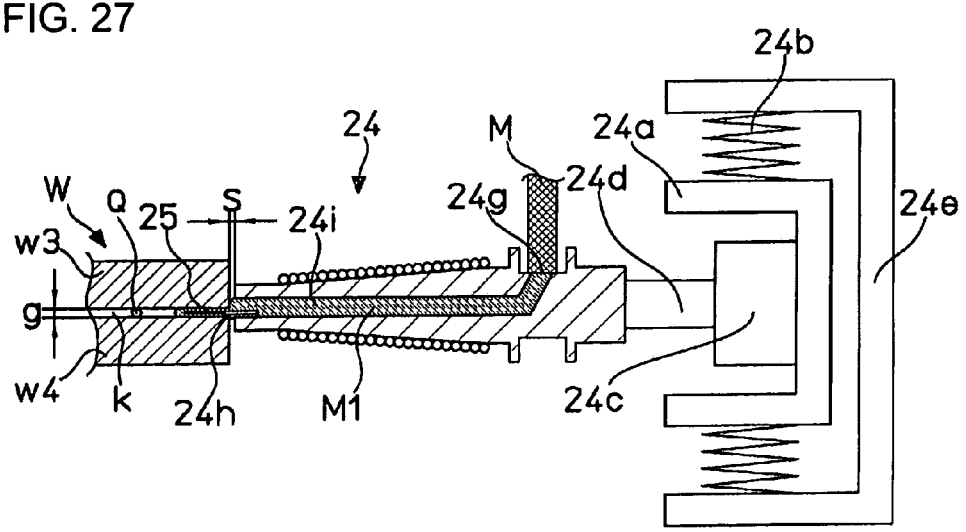
FIG. 27 is a schematic illustration of the configuration of the molten metal supply apparatus of Example No. 3-1.

A molten metal supply cylinder and a molten metal supply apparatus incorporating such a supply cylinder will be described below as Example No. 3-1 by referring to FIGS. 27 through 30. FIG. 27 is a partial cross-sectional view of the molten metal supply apparatus of this example, showing a principal part thereof and FIGS. 28 and 29 are respectively a cross-sectional view and a partial perspective view of the supply cylinder 24 of this Example.

Firstly, the molten metal supply apparatus will be described. The supply apparatus is designed to manufacture a glass panel W as described earlier by referring to FIGS. 51(*a*) and 51(*b*) and includes a supply cylinder 24, a holder 24*a* to which the supply cylinder 24 is fitted, a floating mechanism 24*b* for making the holder 24*a* float mainly up and down and a casing 24*e* that supports the floating mechanism 24*b*. The floating mechanism 24*b* can be realized as a structure provided with upper and lower rubber pieces or springs showing an appropriate degree of resiliency so as to be able to allow the supply cylinder 24 to maintain its attitude without exerting excessive force to the glass substrates w3 and w4 or the supply cylinder 24. Preferably, an ultrasonic vibrating body 24*c* fitted to the holder 24*a* is connected to the supply cylinder 24 by way of a shaft member 24*d* so as to longitudinally apply ultrasonic vibrations to the supply cylinder 24.

Figure 28:
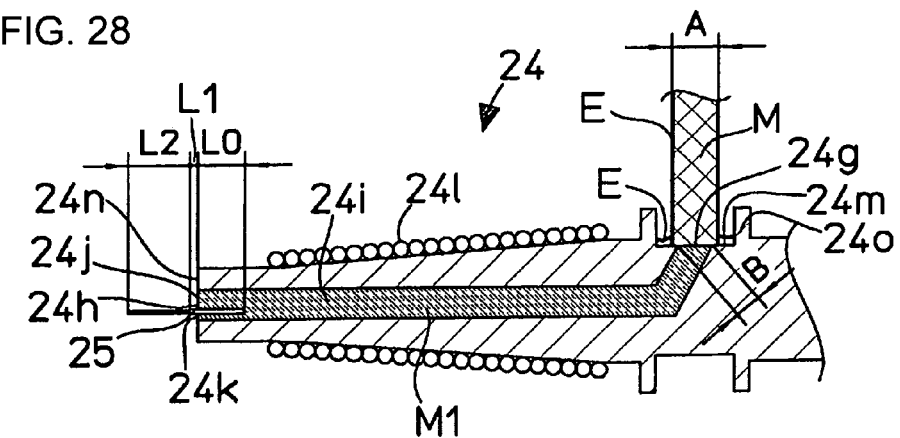
FIG. 28 is a cross-sectional view of the supply cylinder of FIG. 27, showing the configuration thereof.
Figure 29:
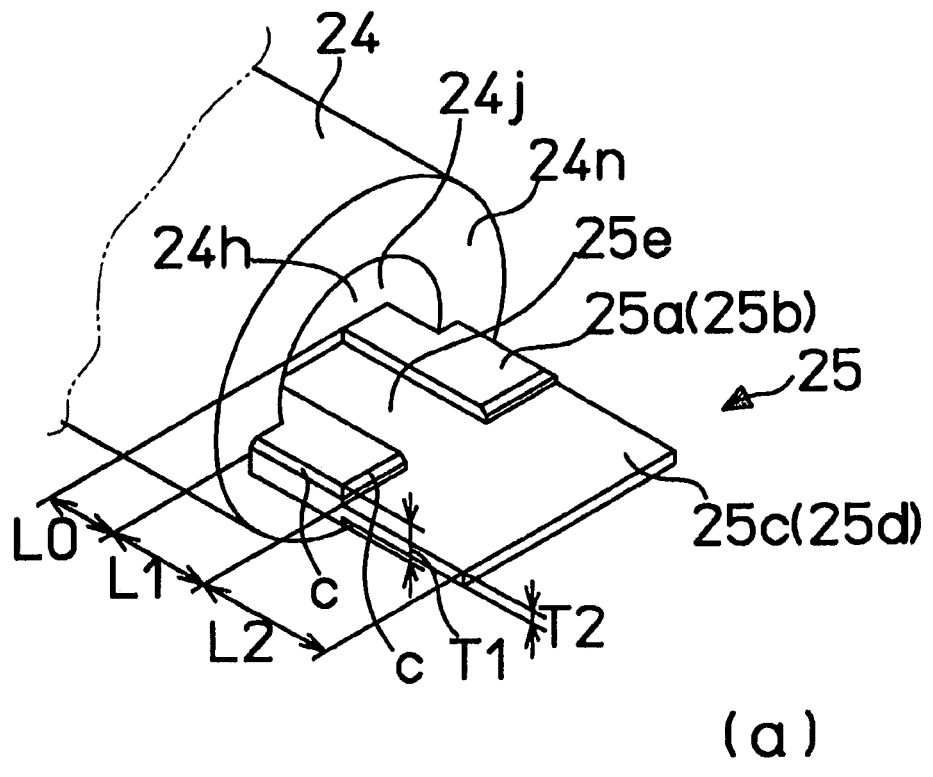
FIG. 29 is a schematic perspective view of the supply cylinder of FIG. 27, showing the configuration thereof
Figure 29:
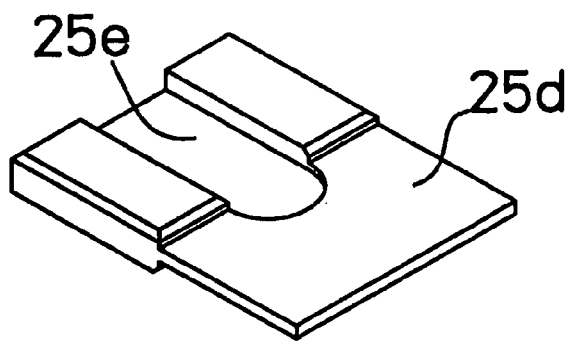

As shown in FIG. 28, the supply cylinder 24 contains in the inside thereof a flow path 24*i* having a circular cross section flowed molten solder M1 through and has a guide section 25 fitted thereto. The flow path 24*i* is open at one of the surfaces, or the surface 24*m*, and at the other surface, or the surface 24*n*, of the supply cylinder 24. The guide section 25 is inserted into the flow path 24*i* by a depth of L0 so as to extend orthogonally relative to the other surface 24*n*, crossing a second opening 24*h*. Thus, the supply cylinder 24 supplies the molten solder M1 discharged from the second opening 24*h* into the outer peripheral gap by way of the guide section 25.

The supply apparatus inserts the guide section 25 of the supply cylinder 24 into the outer peripheral gap k of glass substrates w3 and w4 so as to produce a state where the other surface 24*n* is separated from the corresponding outer peripheral end facets of the glass substrates w3 and w4 by a predetermined gap s and moves the supply cylinder 24 at a predetermined speed so as to make a full turn along the outer peripheral gap k. The supply apparatus may not necessarily be solely responsible for carrying out the move and the table on which the glass substrates w3 and w4 are placed may be made to participate in the operation of carrying out the move so as to relatively move the supply cylinder and the glass substrates. In other words, the structure of the supply apparatus is variable and can be defined according to the mode of moving the supply cylinder. Regardless of the structure of the supply apparatus that is defined according to the mode of moving the supply cylinder, the mechanism for moving glass substrates w3 and w4 and the mechanism for moving the supply apparatus can be realized by means of known techniques, for example by combining a motor and a ball screw or a linear guide for linear movements and combining a motor or a cylinder and a bearing for revolving movements. The casing 24*e* may well be fitted to a moving mechanism by way of a jig or the like for adjusting its vertical position. With the above-described arrangement, the height of the guide section 25 can be adjusted relative to the outer peripheral gap k of the glass substrates w3 and w4 by seeing the thickness of the glass substrate w4 and the height of the gap maintaining member Q.

Now, the guide section 25 will be described in greater detail. The guide section 25 is adapted to be inserted into the outer peripheral gap k of glass substrates w3 and w4 to supply the molten solder M1 that is discharged from the second opening (to be referred to as discharge port in Example No. 3-1 and Example No. 3-2 hereafter) 24*h* of the supply cylinder 24 into the outer peripheral gap k. The guide section 25 causes the molten solder M1 to slide on the main surfaces of the glass substrates w3 and w4 when it moves along the outer peripheral gap k. In other words, the guide section 25 supplies and applies molten solder M1 into the outer peripheral gap k of the glass substrates w3 and w4. Unlike the lead-in plate described in PTL 4 that is disposed at a center section of a molten solder discharge port so as to divide the discharge port into an upper part and a lower part and make them show an equal area, the guide section 25 is disposed at a vertically downwardly offset position as viewed from the center of the discharge port 24*h*, although the lead-in plate resembles the guide section of this example. Therefore, the area of the upper discharge port 24*j* partitioned by the guide section 25 is larger than the area of the lower discharge port 24*k*.

As shown in FIG. 29, the guide section 25 includes a plate-shaped body 25*c* having a thickness (T2) smaller than the size g of the outer peripheral gap k of the glass substrates w3 and w4 and projecting bodies 25*a* projecting from the top and bottom surfaces of the plate-shaped body 25*c* and having a thickness (T1) substantially equal to the size g of the outer peripheral gap k. The plate-shaped body 25*c* is inserted into the outer peripheral gap k and molten solder M1 is injected into the gaps between the surfaces of the plate shaped body 25*c* and the oppositely disposed glass substrates w3 and w4 so as to apply molten solder M1 to the main surfaces of the glass substrates w3 and w4. The part L2 that is inserted into the outer peripheral gap k is referred to as trowel section 25*d* hereinafter. The projecting bodies 25a formed on the top and bottom surfaces of the plate-shaped body 25c are so formed as to project from the discharge port 24h by L1. The projecting bodies 25a has contact surfaces that can be inserted into the outer peripheral gap k and slide on the respective main surfaces of the glass substrates w3 and w4 and the parts where the contact surfaces are formed are referring to as contact sections 25b.

Figure 30:
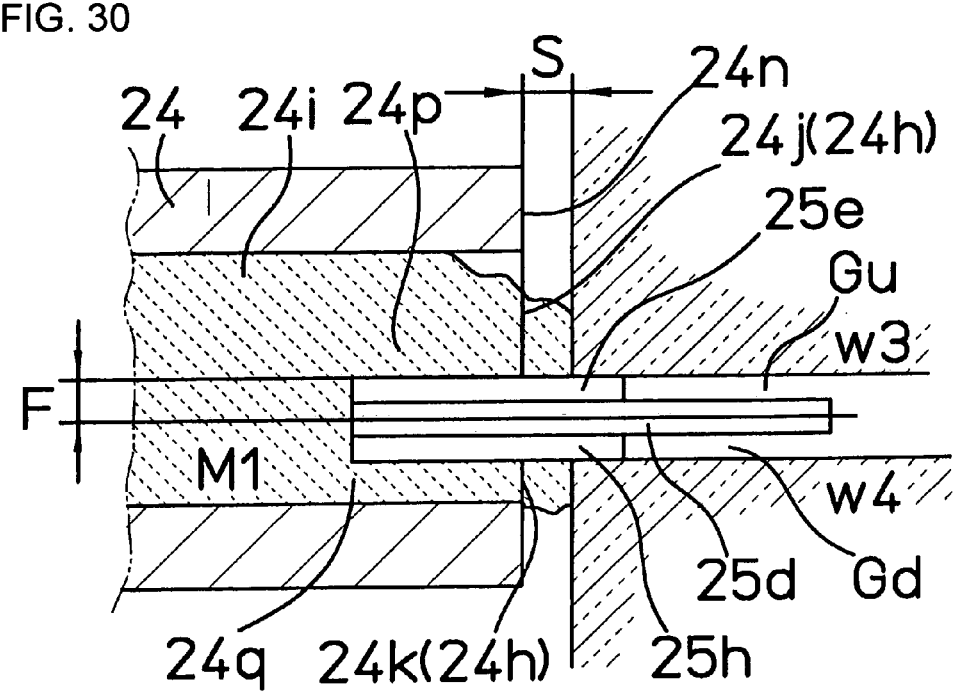
FIG. 30 is an illustration of a state of supplying molten solder by the guide section of FIG. 27 in a steady state.

When the guide section 25 is inserted into the outer peripheral gap k, the vertical position of the trowel section 25d in the outer peripheral gap k is determined as the contact sections 25b are made to fit to the outer peripheral gap k. More specifically, as shown in FIG. 30, the first gap Gu between the top surface of the trowel section 25d and the glass substrate w3 and the second gap Ga between the bottom surface of the trowel section 25d and the glass substrate w4 can be held to respective constant values. Note that the contact sections 25b are preferably subjected to a surface treatment, for example Ni water-repellent plating, in order to make them able to slide smoothly on the main surfaces of the glass substrates w3 and w4. Additionally, the contact sections 25b are preferably beveled to show bevels c at the lateral edges of the surfaces thereof that form steps relative to the trowel section 25d so that they may be smoothly put into the outer peripheral gap k. The bevels c can be formed by producing straight or round slopes at the related edges by cutting, grinding or etching.

The plate-shaped body 25c and the projecting bodies 25a may be formed as an integral structure or they may be separately formed and bonded or otherwise assembled together by securing them to each other by way of a bonding or laminating process. In the case of an assembled structure, appropriate materials can be selected and combined to meet the functional requirements of the plate-shaped body 25c and the projecting bodies 25a. For example, glass may be selected for the plate-shaped body 25c and metal may be selected for the projecting bodies 25a.

As shown in FIG. 29(a), the projecting bodies 25a formed on the top and bottom surfaces of the plate-shaped body 25c are formed so as to sandwich guide grooves 25e and 25h into which molten solder M1 can flow from the flow path 24i. For example, the guide grooves 25e and 25h can be formed by cutting grooves to divide the projecting body 25a that are formed integrally with the plate-shaped body 25c. While the width and the depth of the guide grooves 25e and 25h may be determined according to the flowability of molten solder M1, a large width and a large depth are preferable for the flowability of molten solder M1 and may be formed by cutting the plate-shaped body 25c so as to get into the trowel section 25d as shown in FIG. 29(b).

As described above, the trowel section 25d is provided for the purpose of injecting the molten solder M1 supplied by way of the guide grooves 25e and 25h into the gaps Gu and Gd and making it to be firmly bonded to the glass substrates w3 and w4. Therefore, as the trowel section 25d moves, molten solder M1 is filled into a part of the outer peripheral gap k located behind the trowel section 25d as viewed in the moving direction thereof by way of the gaps Gu and Gd and the width of the bonding section n is defined by the length L2 of the trowel section 25d. The thickness T2 of the trowel section 25d is selected on the basis of the size of the first gap Gu and the second gap Gd in such a way that molten solder M1 can be applied to the main surfaces of the glass subs rates w3 and w4, while being held in contact with the main surfaces under uniform pressure. The gaps Gu and Gd are preferably narrow for the molten solder M1 to move with the trowel section 25d, following the latter, and become applied to the glass substrates w3 and w4 well. One or more grooves intersecting the moving direction of the trowel section 25d may be formed on the surfaces of the trowel section 25d in order to improve the follow-up performance of the molten solder M1.

Now, the supply cylinder 24 will be described in detail below. The supply cylinder 24 supplies molten solder M1 from the first opening 24g formed on the one surface 24m and discharges the molten solder M1 from the discharge port 24h that is the second opening formed on the other surface 24n. The molten solder M1 supplied to the first opening 24g is produced, for example, as thread solder M is fed to the first opening 24g at a predetermined rate, molten by the supply cylinder 24 and then supplied further at a flow rate that is controlled according to the quantity of molten solder to be satisfactorily filled into the outer peripheral gap k of the glass substrates w3 and w4.

As shown in FIG. 28, the supply cylinder 24 includes a flow path 24i through which molten solder M1 produced by melting thread solder M as described above flows, a melting surface 24m for melting thread solder M at which the first opening 24g of the flow path 24i is formed and a discharge surface 24n that is the other surface of the supply cylinder 24 at which the discharge port 24h is formed and a heater 24l for melting thread solder M is wound around the outer peripheral surface thereof. The supply cylinder 24 having such a configuration can feed out thread solder M at a rate that is controlled so as make its lower end facet contact the melting surface 24m in an attitude of closing the first opening 24g and presses the thread solder M against the melting surface 24m to melt the thread solder M. Then, the molten solder M1 flows through the flow path 24i and continuously discharged from the discharge port 24h.

The melting surface 24m where the first opening 24g is formed is the bottom surface of a recessed section produced by, for example, spot facing a corresponding part of the surface of the supply cylinder 24. The diameter øB of the first opening 24g is less than the diameter øA of the end facet of the thread solder M that contacts the melting surface 24m and the flow path 24i is formed as a tubular path having a diameter øB at least at and near the melting surface 24m. As a result, if oxides E are formed on the outer peripheral surface of the thread solder M, the oxides E trying to flow into the flow path 24i is blocked by the outer peripheral edge of the first opening 24g, or the melting surface 24m, and only clean molten solder M1 that is substantially not mixed with oxides E flows into the flow path 24i. Since the thickness of the layer of oxides E produced on the surface of the thread solder M that is stored in the atmosphere is normally about tens of several μm, it is sufficient for the difference between the diameter of the thread solder M and the diameter of the first opening 24g, of øA−øB, to be about 1 mm. Preferably, a peripheral wall 24o is formed around the outer periphery of the supply cylinder 24 so as to surround the melting surface 24m. The oxides E that are prevented from flowing into the flow path 24i are stored in the concaved bottom section of the melting surface 24m, which may well be made to flow out and collected appropriately by sucking or by cutting out a part of the peripheral wall 24o. A terminal section of the flow path 24i located close to the discharge surface 24n is preferably so formed as to be substantially orthogonal relative to the discharge surface 24n. Then, as a result, when the supply cylinder 24 is positioned so as to make the discharge surface 24n squarely face the outer peripheral end facets of the glass substrates w3 and w4 with a gap s separating them, the flow path 24i is held in parallel with the outer peripheral gap k at and near the discharge surface 24n.

Now the operation of supplying molten solder M1 of the above-described supply cylinder 24 will be described below.

The supply apparatus is so arranged that, when molten solder M1 is being supplied and flowing in a steady state in the supply cylinder 24, the supply apparatus moves along the outer peripheral gap k of glass substrates w3 and w4. The steady state refers to a state where molten solder M1 can be injected into the gaps Gu and Gd respectively from the guide grooves 25e and 25h of the guide section 25 and the top of the molten solder M1 that gets to the discharge port 24h is located at a level higher than the guide groove 25e as shown in FIG. 30. Preferably, the duration of time that is spent from the time when the supply of molten solder M1 from the first opening 24g starts to the time when this steady state is reached is as short as possible. For this reason, the rate of supplying molten solder M1 is controlled in such a way that the flow path 24i is quickly filled with molten solder M1 when the supply of molten solder M1 is started and the flow of molten solder M1 is still in an unsteady state but molten solder M1 can satisfactorily fill the outer peripheral gap k in a steady state.

In a steady state, the lower flow path 24q of the flow path 24i that is vertically divided by the guide section 25 is filled with molten solder M1 and the gap s between the lower discharge port 24k where the lower flow path 24q opens and the corresponding end facet of the glass substrate w4 is also filled with molten solder M1. In this state, molten solder M1 is injected into the second gap Gd and excessive molten solder M1 overflows from the gap s between the discharge port 24k and the corresponding end facet of the glass substrate w4. Molten solder M1 is supplied to the flow path 24i at a controlled flow rate and hence the molten solder M1 existing in the gap s between the discharge port 24k and the glass substrate w4 is subjected only to low supply pressure. However, since the gap s is open in the direction of gravity (downward), the leaking molten solder M1 hangs down. Such a leak from the lower flow path 24q takes place in the time period from the start of the supply of molten solder M1 to the time when the flow of molten solder M1 reaches a steady state so that the leak is desirably as small as possible. On the other hand, if the gap s between the upper discharge port 24j and the corresponding end facet of the glass substrate w3 that is connected to the upper flow path 24p is filled with molten solder M1, the molten solder M1 existing in this gap hardly leaks out because of the existence of the guide section 25. Therefore, to reduce the leak of molten solder M1 from the gap s between the discharge port 24h and the end facets of the glass substrates w3 and w4, it is only necessary to reduce the quantity of molten solder M1 that is discharged from the lower flow path 24q.

Since the guide section 25 is fitted to a downwardly offset position relative to the center of the discharge port 24h, the area of the lower discharge port 24k is made smaller than that of the upper discharge port 24j in the supply cylinder 24. Additionally, the capacity of the lower flow path 24q is made smaller than that of the upper flow path 24p. Therefore, the quantity of molten solder M1 that is discharged from the lower discharge port 24k is smaller than the quantity of molten solder M1 that is discharged from the upper discharge port 24j. In other words, a relatively small quantity of molten solder M1 is discharged from the lower flow path 24q of the supply cylinder 24 and hence the quantity of molten solder M1 leaking out from the gaps between the discharge port 24h and the corresponding end facets of the glass substrates w3 and w4 can be reduced and the time necessary for reaching a steady state can also be reduced. The quantity of offset F of the guide section 25 may be appropriately selected on the basis of the supply rate of molten solder M1, the size of the gap s between the discharge surface 24n and the corresponding end facets of the glass substrates w3 and w4 and the dimensions of the guide grooves 25e and 25h. The quantity of molten solder M1 with which the lower flow path 24q is filled is reduced when a large quantity is selected for the offset F so that then the quantity of the leaking out molten solder M1 can be reduced and, at the same time, the time before reaching a steady state can also be reduced.

When a supply cylinder 24 as described above is employed, the supplied clean molten solder M1 is then supplied into the outer peripheral gap k of the glass substrates w3 and w4, while the clean molten solder M1 is only slightly brought into contact with the external atmosphere at the gap s between the discharge surface 24n and the corresponding end facets of the glass substrates w3 and w4 and also in the gaps Gu and Gd. Therefore, the supplied clean molten solder M1 contacts the main surfaces of the glass substrates w3 and w4 in a state where oxidation thereof is suppressed in the atmosphere. Thus, the supply apparatus of this example is suitable for using SnAgAl based alloy solder that shows an excellent bonding performance with glass by way of oxygen existing to an appropriate extent. To improve the filling performance of molten solder M1, the area of the surface of the guide section 25 that contacts molten solder M1 is preferably subjected to a process for raising its wettability relative to molten solder M1. For example, it is preferably coated with Ag, Cr, Al, Mo, W, V, Nb or Ta. Additionally, it is preferably subjected to a nitriding treatment, which is an anti-corrosion treatment, so that the surface of the guide section 25 may not be corroded by molten solder M1 and impurities may not be mixed into the molten solder M1. The surface of the flow path 24i is also preferably subjected to those processes.

Now, the operation of supplying molten solder M1 to the outer peripheral gap k of the supply apparatus of this example will be described below. The glass substrates w3 and w4 that are laid one above the other with a gap maintaining member Q having a predetermined size interposed between them are placed in position on a table that contains a heat emitting body and movable in the two axial directions of the X-axis and the Y-axis and the glass substrates w3 and w4 are heated to about the melting temperature of molten solder M1. The guide section 25 of the supply cylinder 24 is inserted into a predetermined position in the outer peripheral gap k of the glass substrates w3 and w4 located at or near one of the edges of each of them and the supply cylinder 24 is moved so as to produce a predetermined gap s between the corresponding end facets of the glass substrates w3 and w4 and the discharge surface 24n. The position of the trowel section 25d is adjusted in advance so that the trowel section 25d comes to a position at the vertical center of the outer peripheral gap k or its vicinity at this time, although it is difficult to rigorously adjust the position so as to make it agree with the center of the outer peripheral gap k. However, if the position is not adjusted satisfactorily, some of the contact sections 25b can hit the end facet of the glass substrate w3 or w4 if the trowel section 25d is inserted into the outer peripheral gap k. The supply cylinder 24 is supported by a floating mechanism in terms of its vertical direction and the contact sections 25b are beveled so that the contact sections 25b can be fitted into the outer peripheral gap k with ease. Then, as a result, the trowel section 25d is placed substantially at the vertical center of the outer peripheral gap k and the gap Gu and the gap Gd between the trowel section 25d and the glass substrates w3 and w4 become vertically equal to each other.

Clean molten solder M1 is supplied to the flow path 24i and starts to be discharged from the discharge port 24h at a predetermined flow rate. Since the guide section 25 is offset and fitted to the discharge port 24h in a downwardly displaced manner, a steady state is reached within a short period of time and the glass substrates w3 and w4 can be moved quickly in a direction (the X-direction) at a predetermined speed in order to supply molten solder M1 to one of the sides of the outer peripheral gap k. Meanwhile, molten solder M1 is injected into the gaps Gu and Gd and filled into the outer peripheral gap k but, if molten solder M1 leaks from the gap s between the lower discharge port 24k of the guide section 25 and the glass substrate w4, the molten solder M1 leaks only to a small extent and practically does not hang down and drop. Additionally, since the contact sections 25b are fitted into the outer peripheral gap k and held in a floating state, they follow the vertical positional fluctuations of the outer peripheral gap k that can arise when the glass substrate w4 has a varying thickness and/or the table surface has vertical undulations in the X-direction and the sizes of the gaps Gu and Gd are maintained. Then, as a result, a substantially same quantity of molten solder M1 is injected both along the top surface and along the bottom surface of the trowel section 25d so that the molten solder M1 that moves as the trowel section 25d moves shows a same state both in the gap Gu and in the gap Gd and hence molten solder M1 is supplied equally to the main surface of the glass substrate w3 and to the main surface of the glass substrate w4.

Besides, as ultrasonic vibrations are employed and applied to the guide section 25 during a molten solder filling operation, both the wettability of the guide section 25 and that of the glass substrates w3 and w4 relative to molten solder M1 are improved so that molten solder M1 is smoothly supplied if the gaps Gu and Gd are narrow. The ultrasonic vibrations also act on the main surfaces of the glass substrates w3 and w4 by way of molten solder M1 to remove the air bubbles and the foreign objects such as oxide film existing at the contact interfaces of molten solder M1 and the glass substrates w3 and w4. Then, the bonding performance of molten solder M1 relative to the glass substrates w3 and w4 is improved to effectively improve the bonding strength of the glass panel W.

As the operation of supplying molten solder M1 to one of the sides of the outer peripheral gap k is completed in a manner as described above, the casing 24e equipped with the supply cylinder 24 is driven to turn by 90° in the horizontal direction and then the glass substrates w3 and w4 are driven to move horizontally in the direction of a side thereof that is orthogonal to the above-described side. Then, molten solder M1 is supplied into the outer peripheral gap k at this side as in the case of the above-described side and molten solder M1 hardly hangs down to the corresponding outer peripheral end facets of the glass substrates w3 and w4. This operation is repeated sequentially at each of the sides and molten solder M1 is supplied to all the sides of the outer peripheral gap k of the glass substrates w3 and w4 without rising up and hanging down to at outer end facets of the glass substrates w3 and w4. As the operation of supplying molten solder M1 to the glass substrates w3 and w4 is completed, the table on which the glass substrates w3 and w4 are placed is moved to the outside. The glass substrates w3 and w4 are then removed from the table that is moved to the outside but no molten solder M1 is adhering to the table so that no operation is required to remove solder from the table.

Subsequently, another table on which another pair of glass substrates w3 and w4 are placed and heated for preparation is brought in and another operation of supplying molten solder M1 same as the above-described one is started to the outer peripheral gap k of the new glass substrates w3 and w4. Note, however, that the vertical position of the outer peripheral gap k of the new glass substrates w3 and w4 can be different from the position of the outer peripheral gap k of the former glass substrates due to the difference of thickness between the new and old glass substrates w4 and/or the difference of state where glass substrates w3 and w4 are fitted to the table. If such is the case, the supply apparatus of this example can insert the trowel section 25d into the vertical center position of the outer peripheral gap k and fill it with molten solder M1 in a state where the size of the gaps Gu and Gd is maintained because the supply cylinder 24 is vertically supported by a floating mechanism and the contact sections 25b are provided with bevels c.

When the guide section 25 moves along the outer peripheral gap k, molten solder M1 permeates between the contact sections 25b and the main surfaces of the glass substrates w3 and w4 due to the capillary phenomenon. After the contact sections 25b contact and pass the respective main surfaces, molten solder M1 flows from the trowel section 25d and supplied to the contact regions of the contact sections 25b as it is drawn by the molten solder M1 that permeates. Molten solder M1 may not be supplied to all the contact regions of the contact sections 25b if the length L1 of the contact sections 25b is large so that the length L1 of the contact sections 25b shown in FIG. 29 is preferably small and suitably about 10 to 20% of the width of the bonding section n. The top and bottom surfaces of the contact sections 25b may not necessarily be planes as shown in FIG. 29 but may alternatively be planes where grooves are formed or curved surfaces.

Example No. 3-2

Figure 31:
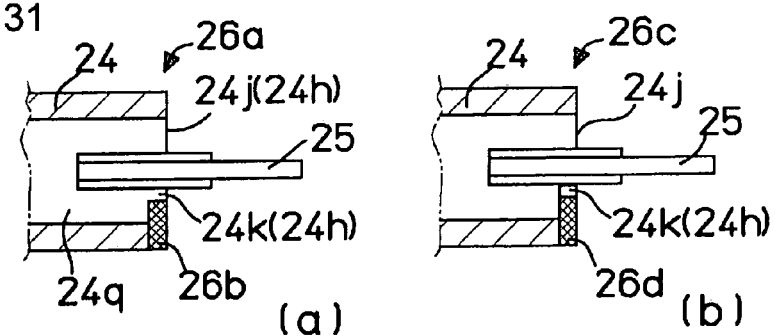
FIG. 31 is an enlarged partial cross-sectional view of the supply cylinder of the molten metal supply apparatus of Example No. 3-2.
Figure 31:
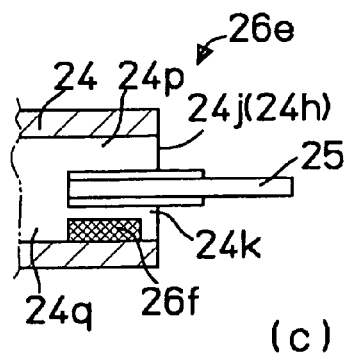
Figure 32:
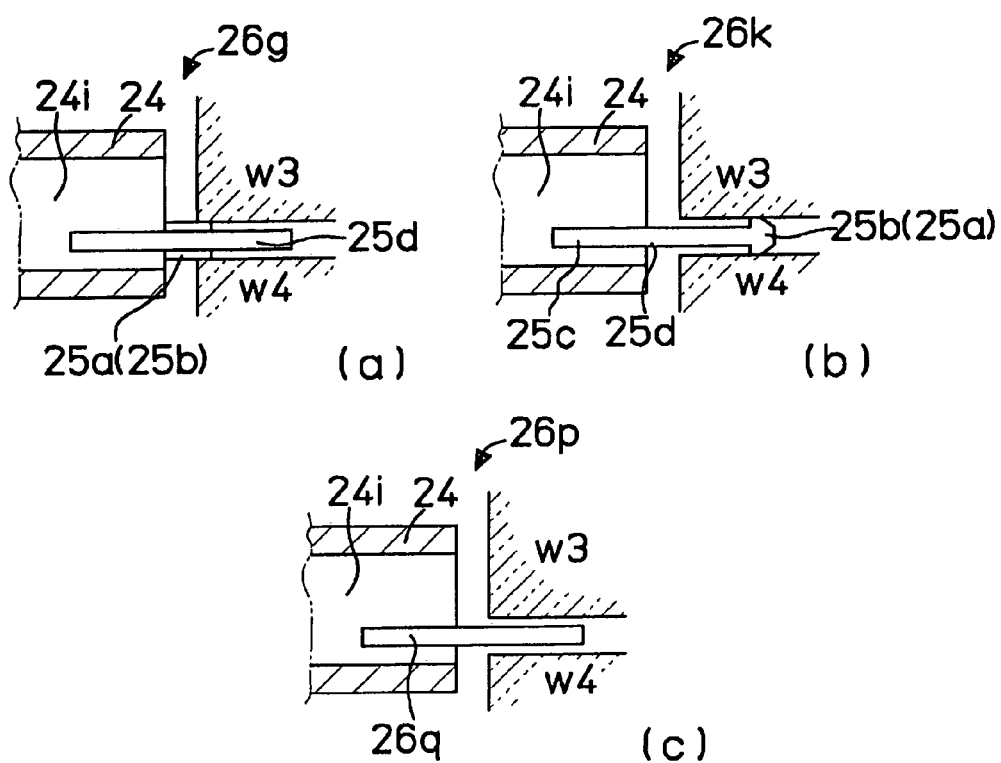
FIG. 32 is an enlarged partial cross-sectional view of an exemplar modified supply cylinder of FIG. 31.
Figure 33:
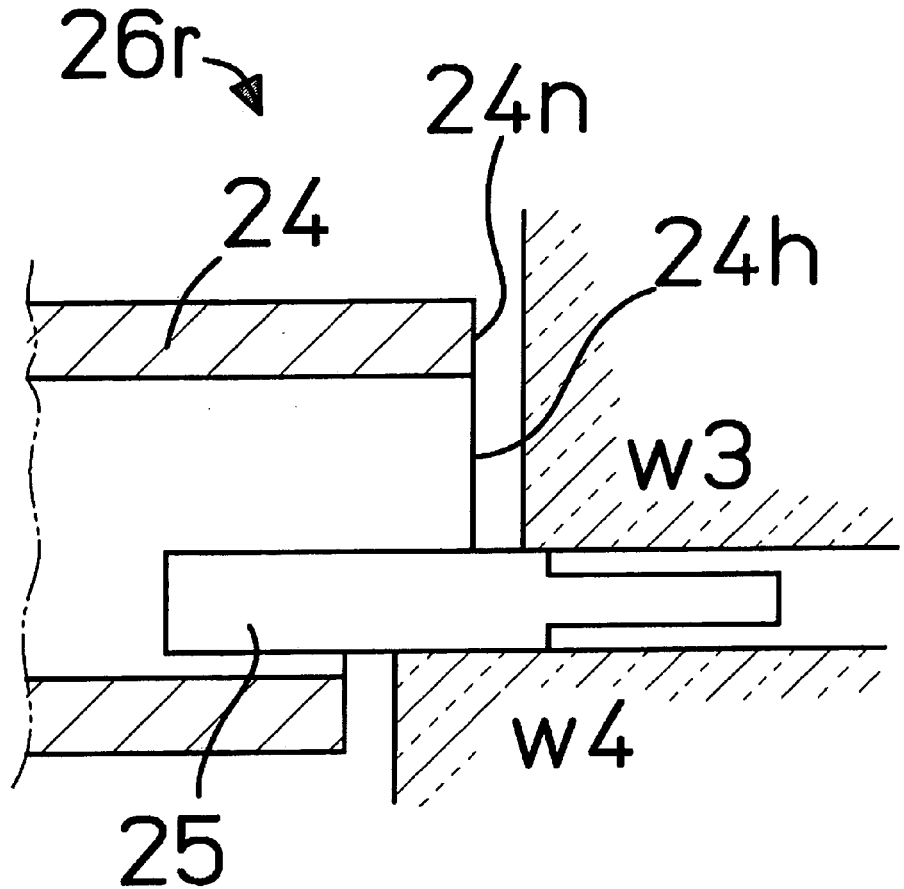
FIG. 33 is an enlarged partial cross-sectional view of another exemplar modified supply cylinder of FIG. 31.

A molten metal supply cylinder and a molten metal supply apparatus incorporating such a supply cylinder will be described below as Example No. 3-2 of the present invention by referring to FIGS. 31 through 33.

The guide section 25 of the supply cylinder 24 of Example No. 3-1 is disposed at a vertically downwardly offset position as viewed from the center of the discharge port 24h. On the other hand, it is so arranged that the guide section 25 is disposed at or near the center of the discharge port 24h while the quantity of molten solder M1 discharged from the lower discharge port 24k of the discharge port 24h is made smaller than the quantity of molten solder M1 discharged from the upper discharge port 24j of the discharge port 24h in each of the supply cylinders 26a, 26c and 26e of this example.

FIG. 31(a) shows a supply cylinder 26a where a barrier plate 26b is fitted to an end section of the lower flow path 24q. The barrier plate 26b is arranged with a gap between it and the bottom surface of the guide section 25, and the gap operates as a lower discharge port 24k. FIG. 31(b) shows a supply cylinder 26c where a barrier plate 26d similar to the above-described one is arranged but no gap is provided between it and the guide section 25 and a passage hole having a small cross section in which molten solder M1 flows through is formed at an upper part of the barrier plate 26d. The hole operates as a lower discharge port 24k. FIG. 31(c) shows a supply cylinder 26e where a barrier plate 26f is arranged in the lower flow path 24q and the capacity of the lower flow path 24q is made smaller than the capacity of the upper flow path 24p.

Thus, in each of the supply apparatus of Example No. 3-1 and that of Example No. 3-2, projecting bodies 25a that operate as contact sections 25b are provided in the guide section 25 in order to maintain the gaps Gu and Gd between the trowel section 25d and the glass substrates w3 and w4 to a constant value and the projecting bodies 25a are inserted into the supply cylinder 24 and arranged there. However, FIG. 32(a) shows a supply cylinder 26g, where no projecting bodies 25a are inserted into the supply cylinder 24, but projecting bodies 25a are formed only immediately outside the end facet of the supply cylinder 24 and made to operate as contact sections 25b. FIG. 32(b) shows a supply cylinder 26k, where projecting bodies 25a are formed at a front end of a plate-shaped body 25c and made to operate as contact sections 25b. Note that the plate-shaped body 25c and the projecting bodies 25a in the guide section 25 may be made of a same material or different materials selected from metal, glass, ceramic and so on.

Alternatively, only a flat plate-shaped body 26q having a uniform thickness without projecting bodies can be employed as in the case of supply cylinder 26p shown in FIG. 32(c). This supply cylinder can find suitable applications where small glass substrates having sides of several to tens of several centimeters are used and the dispersion of thickness of glass substrates and the oscillations of the moving mechanism that arise when guiding glass substrates are minimal so that the gaps fluctuates only to a negligible extent. Then, it may not necessary to use a floating mechanism to support the supply cylinder in the supply apparatus.

While the glass substrates w3 and w4 are made to have same dimensions in plan views in the above description for the purpose of easy understanding, the supply apparatus of this example can accommodate glass substrates having different dimensions in plan views. If the glass substrates w3 and w4 have different dimensions in plan views and their outer peripheral edges are not aligned but a step is produced when they are placed in position, a supply cylinder 26r whose discharge surface 24n where the discharge port 24h opens has a profile that matches the step of the glass substrates as shown in FIG. 33 can be used.

[Fourth Mode of Carrying Out the Invention]

A molten metal supply cylinder according to (31) described above, a molten metal supply apparatus incorporating such a supply cylinder and a molten metal supply method will be described below by way of Examples No. 4-1, No. 4-2 and No. 4-3 showing a desirable mode of carrying out the present invention.

Example No. 4-1

Figure 34:
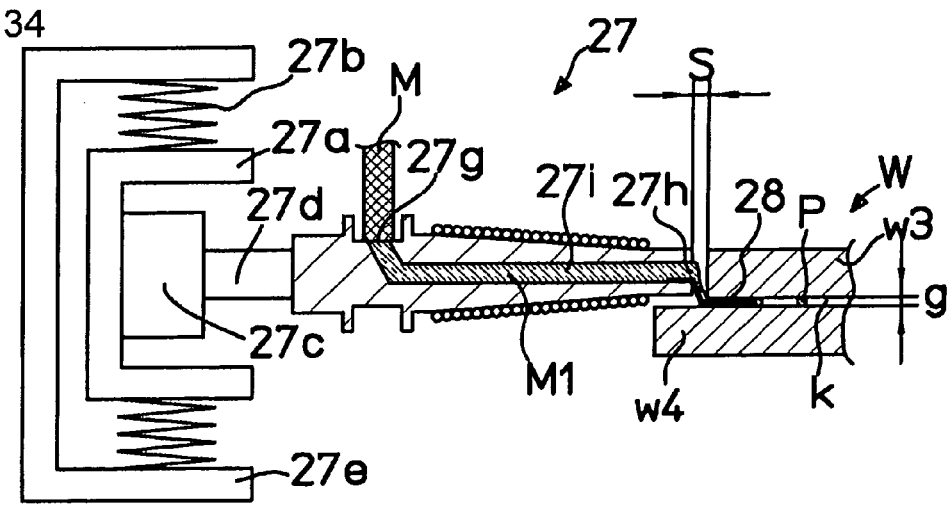
FIG. 34 is a schematic illustration of the configuration of the molten metal supply apparatus of Example No. 4-1.
Figure 35:
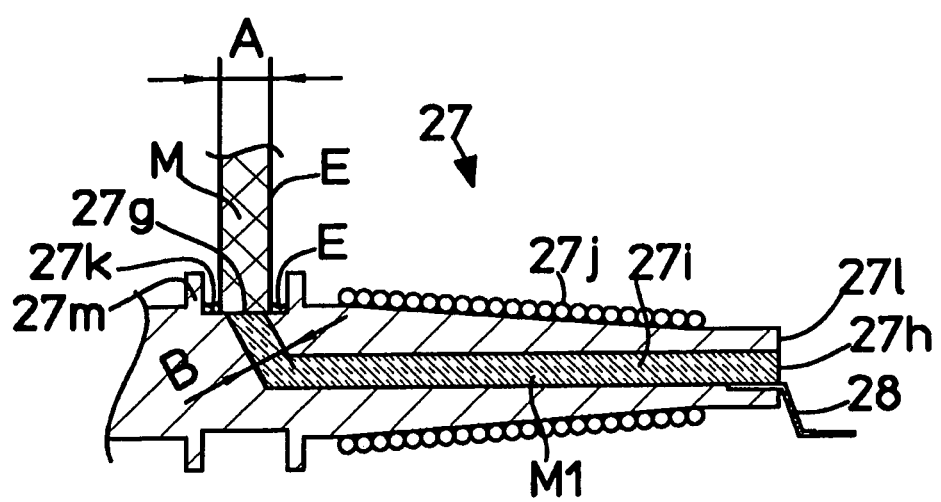
FIG. 35 is an enlarged partial cross-sectional view of the supply cylinder of FIG. 34, showing the configuration thereof.
Figure 36:
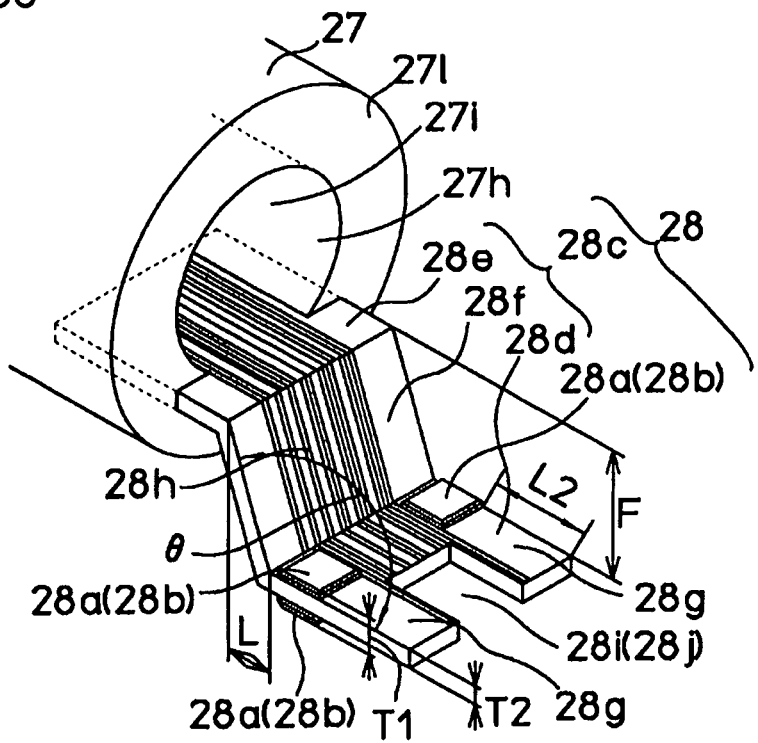
FIG. 36 is a perspective view of the configuration of the guide section of FIG. 35 and an exemplar modified guide section thereof.
Figure 36:
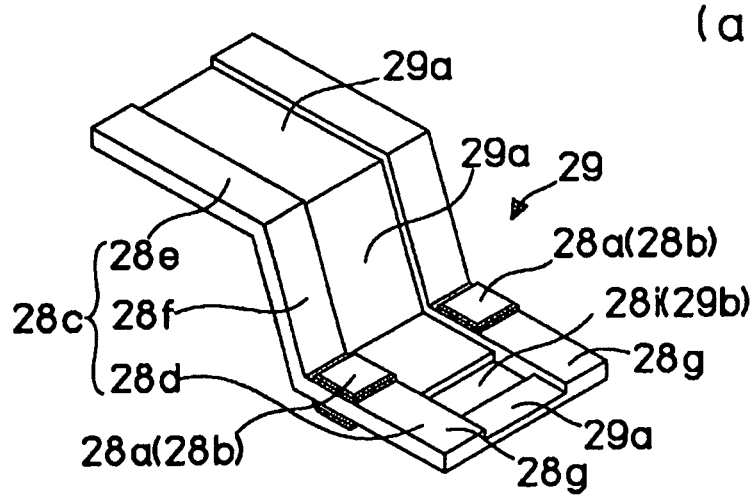
Figure 37:
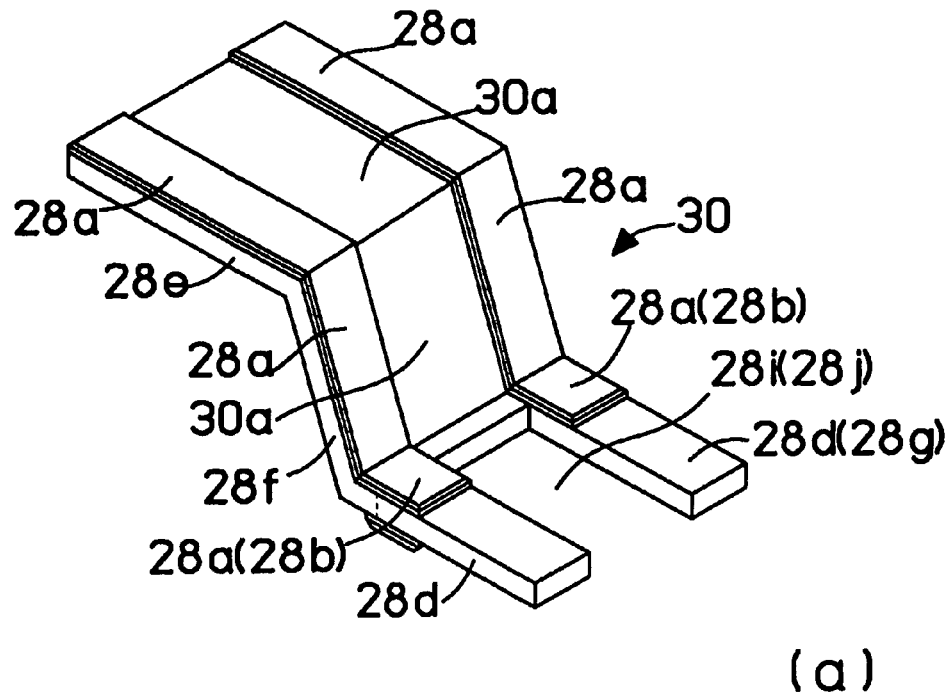
FIG. 37 is a perspective view of another exemplar modified guide section of FIG. 35.
Figure 37:
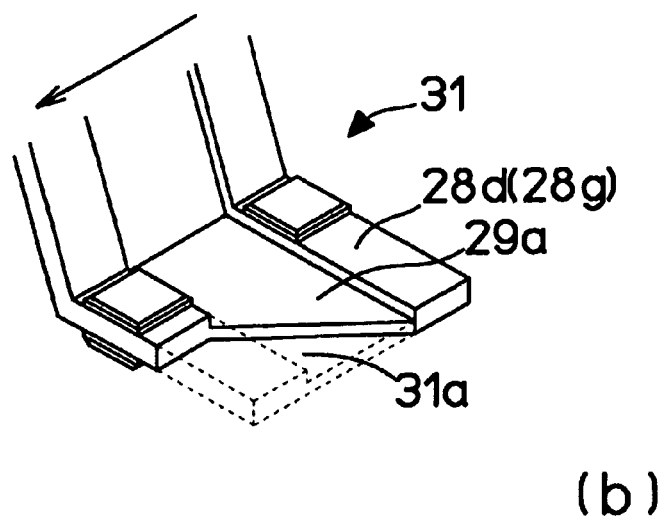
Figure 38:
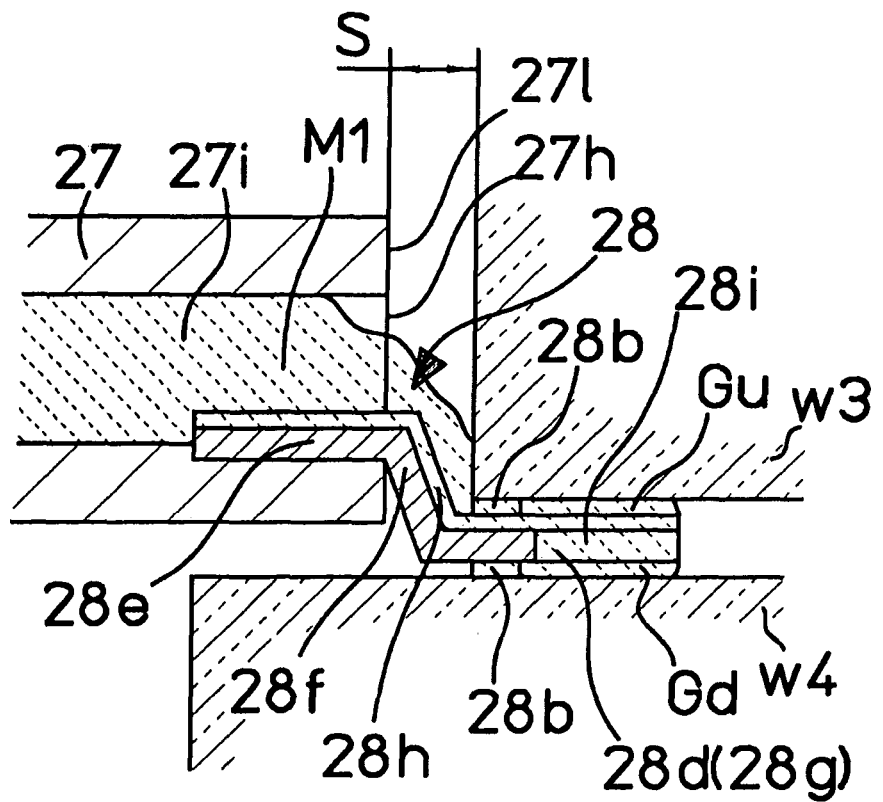
FIG. 38 is an illustration of a state of supplying molten solder by the guide section of FIG. 35.
Figure 39:
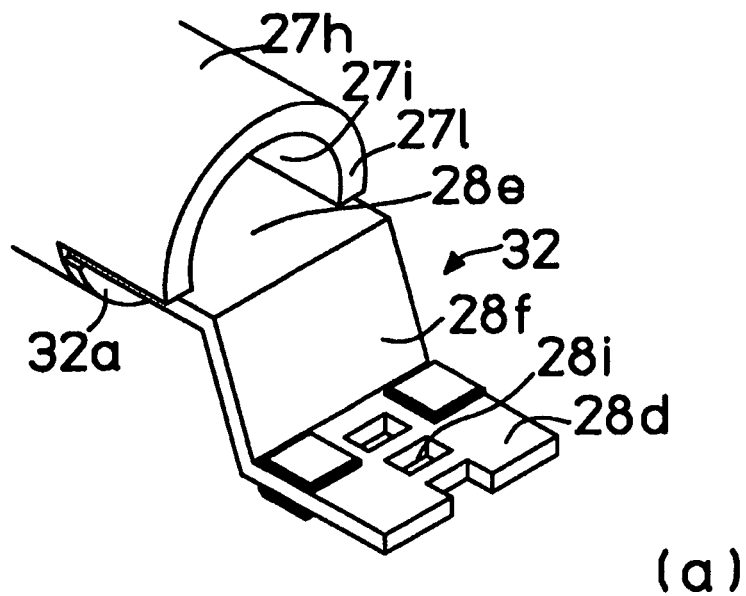
FIG. 39 is a perspective view of another exemplar modified supply cylinder of FIG. 35.
Figure 39:
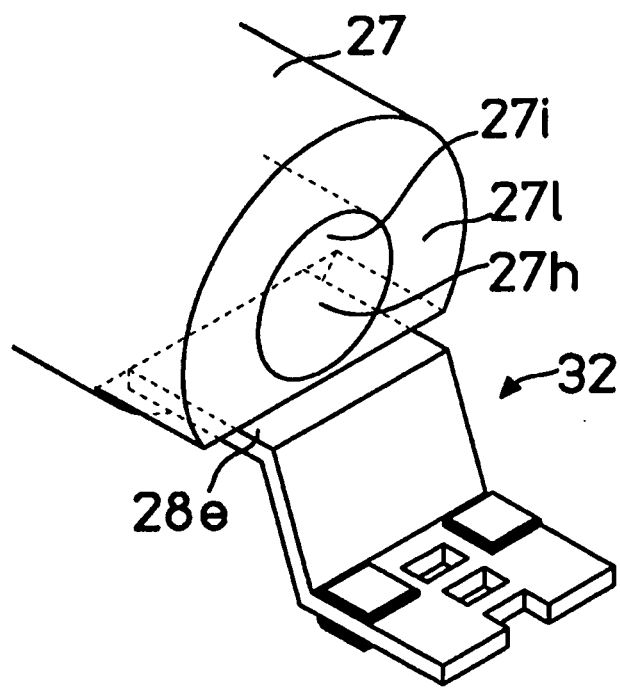

A molten metal supply cylinder and a molten metal supply apparatus incorporating such a supply cylinder will be described below as Example No. 4-1 by referring to FIGS. 34 through 39. FIG. 34 is a partial cross-sectional view of the molten metal supply apparatus of Example No. 4-1, showing a principal part thereof, FIG. 35 is a cross-sectional view of the supply cylinder of this example, and FIGS. 36 and 37 are perspective views of the guide section and an exemplar modified guide section of this example, whereas FIG. 38 is an illustration of a state of the guide section of FIG. 36 that is observable when the guide section is inserted into the outer peripheral gap of glass substrates and molten solder is supplied and FIG. 39 is an illustration of an exemplar modified guide section of the guide section of FIG. 36.

Firstly, the supply apparatus of this example will be described. The supply apparatus is adapted to manufacture a glass panel W by using glass substrates w3 and w4 having different dimensions in plan views, the sides of the lower glass substrate w4 projecting beyond the corresponding respective sides of the upper glass substrate w3, as described above by referring to FIG. 51(d). The supply apparatus includes a supply cylinder 27, a holder 27a to which the supply cylinder 27 is fitted, a floating mechanism 27b for making the holder 27a float mainly up and down and a casing 27e for supporting the floating mechanism 27b. The floating mechanism 27b can be realized as a structure provided with upper and lower rubber pieces or springs showing an appropriate degree of resiliency so as to be able to allow the supply cylinder 27 to maintain its attitude without exerting excessive force to the glass substrates w3 and w4 or the supply cylinder 27. Preferably, an ultrasonic vibrating body 27c fitted to the holder 27a is bonded to the supply cylinder 27 by way of a shaft member 27d so as to longitudinally apply ultrasonic vibrations to the supply cylinder 27.

The supply cylinder 27 contains in the inside thereof a flow path 27i having a circular cross section, and has a guide section 28. Molten solder M1 flows through the flow path 27i that is open at one of the lateral surfaces, or the surface 27k, and at the end facet, or the surface 27l. The guide section 28 is fitted to the surface 27l. A front end section of the guide section 28 is inserted into the outer peripheral gap k of glass substrates w3 and w4 to supply the molten solder M1 that is discharged from the second opening 27h (to be referred to as discharge port in Examples No. 4-1, No. 4-2 and No. 4-3 hereinafter) at the surface 27l to the outer peripheral gap k through the guide section 28.

As shown in FIG. 34, when molten solder M1 is supplied to the outer peripheral gap k of glass substrates w3 and w4, the supply cylinder 27 is placed at a position separated upwardly from the outer peripheral gap k by a predetermined height so that the supply cylinder 27 may not interfere with the projecting part of the lower glass substrate w4 that projects relative to the upper glass substrate w3. Thus, the guide section 28 of this example shows a stepped profile whose step is determined according to the different of height, or the vertical distance, between the discharge port 27h of the supply cylinder 27 and the outer peripheral gap k.

The supply apparatus inserts a front end section of the guide section 28 into the outer peripheral gap k of the glass substrates w3 and w4 in a state where the surface 27l of the supply cylinder 27 is separated from the corresponding end facet of the upper glass substrate w3 by a predetermined gap s and moves the supply cylinder 27 at a predetermined speed so as to make a full turn along the outer peripheral gap.

The supply apparatus may not necessarily be solely responsible for carrying out the move and the table on which the glass substrates w3 and w4 are placed may be made to participate in the operation of carrying out the move so as to relatively move the supply cylinder and the glass substrates. In other words, the structure of the supply apparatus is variable and can be defined according to the mode of moving the supply cylinder. Regardless of the structure of the supply apparatus that is defined according to the mode of moving the supply cylinder, the mechanism for moving glass substrates w3 and w4 and the mechanism for moving the supply apparatus can be realized by means of known techniques, for example by combining a motor and a ball screw or a linear guide for linear movements and combining a motor or a cylinder and a bearing for revolving movements. The casing 27e may well be fitted to a moving mechanism by way of a jig or the like for adjusting its vertical position. With the above-described arrangement, the height of the guide section 25 can be adjusted relative to the outer peripheral gap k of the glass substrates w3 and w4 by seeing the thickness of the glass substrate w4 and the height of the gap maintaining member Q.

The guide section 28 of this example will be described below by referring to FIGS. 36 through 38. As shown in FIG. 36(a) and FIG. 38, the guide section 28 is fitted to a lower part of the discharge port 27h in such a way that only the top surface thereof faces the flow path 27i and the molten solder M1 discharged from the discharge port 27h basically flows only on the top surface but not under the bottom surface thereof.

As shown in FIGS. 36 and 37, the guide section 28 includes a plate-shaped body 28c having a step and projecting bodies 28a formed on the surfaces of the plate-shaped body 28c. The plate-shaped body 28c has a base end section 28e to be fitted to the supply cylinder 27, a front end section 28d to be inserted into an outer peripheral gap and a slope section 28f linking these sections. The base end section 28e is arranged substantially in parallel with the front end section 28d and the slope section 28f is arranged to show a predetermined angle θ relative to the front end section 28d. The angle θ is determined by the length L by which the slope section 28f horizontally projects and the height F of the step. The length L and the height F are determined on the basis of the gap s between the surface 27l of the supply cylinder 27 and the glass substrate w3, the outer diameter of the supply cylinder 27 and the diameter of the flow path 27i among other factors. While the angle θ is normally an obtuse angle, the angle θ will be 90° when the length L of the projection is nil. The plate-shaped body 28c may be formed by bending a plate material twice or by cutting a block material.

As shown in FIG. 38, the plate-shaped body 28c of the guide section 28 is inserted into the outer peripheral gap k of the glass substrates w3 and w4 from the front end sections 28d thereof to supply the molten solder M1 discharged from the discharge port 27h of the supply cylinder 27 into the outer peripheral gap k. As the guide section 28 is driven to move along the outer peripheral gap k, the guide section 28 makes molten solder M1 to slide on the main surfaces of the glass substrates w3 and w4 or, in other words, supplies molten solder M1 into the outer peripheral gap k, while applying the molten solder to the main surfaces of the glass substrates w3 and w4. Therefore, the front end section 28d of the plate-shaped body 28c has a thickness T2 smaller than the size g of the outer peripheral gap k of the glass substrates w3 and w4. The range L2 extending from the front end of the front end section 28d is referred to as trowel section 28g hereinafter. The top and bottom surfaces of the trowel section 28g are arranged so as to respectively face the main surface of the glass substrate w3 and that of the glass substrate w4 with predetermined gaps Gu and Gd interposed between them.

As the guide section 28 is inserted into the outer peripheral gap k of the glass substrates w3 and w4, the projecting bodies 28a maintain the gaps Gu and Gd to respective constant values if the vertical position of the outer peripheral gap k fluctuates. While the projecting bodies 28a are respectively arranged at the front end sections 28d, they may alternatively be arranged at other positions for some other purpose as will be described hereinafter. The projecting bodies 28a arranged at the front end sections 28d are to be referred to as contact sections 28b hereinafter. The contact sections 28b project from the top surfaces and the bottom surfaces of the front end section 28d and the thickness T1 thereof is substantially same as the size g of the outer peripheral gap k. They have respective contact surfaces that are to be inserted into the outer peripheral gap k and slidable on the main surfaces of the glass substrates w3 and w4. The projecting bodies 28a (contact sections 28b) may be bonded to the plate-shaped body 28c (front end section 28d) or formed on the plate-shaped body 28 by means of a lamination process. The material of the projecting bodies 28a may not necessarily be same as that of the plate-shaped body 28c, which is typically metal, glass or ceramic, but an appropriate material can be selected for them according to the required characteristics of the projecting bodies 28a such as slidability and abrasion resistance. The projecting bodies 28a may be formed integrally with the plate-shaped body 28c.

With the above-described guide section 28, the trowel section 28g is vertically secured in position in the outer peripheral gap k as the guide section 28 is inserted into the outer peripheral gap k to have the contact sections 28b fitted into the outer peripheral gap k. In other words, the first gap Gu between the top surfaces of the trowel sections 28g and the glass substrate w3 and the second gap Gd between the bottom surfaces of the trowel sections 28g and the glass substrate w4 can be maintained to respective constant values. Preferably, the contact sections 28b are subjected to, for example, an Ni water-repellent plating process in order to improve their sliding performance relative to glass substrates w3 and w4. Additionally, the contact sections 28b are preferably beveled to show bevels at the lateral edges thereof running in the direction of insertion so that they may be smoothly fitted into the outer peripheral gap k. The bevels can be formed by producing straight or round slopes at the related edges by cutting, grinding or etching.

Molten solder M1 is discharged from the discharge port 27h onto the top surface of the guide section 28. In a preferable mode of carrying out the present invention in this example, guide grooves 28h are formed on the top surface of the guide section 28 in order to smoothly guide molten solder M1 to the front end section 28d. The plurality of guide grooves 28h are formed continuously along the center axis of the part of the flow path 27i located close to the discharge port 27h in the direction of which molten solder M1 is discharged and on the top surfaces of the base end sections 28e, the slope section 28f and the front end section 28d. Note that the guide groove forming mode of this example is not limited to the one illustrated in FIG. 36(a) and alternatively a single guide groove 29a may be formed on the plate-shaped body 28c with a predetermined width and a predetermined depth. Like the guide section 30 as shown in FIG. 37(a), the projecting bodies 28a extend to the slope section 28f and further to the base end section 28e and a guide groove 30a is formed by using the projecting bodies 28a as its lateral surfaces. A single guide groove or a plurality of guide grooves may be formed according to the flowability of molten solder M1, the size g of the outer peripheral gap k and other factors.

Molten solder M1 flows on the top surface of the guide section 28 and is supplied to the first gap Gu. The supply cylinder of this example is provided with a through hole 29b or a through hole 28i that is a cutout 28j formed respectively by cutting through or cutting out the front end section 28d in the direction of the thickness thereof in order to guide the molten solder M1 that is supplied to the first gap Gu further to the second gap Gd as shown in FIG. 36 and in FIG. 37(a). Alternatively, as in the case of the guide section 31 shown in FIG. 37(b), a cut out section 31a may be formed on the lateral surface of the front end section that faces the moving direction of the guide section 28 indicated by an arrow in which the guide section 28 is inserted and moved in the outer peripheral gap k so as to inject the molten solder M1 that is injected into the first gap Gu further into the second gap Gd. The cut out section 31a is also a variety of the through hole section 28i.

By arranging such a through hole section 28i, as the guide section 28 inserted into the outer peripheral gap k is moved along the outer peripheral gap k, the molten solder M1 injected into the first gap Gu is satisfactorily led to the second gap Gd. Then, as a result, molten solder M1 flows so as to be supplied from the gaps Gu and Gd to a part of the outer peripheral gap k located behind the guide section 28 as viewed in the moving direction of the guide section 28 and applied to the main surfaces of the glass substrates w3 and w4 by the trowel section 28g. The width of the supplied molten metal M1 is substantially determined by the length L2 of the trowel section 28g so that it is stable. The thickness T2 of the trowel section 28g may be selected on the basis of the size of the gap Gu and that of the gap Gd that are by turn selected so as to make molten solder M1 contact the glass substrates w3 and w4 under uniform pressure when the molten solder M1 is applied. The gaps Gu and Gd are preferably narrow for molten metal M1 to follow and move with the trowel section 28g so as to be applied satisfactorily to the glass substrates w3 and w4. The surface of the trowel section 28g is provided with fine grooves that intersect the moving direction thereof in order to improve the follow-up performance of molten solder M1.

Now, the supply cylinder 27 will be described in detail. The supply cylinder 27 supplies molten solder M1 from the first opening 27g formed at the one surface 27k and discharges molten solder M1 from the discharge port 27h that is the second opening formed at the other surface 27l. The molten solder M1 that is supplied to the first opening 27g is produced by, for example, feeding thread solder M to the first opening 27g at a predetermined rate and melting the thread solder M by the supply cylinder 27 so that molten solder M1 may be supplied at a controlled rate at which the molten solder M1 can satisfactorily fill the outer peripheral gap k of the glass substrates w3 and w4.

As shown in FIG. 35, the supply cylinder 27 includes a flow path 27i through which molten solder M1 produced by melting thread solder M flows, a melting surface 27k for melting thread solder M where a first opening 27g of the flow path 27i is formed and a discharge surface 27l where a discharge port 27h is formed and a heater 27j is wound around its outer peripheral surface to melt thread solder M. The supply cylinder 27 having the above-described arrangement can feed thread solder M at a controlled speed that is good for making the thread solder M contact the melting surface 27k in an attitude in which its lower end closes the first opening 27g and press the thread solder M against the melting surface 27k to melt it. Then, molten solder M1 flows through the flow path 27i and is continuously discharged from the discharge port 27h.

The melting surface 27k where the first opening 27g is formed is the bottom surface of a recessed section produced by, for example, spot facing a corresponding part of the lateral surface of the supply cylinder 27. The diameter øB of the first opening 27g is less than the diameter øA of the end facet of the thread solder M that contacts the melting surface 27k and the flow path 27i is formed as a tubular path having a diameter øB at least at and near the melting surface 27k. As a result, if oxides E are formed on the outer peripheral surface of the thread solder M, the oxides E trying to flow into the flow path 27i is blocked by the outer peripheral edge of the first opening 27g, or the melting surface 27k, and only clean molten solder M1 that is substantially not mixed with oxides E flows into the flow path 27i. Since the thickness of the layer of oxides E produced on the surface of the thread solder M that is stored in the atmosphere is normally about tens of several μm, it is sufficient for the difference between the diameter of the thread solder M and the diameter of the first opening 24g, of øA−øB, to be about 1 mm.

Preferably, a peripheral wall 27m is formed around the outer periphery of the supply cylinder 27 so as to surround the melting surface 27k. The oxides E that are prevented from flowing into the flow path 27i is stored in the concaved bottom section of the melting surface 27k, which may well be made to flow out and collected appropriately by sucking or by cutting out a part of the peripheral wall 27m. A terminal section of the flow path 27i located close to the discharge surface 27l is preferably so formed as to be substantially orthogonal relative to the discharge surface 27l. Then, as a result, when the supply cylinder 27 is positioned so as to make the discharge surface 27l squarely face the outer peripheral end facet of the glass substrate w3 with a gap s separating them, the flow path 24i is held in parallel with the outer peripheral gap k at and near the discharge surface 24n.

Note that in the case of the supply cylinder 27 shown in FIG. 36(a), a cut out groove is formed at a lower part of the discharge surface 27 and the guide section 28 is incorporated into the supply cylinder 27 as the base end section 28e thereof is inserted into the cut out groove so as to expose the base end section 28e to the flow path 27i. However, it is not necessary that the top surface of the guide section 28 is exposed to the flow path 27i so long as the molten solder M1 discharged from the discharge port 27h flows only on the top surface. As in the case of the supply cylinder 32 shown in FIG. 39(a), a lower part of the supply cylinder 27 including the flow path 27i may be cut out to produce a cut out section for a predetermined axial length from the discharge surface 27l and the top surface of the base end section 28e may be brought into tight contact with and bonded to the top surface of the cut out section so as to close the cut out section. A seal plate 32a may be arranged when a gap is produced at the bonding section of the cut out section and the base end section 28e.

Alternatively, as in the case of the supply cylinder 32 shown in FIG. 39(b), a fitting surface to which the flow path 27i is not exposed may be axially formed at a lower part of the supply cylinder 27 and the top surface of the base end section 28e may be brought into tight contact with and bonded to the fitting surface. Still alternatively, in the supply cylinder 27 shown in FIG. 36(a), an insertion hole may be cut in the cylinder part of the supply cylinder 27 from the discharge surface 27l in such a way that the flow path 27i is not exposed to it and the guide section 28 may be incorporated into the supply cylinder 27 by inserting the guide section 28 into the insertion hole.

While the front end section 28d and the base end section 28e of the guide section 28 are arranged in parallel with each other in the case of the supply cylinder 27 shown in FIG. 36(a), the front end section 28d and the base end section 28e may alternatively be so arranged as to intersect each other with a predetermined angle.

The operation of supplying molten solder M1 of the above-described supply cylinder 24 will be described below. The supply apparatus is so arranged that, when molten solder M1 is being supplied and flowing in a steady state in the supply cylinder 27, the supply apparatus moves along the outer peripheral gap k of glass substrates w3 and w4. The steady state refers to a state where molten solder M1 can be discharged from the discharge port 27h onto the top surface of the guide section 28 and injected into the outer peripheral gap k and also a state where the discharge port 27h is substantially filled with molten solder M1 as shown in FIG. 38. Preferably, the duration of time that is spent from the time when the supply of molten solder M1 from the first opening 27g starts to the time when this steady state is reached is as short as possible. For this reason, the rate of supplying molten solder M1 is controlled in such a way that the flow path 27i is quickly filled with molten solder M1 when the supply of molten solder M1 is started and the flow of molten solder M1 is still in an unsteady state but molten solder M1 can satisfactorily fill the outer peripheral gap k in a steady state.

In a steady state, the molten solder M1 discharged from the discharge port 27h is supplied into the outer peripheral gap k only from the top surface of the guide section 28 as shown in FIG. 38. Therefore, the molten solder M1 is injected firstly into the first gap Gu and then into the second gap Gd by way of the first gap Gu. At this time, the molten solder M1 is injected into the first gap Gu, filling the gap s between the top surface of the slope section 28f and the glass substrate w3. Thus, the molten solder M1 flows down the slope section 28f and, since a guide groove 28h is formed in the guide section 28 along the direction of the flowing down molten solder M1, the molten solder M1 is inject into the first gap Gu very smoothly. Meanwhile, the molten solder M1 existing in the gap s between the top surface of the slope section 28f and the glass substrate w3 scarcely leaks from the slope section 28f because the front end section 28d is there. Therefore, it is possible to form a bonding section n without any molten solder M1 leaking out to the projecting part of the lower glass substrate w4.

Thus, when the supply cylinder 27 as described above is used, the supplied clean molten solder M1 is only slightly brought into contact with the external atmosphere at the gaps between the discharge surface 27l and the corresponding end facet of the glass substrate w3 and also at the gaps Gu and Gd before the clean molten solder M1 is filled into the outer peripheral gap k of the glass substrates w3 and w4. Therefore, the supplied clean molten solder M1 contacts the main surfaces of the glass substrates w3 and w4 in a state where oxidation thereof is suppressed even in the atmosphere. Thus, the supply apparatus of this example is suitable for using SnAgAl based alloy solder that shows an excellent bonding performance with glass by way of oxygen existing to an appropriate extent. To improve the filling performance of molten solder M1, the area of the surface of the guide section 27 that contacts molten solder M1 is preferably subjected to a process for raising its wettability relative to molten solder M1. For example, it is preferably coated with Ag, Cr, Al, Mo, W, V, Nb or Ta. Additionally, it is preferably subjected to a nitriding treatment, which is an anti-corrosion treatment, so that the surface of the guide section 27 may not be corroded by molten solder M1 and impurities may not be mixed into the molten solder M1. The surface of the flow path 27i is also preferably subjected to those processes.

Now, the operation of supplying molten solder M1 to the outer peripheral gap k of the supply apparatus of this example will be described below. The glass substrates w3 and w4 that are laid one above the other with a gap maintaining member Q having a predetermined size interposed between them are placed in position on a table that contains a heat emitting body and movable in the two axial directions of the X-axis and the Y-axis and the glass substrates w3 and w4 are heated to about the melting temperature of molten solder M1. The trowel section 28g of the guide section 28 of the supply cylinder 27 is inserted into a predetermined position in the outer peripheral gap k of the glass substrates w3 and w4 located at or near one of the edges of each of them and the supply cylinder 27 is moved so as to produce a predetermined gap s between the end facet of the glass substrate w3 and the discharge surface 27l. The position of the trowel section 28g is adjusted in advance so that the trowel section 28g comes to a position at the vertical center of the outer peripheral gap k or its vicinity at this time, although it is difficult to rigorously adjust the position so as to make it agree with the vertical center of the outer peripheral gap k. However, if the position is not adjusted satisfactorily, some of the contact sections 28b can hit the end facet of the glass substrate w3 or w4 if the trowel section 28g is successfully inserted into the outer peripheral gap k. The supply cylinder 27 is supported by a floating mechanism in terms of its vertical position and the contact sections 28b are beveled so that the contact sections 28b can be inserted into the outer peripheral gap k with ease. Then, as a result, the trowel section 28g is placed substantially at the vertical center of the outer peripheral gap k and the upper gap Gu and the lower gap Gd between the trowel section 28g and the glass substrates w3 and w4 become equal to each other.

Since molten solder M1 is supplied to the flow path 27i at a controlled and predetermined flow rate, a steady state is reached within a short period of time and the glass substrates w3 and w4 can be moved quickly in a direction (the X-direction) at a predetermined speed in order to supply molten solder M1 to one of the sides of the outer peripheral gap k. Meanwhile, molten solder M1 is injected into the gaps Gu and Gd and supplied into the outer peripheral gap k of the glass substrates w3 and w4 but, since no molten solder M1 is supplied from the bottom surface of the guide section 28, no molten solder M1 leaks to the projecting part of the lower glass substrate w4. Additionally, since the contact sections 28b are fitted into the outer peripheral gap k and held in a floating state, they follow the vertical positional fluctuations of the outer peripheral gap k that can arise when the glass substrate w4 has a varying thickness and/or the table surface has vertical undulations in the X-direction and the sizes of the gaps Gu and Gd are maintained. Then, as a result, a substantially same quantity of molten solder M1 is injected both along the top, surface and along the bottom surface of the trowel section 28g so that the molten solder M1 that moves as the trowel section 28g moves shows a same state both in the gap Gu and in the gap Gd and hence molten solder M1 is supplied equally to the main surface of the glass substrate w3 and to the main surface of the glass substrate w4.

Besides, as ultrasonic vibrations are employed and applied to the guide section 28 during a molten solder filling operation, both the wettability of the guide section 28 and that of the glass substrates w3 and w4 relative to molten solder M1 are improved so that molten solder M1 is smoothly supplied if the gaps Gu and Gd are narrow. The ultrasonic vibrations also act on the main surfaces of the glass substrates w3 and w4 by way of molten solder M1 to remove the air bubbles and the foreign objects such as oxide film existing at the contact interfaces of molten solder M1 and the glass substrates w3 and w4. Then, the bonding performance of molten solder M1 relative to the glass substrates w3 and w4 is improved to effectively improve the bonding strength of the glass panel W.

As the operation of supplying molten solder M1 to one of the sides of the outer peripheral gap k is completed in a manner as described above, the casing 27e equipped with the supply cylinder 27 is driven to turn by 90° in the horizontal direction and then the glass substrates w3 and w4 are driven to move horizontally in the direction of a side thereof that is orthogonal to the above-described side. Then, molten solder M1 is supplied into the outer peripheral gap k at this side as in the case of the above-described side but molten solder M1 scarcely leaks onto the projecting part of the glass substrate w4. This operation is repeated sequentially at each of the sides and molten solder M1 is supplied to all the sides of the outer peripheral gap k of the glass substrates w3 and w4 without leaking to the projecting part of the glass substrate w4. As the operation of supplying molten solder M1 to the glass substrates w3 and w4 is completed, the table on which the glass substrates w3 and w4 are placed is moved to the outside. The glass substrates w3 and w4 are then removed from the table that is moved to the outside but no molten solder M1 is adhering to the table so that no operation is required to remove solder from the table.

Subsequently, another table on which another pair of glass substrates w3 and w4 are placed and heated for preparation is brought in and another operation of supplying molten solder M1 same as the above-described operation is started to the outer peripheral gap k of the new glass substrates w3 and w4. Note, however, that the vertical position of the outer peripheral gap k of the new glass substrates w3 and w4 can be different from the position of the outer peripheral gap k of the former glass substrates due to the difference of thickness between the new and old glass substrates w4 and/or the difference of state where glass substrates w3 and w4 are fitted to the table. If such is the case, the supply apparatus of this example can insert the trowel section 28g into the vertical center position of the outer peripheral gap k and fill the outer peripheral gap k with molten solder M1 in a state where the size of the gaps Gu and Gd is maintained because the supply cylinder 28 is vertically supported by a floating mechanism and the contact sections 28b are provided with bevels.

When the guide section 28 moves along the outer peripheral gap k, molten solder M1 permeates between the contact sections 28b and the main surfaces of the glass substrates w3 and w4 due to the capillary phenomenon. After the contact sections 28b contact and pass the respective main surfaces, molten solder M1 flows from the trowel section 28g and supplied to the contact regions of the contact sections 28b as it is drawn by the molten solder M1 that permeates. Molten solder M1 may not be supplied to all the contact regions of the contact sections 28b if the length of the contact sections 28b is large so that the length of the contact sections 28b is preferably small and suitably about 10 to 20% of the width of the bonding section n. The top and bottom surfaces of the contact sections 28b may not necessarily be planes as shown in FIG. 36 or 37 but may alternatively be planes where grooves are formed or curved surfaces.

Example No. 4-2

Figure 40:
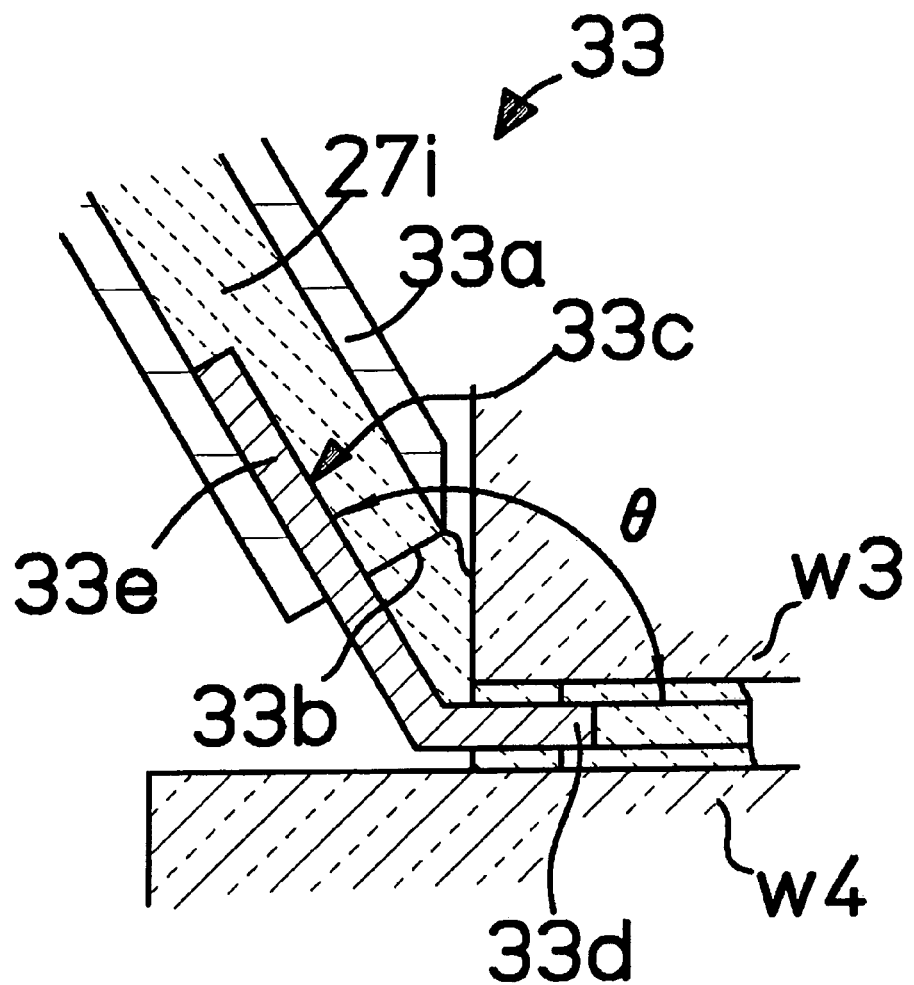
FIG. 40 is a perspective view of the supply cylinder of the molten metal supply apparatus of Example No. 4-2.

A molten metal supply cylinder and a molten metal supply apparatus incorporating such a supply cylinder will be described below as Example No. 4-2 by referring to FIG. 40. A plate-shaped body 28c having a front end section 28d, a base end section 28e and a slope section 28f linking those sections and bent twice to show a step-like profile is employed as an element of the guide section 28 in the above description of the supply cylinder 27 of Example No. 4-1. On the other hand, an L-shaped plate-shaped body 33c showing a predetermined angle θ as shown in FIG. 40 is employed as an element of the guides section of the supply cylinder 33 of this example. In other words, the plate-shaped body 33c is bent once so as to have a front end section 33d and a slope section 33e, which is fitted to the bottom section of discharge port 33b in an attitude of being parallel to the flow path 27i. Like the above-described supply cylinder 27, the supply cylinder 33 of this example can supply molten solder M1 to the outer peripheral gap k as molten solder M1 flows only on the top surface of the plate-shaped body 33c but the plate-shaped body 33c can be made to show a simplified profile if compared with its counterpart of the above-described supply cylinder 27. Additionally, the supply cylinder 33 of this example is so arranged that the flow path 27i is inclined downwardly by a predetermined angle θ relative to the outer peripheral gap k when molten solder M1 is supplied to the outer peripheral gap k. Thus, the molten solder M1 on the flow path 27i can easily flow out downward. In other words, the molten solder M1 on the flow path 27i shows a high degree of fluidity. For this reason, molten solder M1 can be supplied well to the outer peripheral gap k.

Example No. 4-3

Figure 41:
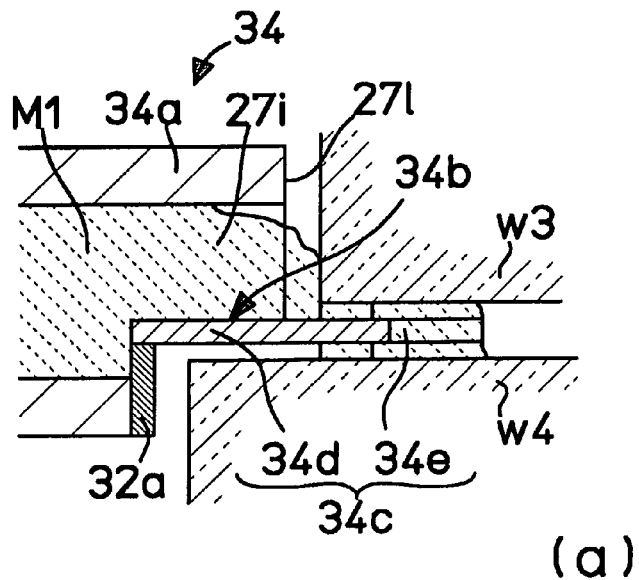
FIG. 41 is a perspective view of the supply cylinder of the molten metal supply apparatus of Example No. 4-3.
Figure 41:
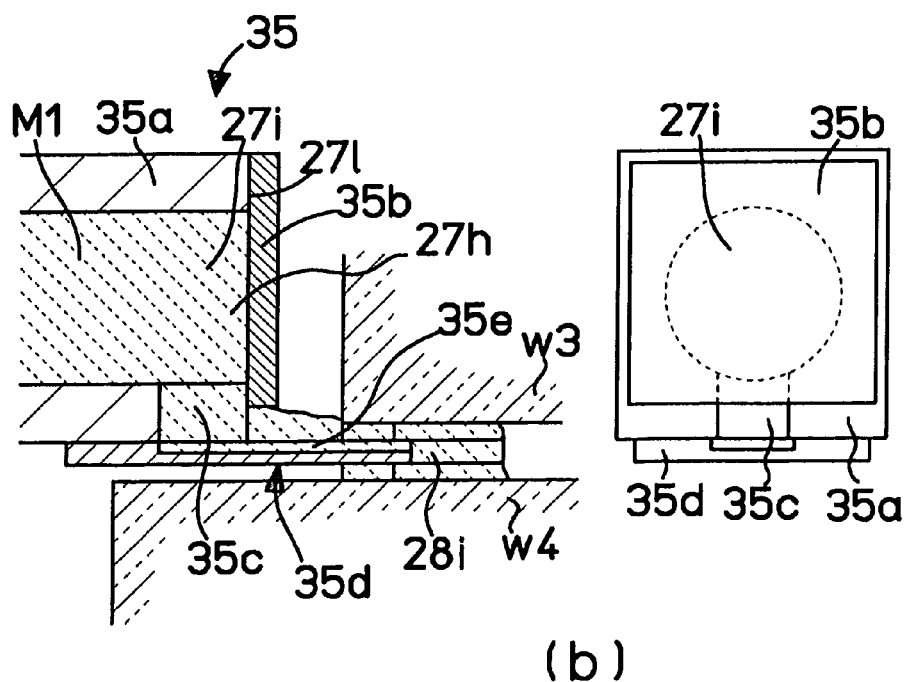

A molten metal supply cylinder and a molten metal supply apparatus incorporating such a supply cylinder will be described below as Example No. 4-3 by referring to FIG. 41.

Each of the supply cylinders 27 and 33 of Examples No. 4-1 and No. 4-2 are formed by bending a plate-shaped body once or twice. The supply cylinders 34 and 35 of this Example differ from them in that a flat and linear plate-shaped body having a front end section and a base end section that are linearly and directly linked is employed as an element of the guide section thereof. A bottom part of the supply cylinder 34 shown in FIG. 41(a) including the flow path 27i is cut out in the axial direction from the discharge surface 27l by a predetermined length to produce a cut out section and a top surface of the base end section 34d of the plate-shaped body 34c is bonded to the cut out section to close the cut out section so that molten solder M1 is made to flow only on the top surface of the plate-shaped body 34c and supplied into the outer peripheral gap k by way of the front end section 34e that is inserted into the outer peripheral gap k. Note that the length of the cut out section is greater than that of the projecting part of the lower glass substrate w4 and, when a gap is produced between the cut out section and the base end section 34d that are bonded to each other, a sealing plate 32a is arranged to seal the gap. With this arrangement, any possible interference of the projecting part of the glass substrate w4 with the supply cylinder 34 can be avoided if the supply cylinder 34 is not arranged above the glass substrate w4 when supplying molten solder M1.

A supply cylinder 35 showing a square cross section with a plane bottom surface for receiving the base end section 35d to be fitted thereto as shown in FIG. 41(b) may alternatively be employed. When such a supply cylinder 35 is used, molten solder M1 may be discharged from the entire area of the discharge port 27h that is open at the discharge surface 27l onto the top surface of the guide section 35d. However, from the viewpoint of preventing molten solder M1 from being oxidized, preferably a lid 35b having a discharge port 35c, which opens only at a lower part of the discharge port 27h and closes the remaining upper part of the discharge port 27h, is fitted to the discharge surface 27l. Such a lid 35b that closes the discharge surface 27l is also applicable to the supply cylinders of the above-described Examples No. 4-1 and No. 4-2.

Figure 42:
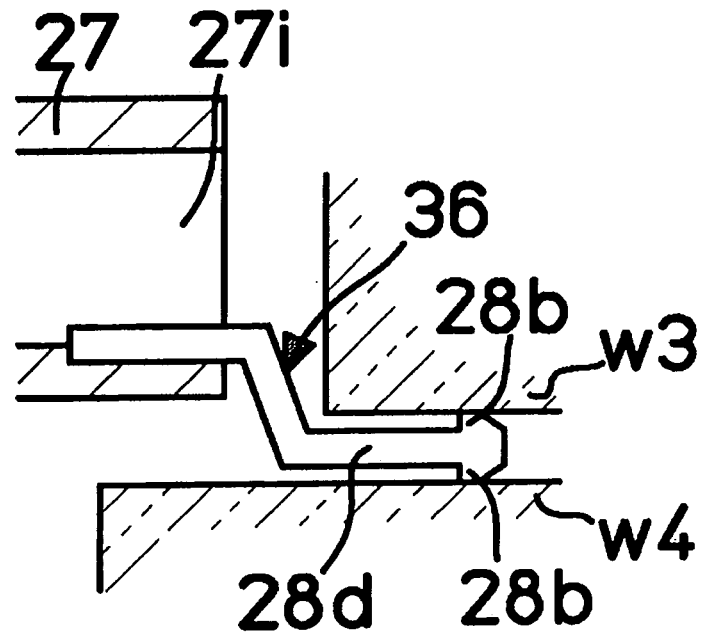
FIG. 42 is an enlarged cross-sectional view of an exemplar modified contact section of the guide section of FIG. 36.
Figure 42:
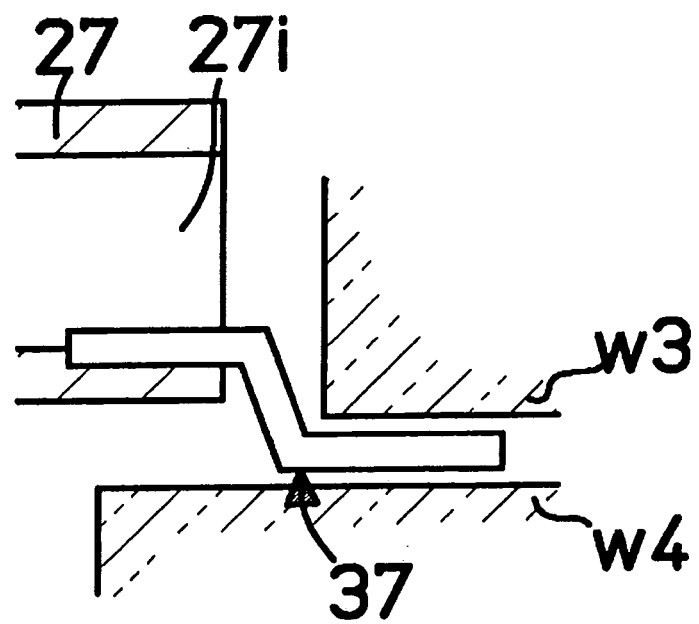

A supply cylinder in which the contact sections for maintaining the gaps between the trowel section and the main surfaces of glass substrates are arranged at the rear end side of the plate-shaped body is described in each of the above Examples No. 4-1, No. 4-2 and No. 4-3. However, a guide section 36 in which contact sections 28b are arranged at the front end of the front end section 28d thereof as shown in FIG. 42(a) can also be employed. A bonding section having a constant width can be formed by means of such a guide section 36.

Alternatively, a guide section 37 having no contact sections as shown in FIG. 42(b) may be used. Such a guide section 37 can find applications where small size glass substrates having a side of several to tens of several centimeters and scarcely showing variances of thickness are employed with a glass substrate moving mechanism that vibrates minimally when guiding glass substrates and the gaps involved in the supply apparatus fluctuate only to a negligible extent. Note that a supply apparatus including such a guide section may not necessarily require a floating mechanism for supporting the supply cylinder.

The above examples are described above in terms of a glass panel W by using glass substrates w3 and w4 having different dimensions in plan views, the sides of the lower glass substrate w4 projecting beyond the corresponding respective sides of the upper glass substrate w3. However, supply apparatus of the above-described examples can also find applications for a glass panel W by using glass substrates w3 and w4 having same dimensions in plan views, the sides of the lower glass substrate being aligned with the corresponding respective sides of the upper glass substrate.

[Fifth Mode of Carrying Out the Invention]

A molten metal supply cylinder according to (38) described above, a molten metal supply apparatus incorporating such a supply cylinder and a molten metal supply method will be described below by way of Example No. 5 showing a desirable mode of carrying out the present invention.

Example No. 5

A molten metal supply cylinder and a molten metal supply apparatus incorporating such a supply cylinder will be described below as Example No. 5 by referring to FIGS. 43 to 49.

Firstly, the supply apparatus of this example will be described. The supply apparatus is adapted to manufacture a glass panel W as described above by referring to FIGS. 51(a) and 51(b). The supply apparatus includes a supply cylinder 38, a holder 38a to which the supply cylinder 38 is fitted, a floating mechanism 38b for making the holder 38a float mainly up and down and a casing 38e for supporting the floating mechanism 38b. The floating mechanism 38b can be realized as a structure provided with upper and lower rubber pieces or springs showing an appropriate degree of resiliency so as to be able to allow the supply cylinder 38 to maintain its attitude without exerting excessive force to the glass substrates w3 and w4 or the supply cylinder 38. Preferably, an ultrasonic vibration body 38c fitted to the holder 38a is connected to the supply cylinder 38 by way of a shaft member 38d so as to longitudinally apply ultrasonic vibrations to the supply cylinder 38.

Figure 43:
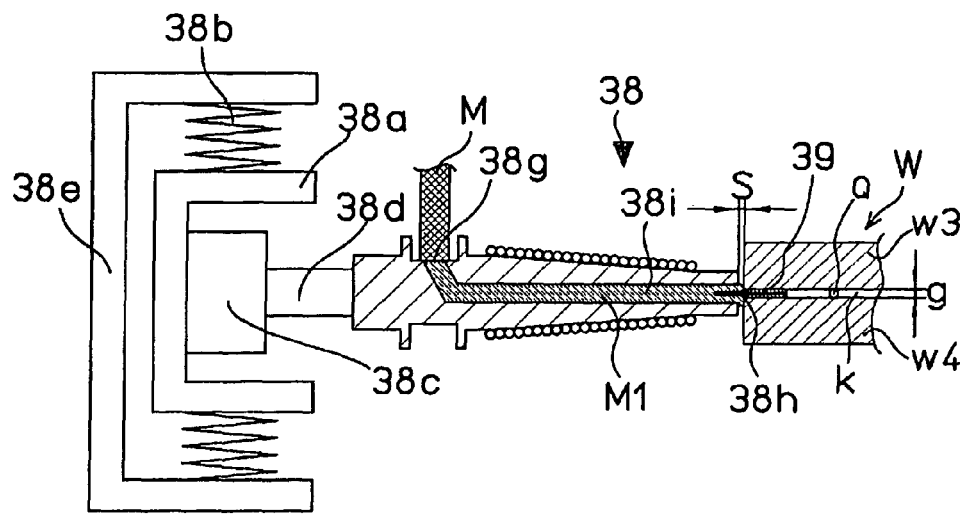
FIG. 43 is a schematic illustration of the configuration of the molten metal supply apparatus of Example 5.
Figure 44:
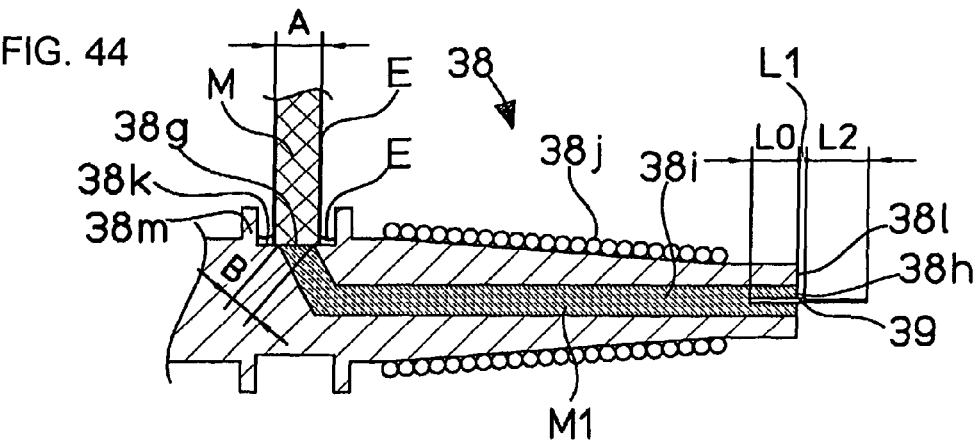
FIG. 44 is an enlarged cross-sectional view of the supply cylinder of FIG. 43, showing the configuration thereof.

As shown in FIGS. 43 and 44, the supply cylinder 38 contains in the inside thereof a flow path 38i showing a circular cross section for allowing molten solder M1 to flow through the flow path 38i that is open at one of the surfaces, or the surface 38k, and at the other surface, or the surface 38l, thereof and has a guide section 39 fitted thereto. The guide section 39 is inserted into the flow path 38i by a depth of LO so as to extend orthogonally relative to the other surface 38l, crossing second opening (to be referred to as discharge port for Example 5 hereinafter) 38h. Thus, the supply cylinder 38 supplies the molten solder M1 supplied from the opening at the surface 38k (to be referred to as first opening for Example 5 hereinafter) and discharged from the second opening 38h into the outer peripheral gap k by way of the guide section 39.

The supply apparatus inserts the guide section 39 of the supply cylinder 38 into the outer peripheral gap k of glass substrates w3 and w4 so as to produce a state where the other surface 38l is separated from the corresponding peripheral end facets of the glass substrates w3 and w4 by a predetermined gap s and moves the supply cylinder 38 at a predetermined speed so as to make a full turn along the outer peripheral gap k. The supply apparatus may not necessarily be solely responsible for carrying out the move and the table on which the glass substrates w3 and w4 are placed may be made to participate in the operation of carrying out the move so as to relatively move the supply cylinder and the glass substrates. In other words, the structure of the supply apparatus is variable and can be defined according to the mode of moving the supply cylinder. Regardless of the structure of the supply apparatus that is defined according to the mode of moving the supply cylinder, the mechanism for moving glass substrates w3 and w4 and the mechanism for moving the supply apparatus can be realized by means of known techniques, for example by combining a motor and a ball screw or a linear guide for linear movements and combining a motor or a cylinder and a bearing for revolving movements. The casing 24e may well be fitted to a moving mechanism by way of a jig or the like for adjusting its vertical position. With the above-described arrangement, the height of the guide section 25 can be adjusted relative to the outer peripheral gap k of the glass substrates w3 and w4 by seeing the thickness of the glass substrate w4 and the height of the gap maintaining member Q.

Figure 45:
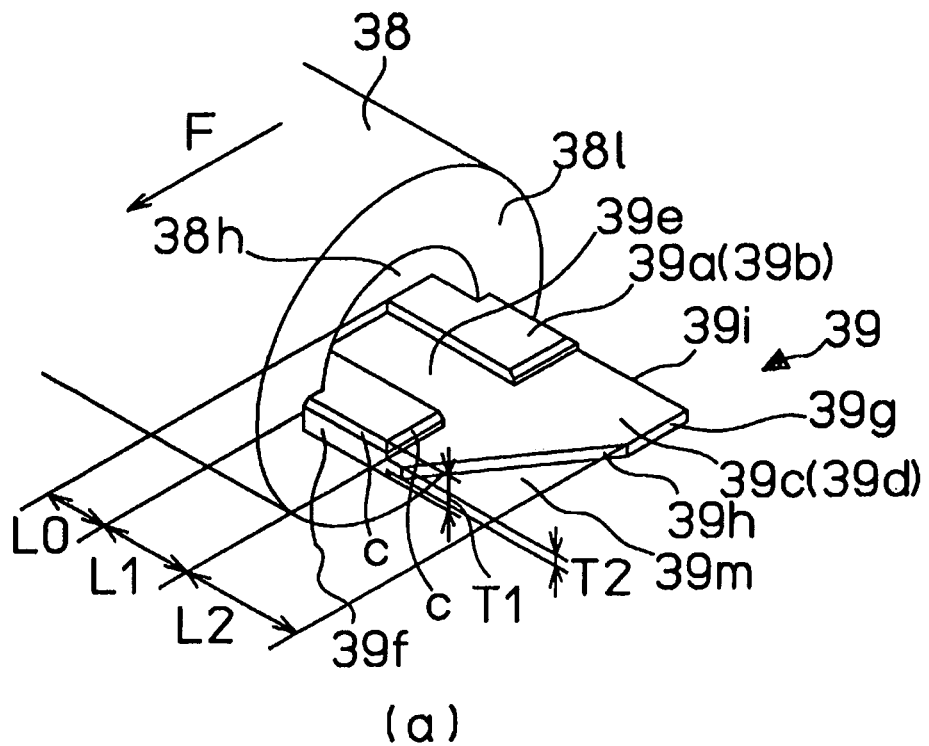
FIG. 45 is a perspective view of the guide section of FIG. 43, showing the configuration thereof
Figure 45:
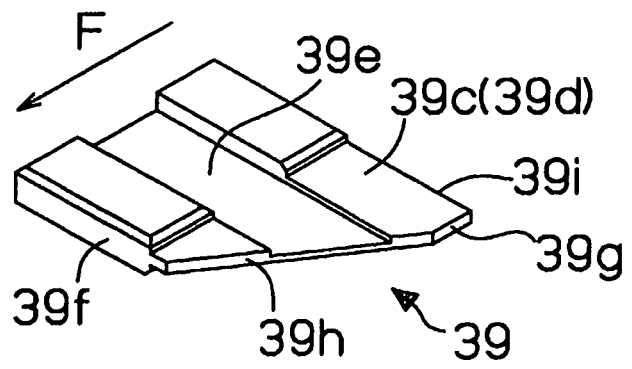

As shown in FIG. 45, the guide section 39 includes a plate-shaped body 39c having a thickness (T2) smaller than the size g of the outer peripheral gap k of the glass substrates w3 and w4 and projecting bodies 39a projecting from the top surface and the bottom surface of the plate-shaped body 39c and having a thickness (T1) substantially equal to the size of the outer peripheral gap. Note that the projecting bodies 39a of this example are arranged at left and right at the rear end side of the plate-shaped body 39c and the guide section 39 is fitted to the supply cylinder 38 in a state of being inserted into the supply cylinder 38 so as to horizontally cross the discharge port 38h substantially at the center thereof.

Figure 46:
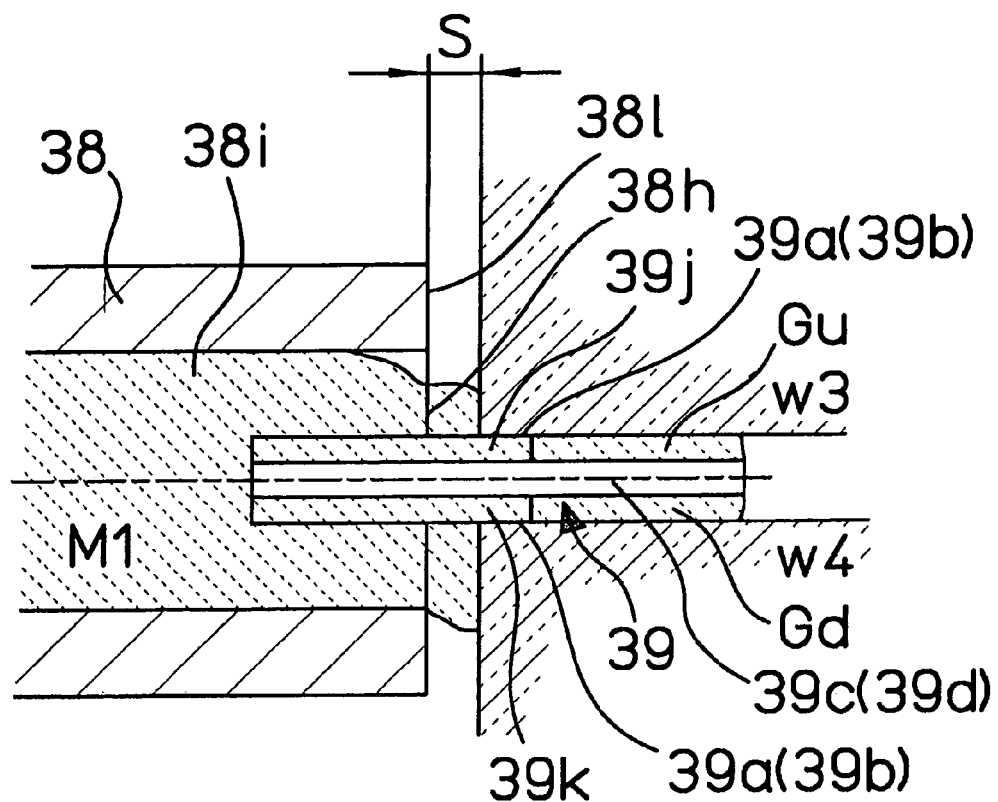
FIG. 46 is an illustration of a state of supplying molten solder by the guide section of FIG. 43.
Figure 47:
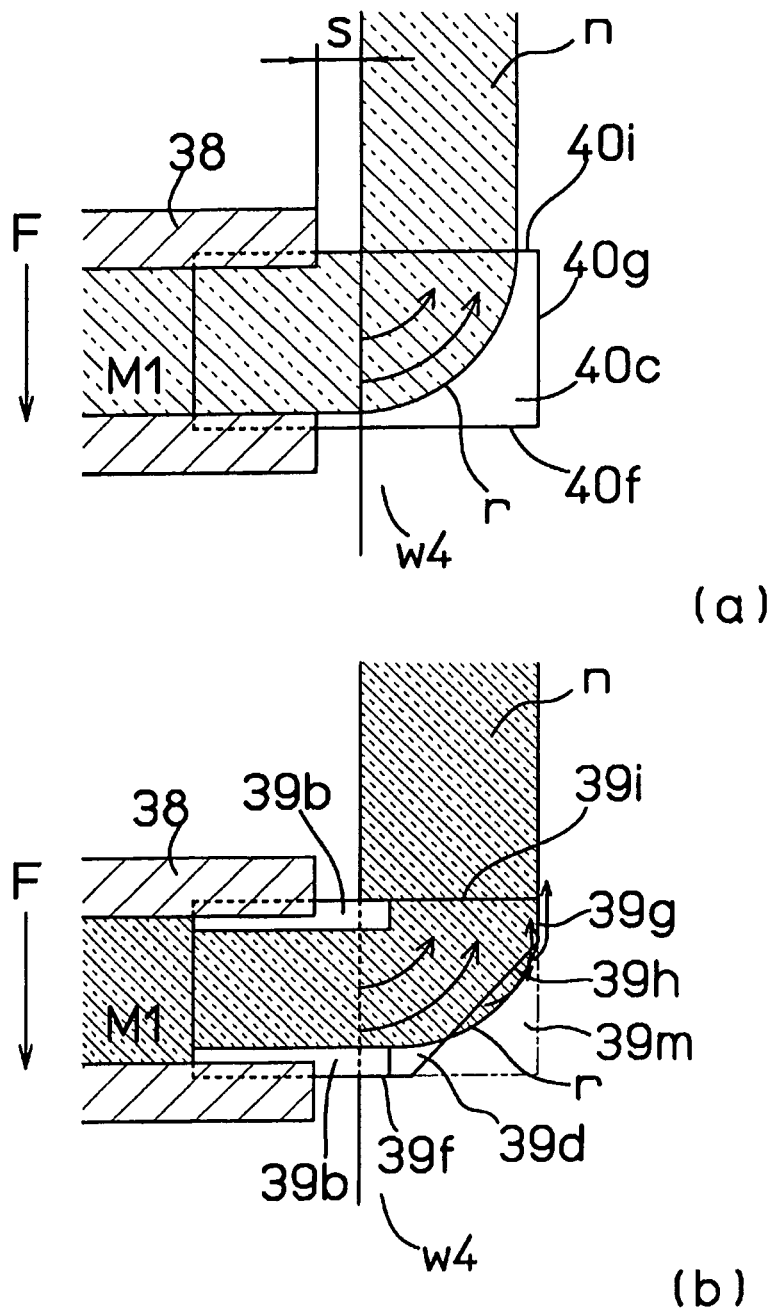
FIG. 47 is an illustration of a state of flowing molten solder in the guide section of FIG. 43.

As shown in FIG. 46, the guide section 39 is inserted into the outer peripheral gap k of the glass substrates w3 and w4 and supplies the molten solder M1 discharged from the discharge port 38h of the supply cylinder 38 to the outer peripheral gap k. As the guide section 39 is driven to move along the outer peripheral gap k, the guide section 39 makes molten solder M1 to slide on the main surfaces of the glass substrates w3 and w4 or, in other words, supplies molten solder M1 into the outer peripheral gap k, while applying the molten solder M1 to the main surfaces of the glass substrates w3 and w4. The part L2 of the plate-shaped body 39c to be inserted into outer peripheral gap k as shown in FIG. 45 is referred to as trowel section 39d hereinafter. The projecting bodies 39a formed on the top surface and the bottom surface of the plate-shaped body 39c are so formed as to project from the discharge port 38h by a length of L1. The projecting bodies 39a has respective contact surfaces that can be slide on the main surfaces of the glass substrates w3 and w4 when they are inserted into the outer peripheral gap k. The parts of the projecting bodies 39a where the contact surfaces are formed are referred to as contact sections 39b hereinafter.

As shown in FIG. 46, the trowel section 39d injects the molten solder M1 supplied from the discharge port 38h into the first gap Gu between the top surface of the trowel section 39d and the glass substrate w3 and the second gap gd between the bottom surface of the trowel section 39d and the glass substrate w4 and applies the molten solder M1 to the main surfaces of the glass substrates w3 and w4. Therefore, for molten solder M1 to be applied well to the main surfaces of the glass substrates w3 and w4, the gaps Gu and Gd are preferably narrow so that the molten solder M1 follows the move of the trowel section 39d. However, when the gaps Gu and Gd are narrow, it is difficult for the injected molten solder M1 to get to the front end of the trowel section 39d because of fluid resistance.

Now, how the molten solder M1 injected into the gaps Gu and Gd flows will be discussed below by referring to FIG. 47(a). FIG. 47(a) shows a trowel section 40c formed at a front end part of a plate-shaped body showing a rectangular plan view. It is assumed that the trowel section 40c moves in the direction of arrow F.

Referring to FIG. 47(a), the molten solder M1 supplied from the supply cylinder 38 flows in the gaps Gu and Gd toward the front end 40g of the trowel section 40c. Since the flowing speed of the molten solder M1 is forced to fall as it moves toward the front end 40g by fluid resistance and the trowel section 40c is moving in the direction of arrow F, the moving direction of the molten solder M1 flowing in the gaps Gu and Gd is shifted backward relative to the moving direction F as it advances toward the front end of the trowel section 40c. The flow line of the molten solder M1 flowing in the gaps Gu and Gd can vary as a function of the supply rate of molten solder M1, the flow speed of molten solder M1 at the entrances of the gaps Gu and Gd, the friction coefficient of the glass substrates and the trowel section, the wettability of the glass substrates and the trowel section relative to molten solder M1, the moving speed of the trowel section 40c and other molten solder supply conditions. All in all, the outer periphery r of the molten solder M1 flowing through the gaps Gu and Gd does not get to the front end 40g of the trowel section 40c when the gaps Gu and Gd are made narrow.

The molten solder M1 that flows through the gap Gu and the molten solder M1 that flows through the gap Gd meet each other to be filled into the outer peripheral gap after leaving the rear surface 40i of the trowel section 40c. The width of the bonding section n that is ultimately produced is determined by the width to which the molten solder M1 is filled into the outer peripheral gap and applied to the main surfaces of the glass substrates w3 and w4 after leaving the rear surface 40i of the trowel section 40c. The application width is determined by the position of the outer periphery r of the molten solder M1 at the rear surface 40i. As long as the outer periphery r of the molten solder M1 does not get to the front end 40g of the trowel section 40c after flowing through the gaps Gu and Gd, molten solder M1 flows through the gaps Gu and Gd in a state where the flow of molten solder M1 is not subjected to any restriction and hence it is not stabilized. Therefore, when some or all of the molten solder supply conditions as described above are changed, the state of the flowing molten solder M1 also changes. More specifically, the molten solder that flows through the first gap Gu and the molten solder that flows through the second gap Gd leave the rear surface 40i at positions that are differentiated from each other by the different outer peripheries r to consequently produce an uneven application width. Additionally, at the front end side of the trowel section 40c, voids and other defects arise at the contact interfaces of the molten solder M1 and the glass substrates because the quantity of molten solder M1 that moves to follow the move of the trowel section 40c is small. Such defects degrade the bonding strength and the sealing performance of the bonding section relative to the glass substrates. The application width can be stabilized by increasing the pressure under which molten solder M1 is supplied to raise the rate of supplying molten solder M1 and make the molten solder M1 get to the front end of the trowel section 40c because the flow of molten solder M1 is restricted by the front end 40g. However, in such a case, molten solder M1 leaks from the gap s between the supply cylinder 38 and the corresponding end facets of the glass substrates to give rise to a problem of degrading the appearance and the quality of the produced glass panel.

The guide section 39 of Example No. 5 dissolves the above problem. As shown in FIG. 45, the trowel section 39d of the guide section 39 has a cut out section 39m at the lateral side facing the moving direction F and at the front end as viewed in the projecting direction of the trowel section 39d. More specifically, the trowel section 39d has such a profile that the trowel section 39d includes a front surface 39f that is orthogonal relative to the moving direction F, a front end facet 39g that is disposed at the front end of the projecting direction of the trowel section 39d so as to run in parallel with the moving direction F, an oblique facet 39h that runs obliquely and backwardly from the front surface 39f as viewed in the moving direction F of the trowel section 39d and produced by beveling the trowel section 39d at the corner where the front surface 39f and the front end facet 39g meet, and a rear surface 39i. The area defined by a prolonged line of the front surface 39f, a prolonged line of the front end facet 39g and the oblique facet 39h is the cut out section 39m.

The trowel section 39d having such a cut out section 39m provides the following advantageous effect. As shown in FIG. 47(b), of the molten solder M1 that flows in the first gap Gu, molten solder M1 existing at a front end part as viewed in the moving direction F gets to the oblique facet 39h and flows along the oblique facet 39h so as to be guided to the front end facet 39h. A part of the molten solder M1 that gets to the oblique facet 39h crosses the oblique facet 39h and goes into the cut out section 39m so as to subsequently meet the molten solder M1 flowing in the second gap Gd and flow along the oblique facet 39h to be guided to the front end facet 39g. As a result, the position of the outer periphery r of the molten solder M1 that runs in the gaps Gu and Gd is restricted by the front end facet 39g and becomes invariable to consequently stabilize the width of the combined molten solder M1 after leaving the rear surface 39i. Additionally, because the flow rate of molten solder M1 increases at the front end section of the trowel section 36d, voids and other defects hardly occur at the contact interfaces of the molten solder M1 and the glass substrates to make it possible to obtain a bonding section of a desired bonding quality. As described above, the trowel section 39d of this example can supply molten solder M1 with a desired width by making the outer periphery r of the flowing molten solder M1 intersect the oblique facet 39h of the cut out section 39m after flowing through the gaps Gu and Gd and guiding it to the front end facet 39g without excessively supplying molten solder M1 to fill the outer peripheral gap of the glass substrates.

Figure 48:
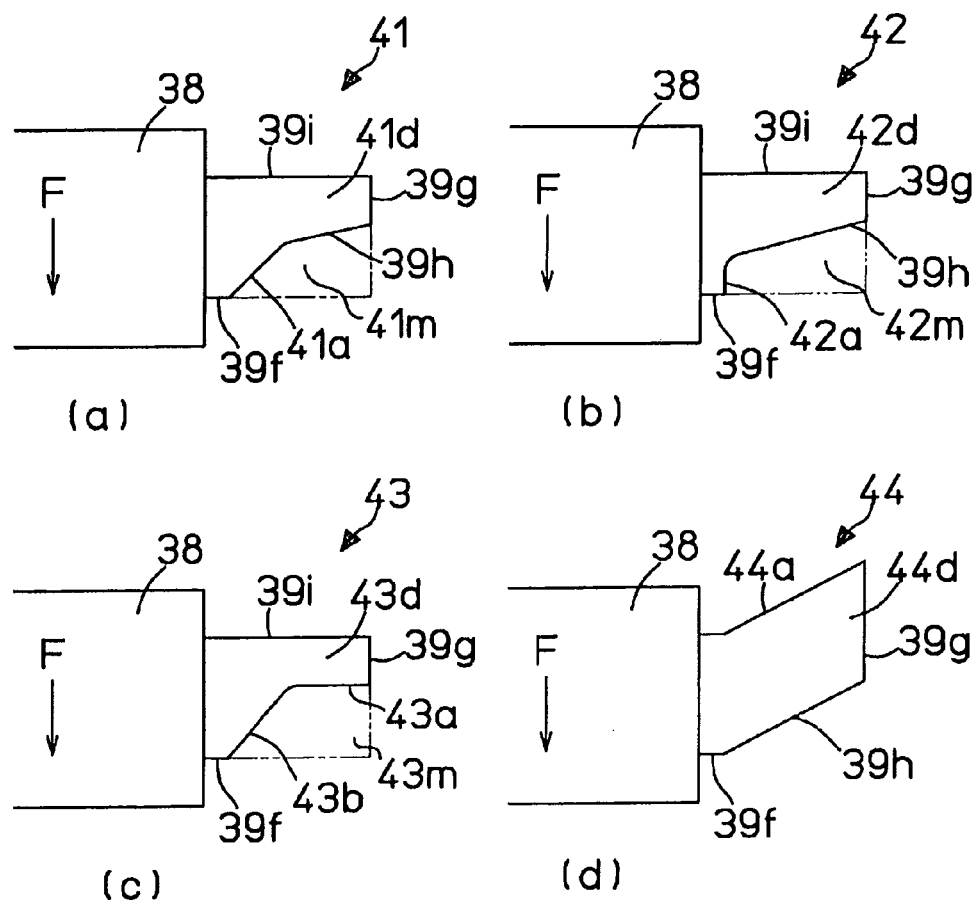
FIG. 48 is an illustration of an exemplar modified guide section of FIG. 45.
Figure 49:
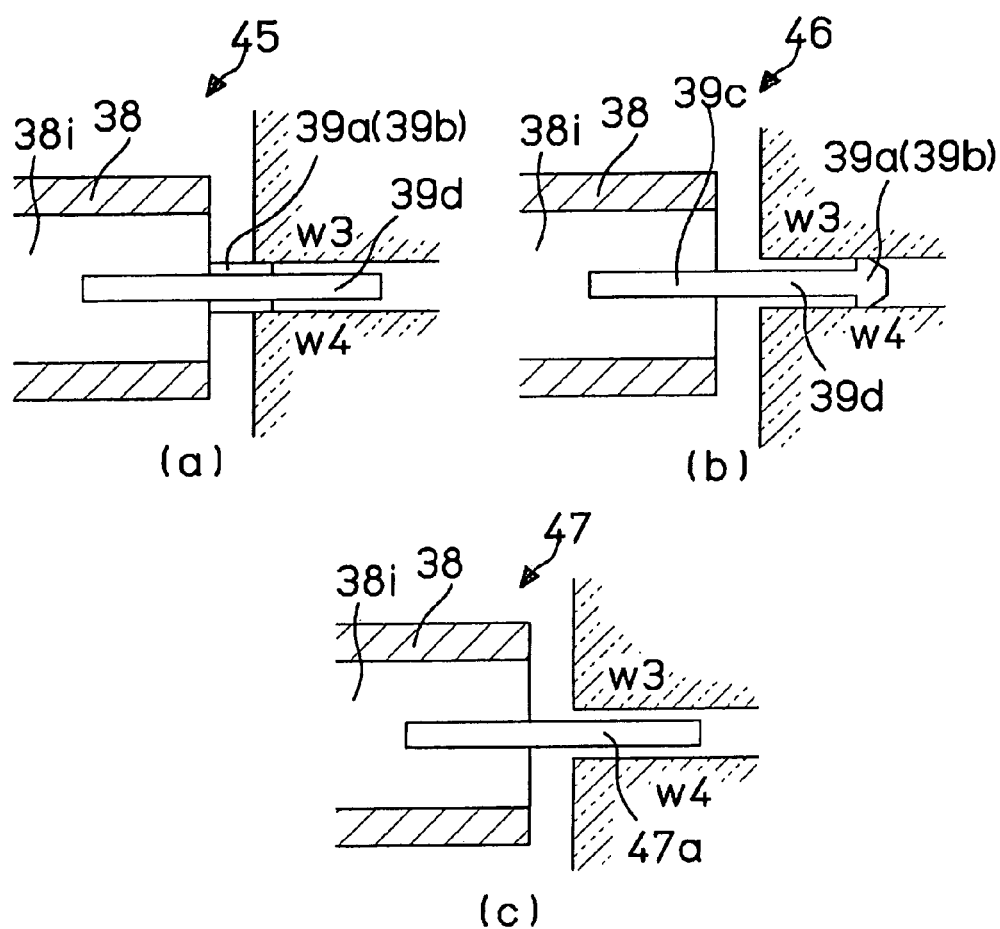
FIG. 49 is an illustration of an exemplar modified contact sections of the guide section of FIG. 45.

An exemplar modified trowel section of the above-described trowel section 39d will be described below by referring to FIG. 48. The trowel section 41d fitted into the supply cylinder 41 shown in FIG. 48(a) has a second oblique facet 41a that is formed at the base end side of the trowel section 41d and runs obliquely and backwardly as viewed in the moving direction F of the trowel section 41d in addition to the oblique facet (the first oblique facet) 39h formed at the front end of the trowel 41d as in the case of the trowel section 39d. The second oblique facet 41 is smoothly linked to the first oblique facet 39h at the corresponding ends thereof by way of an R face and a cut out section 41m is defined by a prolonged line of the front end facet 39g, a prolonged line of the front surface 39f, the first oblique facet 39h and the second oblique facet 41a.

The trowel section 42d fitted into the supply cylinder 42 shown in FIG. 48(b) has a parallel facet 42a that is formed at the base end side of the trowel section 42d and runs in parallel with the moving direction F of the trowel section 42d in addition to the oblique facet 39h formed at the front end of the trowel section 42d as in the case of the above-described trowel section 39d. The parallel facet 42a is smoothly linked to the oblique facet 39h at the corresponding ends thereof by way of an R face and a cut out section 42m is defined by a prolonged line of the end facet 39g, a prolonged line of the front surface 39f, the oblique facet 39h and the parallel facet 42a.

The trowel section 43d fitted into the supply cylinder 43 shown in FIG. 48(c) has an oblique facet 43b that is formed at the base end side of the trowel section 43d and runs obliquely and backwardly as viewed in the moving direction F of the trowel section 43d and an orthogonal facet 43a that is formed at the front end of the trowel section 43d and runs orthogonally relative to the moving direction F. The oblique facet 43b is smoothly linked to the orthogonal facet 43a at the corresponding ends thereof by way of an R face and a cut out section 43m is defined by a prolonged line of the end facet 39g, a prolonged line of the front surface 39f, the oblique facet 43b and the orthogonal facet 43a.

While the above-described cut out sections 39m, 41m, 42m and 43m are defined by facets that are expressed by straight lines in plan views, they may be replaced by facets that are expressed by curved lines in plan views or combinations of straight facets and curved facets. The front end of the trowel section may not necessarily have a certain length and may alternatively have a profile showing a pointed front end. Furthermore, the angle and the profile of each of the oblique facets may be appropriately determined as a function of the supply rate of molten solder, the flow speed of molten solder at the entrances of the gap between the glass substrates and the trowel section, the friction coefficient of the glass substrates and the trowel section, the wettability of the glass substrates and the trowel section relative to molten solder, the moving speed of the trowel section and other molten solder supply conditions. Additionally, the rear surface 44a may be formed so as to be substantially parallel to the oblique facet 39h as in the case of the trowel section 44d fitted to the supply cylinder 44 shown in FIG. 48(d). The length of the trowel section 44d along the moving direction F of the trowel section 44d can be made to be substantially constant from the base end to the front end facet 39g so as to make the effect of applying molten solder M1 to the main surfaces of the glass substrates uniform in the direction (transversal direction) orthogonal relative to the moving direction F.

Now, the contact sections 39b will be described below. As shown in FIGS. 45 and 46, the vertical position of the trowel section 39d in the outer peripheral gap k is determined as the guide section 39 is inserted into the outer peripheral gap k so as to make the contact sections 39b to be fitted to the outer peripheral gap k. More specifically, the first gap Gu between the top surface of the trowel section 39d and the glass substrate w3 and the second gap Gd between the bottom surface of the trowel section 39d and the glass substrate w4 can be held to respective constant values. Preferably, the contact sections 39b are subjected to a surface treatment, for example, an Ni water-repellent plating process in order to improve their sliding performance relative to the main surfaces of glass substrates w3 and w4. Note that the plate-shaped body 39c that operates as trowel section 39d and the projecting bodies 39a that operate as contact sections 39b may be formed as an integral structure or they may be separately formed and bonded or otherwise assembled together by securing them to each other by way of a bonding or laminating process. In the case of an assembled structure, appropriate materials can be selected and combined to meet the functional requirements of the plate-shaped body 39c and the projecting bodies 39a. For example, glass may be selected for the plate-shaped body 39c and metal may be selected for the projecting bodies 39a. Additionally, the contact sections 39b are preferably beveled to show bevels c at the lateral edges of the surfaces thereof that form steps relative to the trowel section 39d so that they may be smoothly put into the outer peripheral gap k. The bevels c can be formed by producing straight or round slopes at the related edges by cutting, grinding or etching.

Now, the guide grooves formed in the guide section will be described below. As shown in FIG. 45(a), guide grooves 39e are formed respectively on the top surface and the bottom surface of the guide section 39 at the base end thereof and the left and right projecting bodies 39a provide the lateral surfaces of the guide grooves 39e. Since the guide grooves 39e communicate with the flow path 38i by way of the discharge port 38h, the molten solder M1 that flows through the flow path 38i and is discharged from the discharge port 38h then flows into the trowel section 39d by way of the guide grooves 39e. The widths, the depths and the profiles of the guide grooves 39e may be determined appropriately according to the fluidity of molten solder M1. For example, guide grooves may be formed by cutting the top surface and the bottom surface of the plate-shaped body 39c down to the oblique facet 39h as shown in FIG. 45(b).

The supply cylinder 38 supplies molten solder M1 from the first opening 38g formed on one of the surfaces, or the surface 38k, and discharges the molten solder M1 from the discharge port 38h formed on the other surface, or the surface 38l. Molten solder M1 is supplied to the first opening 38g by, for example, supplying thread solder M to the first opening 38g at a predetermined rate and melting the thread solder M in the supply cylinder 38. In this way, molten solder M1 is supplied at a controlled flow rate that is determined according to the quantity of molten solder M1 to be filled into the outer peripheral gap k of the glass substrates w3 and w4.

As shown in FIG. 44, the supply cylinder 24 includes a flow path 38i through which Molten solder M1 produced by melting thread solder M as described above flows, a melting surface 38k at which the first opening 38g of the flow path 38i is formed and which melts thread solder M and a discharge surface 38l at which the discharge port 38h is formed and a heater 38j for melting thread solder M is wound around the outer peripheral surface thereof. The supply cylinder 38 having such a configuration can feed out thread solder M at a rate that is controlled so as make its lower end facet contact the melting surface 38k in an attitude of closing the first opening 38g and presses the thread solder M against the melting surface 38k to melt it. Then, the molten solder M1 flows through the flow path 38i and is continuously discharged from the discharge port 38h.

The melting surface 38k where the first opening 38g is formed is the bottom surface of a recessed section produced by, for example, spot facing a corresponding part of the surface of the supply cylinder 38. The diameter øB of the first opening 38g is less than the diameter øA of the end facet of the thread solder M that contacts the melting surface 38k and the flow path 38i is formed as a tubular path having a diameter øB at least at and near the melting surface 38k. As a result, if oxides E are formed on the outer peripheral surface of the thread solder M, the oxides E trying to flow into the flow path 38i is blocked by the outer peripheral edge of the first opening 38g, or the melting surface 38k, and only clean molten solder M1 that is substantially not mixed with oxides E flows into the flow path 38i. Since the thickness of the layer of oxides E produced on the surface of the thread solder M that is stored in the atmosphere is normally about tens of several μm, it is sufficient for the difference between the diameter of the thread solder M and the diameter of the first opening 38g, of øA−øB, to be about 1 mm.

Preferably, a peripheral wall 38m is formed around the outer periphery of the supply cylinder 38 so as to surround the melting surface 38k. The oxides E that are prevented from flowing into the flow path 38i are stored in the concaved bottom section of the melting surface 38k, which may well be made to flow out and collected appropriately by sucking or by cutting out a part of the peripheral wall 38m. A terminal section of the flow path 38i located close to the discharge surface 38l is preferably so formed as to be substantially orthogonal relative to the discharge surface 38l. Then, as a result, when the supply cylinder 38 is positioned so as to make the discharge surface 38*l* squarely face the outer peripheral end facets of the glass substrates w3 and w4 with a gap s separating them, the flow path 38*i* is held in parallel with the outer peripheral gap k at and near the discharge surface 38*l*.

Now the operation of supplying molten solder M1 of the above-described supply cylinder 38 will be described below. The supply apparatus is so arranged that, when molten solder M1 is being supplied and flowing in a steady state in the supply cylinder 38, the supply apparatus moves along the outer peripheral gap k of glass substrates w3 and w4. The steady state refers to a state where molten solder M1 is discharged from the discharge port 38*h* onto the top surface of the guide section 39 and can be injected into the outer peripheral gap k, the discharge port 38*h* being substantially filled with molten solder M1 as shown in FIG. 46. Preferably, the duration of time that is spent from the time when the supply of molten solder M1 from the first opening 38*g* starts to the time when this steady state is reached is as short as possible. For this reason, the rate of supplying molten solder M1 is controlled in such a way that the flow path 38*i* is quickly filled with molten solder M1 when the supply of molten solder M1 is started and the flow of molten solder M1 is still in an unsteady state but molten solder M1 can satisfactorily fill the outer peripheral gap k in a steady state.

When a supply cylinder 38 as described above is employed, the supplied clean molten solder M1 is then filled into the outer peripheral gap k of the glass substrates w3 and w4, while the clean molten solder M1 is only slightly brought into contact with the external atmosphere at the gap s between the discharge surface 38*l* and the corresponding end facets of the glass substrates w3 and w4 and also in the gaps Gu and Gd. Therefore, the supplied clean molten solder M1 contacts the main surfaces of the glass substrates w3 and w4 in a state where oxidation thereof is suppressed in the atmosphere. Thus, the supply apparatus of this example is suitable for using SnAgAl based alloy solder that shows an excellent bonding performance with glass by way of oxygen existing to an appropriate extent. To improve the filling performance of molten solder M1, the area of the surface of the guide section 39 that contacts molten solder M1 is preferably subjected to a process for raising its wettability relative to molten solder M1. For example, it is preferably coated with Ag, Cr, Al, Mo, W, V, Nb or Ta. Additionally, it is preferably subjected to a nitriding treatment, which is an anti-corrosion treatment, so that the surface of the guide section 39 may not be corroded by molten solder M1 and impurities may not be mixed into the molten solder M1. The surface of the flow path 38*i* is also preferably subjected to those treatments.

Now, the operation of supplying molten solder M1 to the outer peripheral gap k of the supply apparatus of this example will be described below. The glass substrates w3 and w4 that are laid one above the other with a gap maintaining member Q having a predetermined size interposed between them are placed in position on a table that contains a heat emitting body and movable in the two axial directions of the X-axis and the Y-axis and the glass substrates w3 and w4 are heated to about the melting temperature of molten solder M1. The trowel section 39*d* of the guide section 39 of the supply cylinder 38 is inserted into a predetermined position in the outer peripheral gap k of the glass substrates w3 and w4 located at or near one of the edges of each of them and the supply cylinder 38 is moved so as to produce a predetermined gap s between the corresponding end facets of the glass substrates w3 and w4 and the discharge surface 38*l*. The position of the trowel section 39*d* is adjusted in advance so that the trowel section 39*d* comes to a position at the vertical center of the outer peripheral gap k or its vicinity at this time, although it is difficult to rigorously adjust the position so as to make it agree with the center of the outer peripheral gap k. However, if the position is not adjusted satisfactorily, some of the contact sections 39*b* can hit the end facet of the glass substrate w3 or w4 if the trowel section 39*d* is successfully inserted into the outer peripheral gap k. The supply cylinder 38 is supported by a floating mechanism in terms of its vertical position and the contact sections 39*b* are beveled to show bevels c so that the contact sections 39*b* can be inserted into the outer peripheral gap k with ease. Then, as a result, the trowel section 39*d* is placed substantially at the vertical center of the outer peripheral gap k and the gap Gu and the gap Gd between the trowel section 39*d* and the glass substrates w3 and w4 become equal to each other.

Clean molten solder M1 is supplied to the flow path 38*i* and starts to be discharged from the discharge port 38*h* at a predetermined flow rate. A steady state is reached within a short period of time and the glass substrates w3 and w4 can be moved quickly in a direction (the X-direction) at a predetermined speed in order to supply molten solder M1 to one of the sides of the outer peripheral gap k. Meanwhile, molten solder M1 is injected into the gaps Gu and Gd and supplied into the outer peripheral gap k of the glass substrates w3 and w4. Since the contact sections 39*b* are fitted into the outer peripheral gap k and held in a floating state, they follow the vertical positional fluctuations of the outer peripheral gap k that can arise when the glass substrate w4 has a varying thickness and/or the table surface has vertical undulations in the X-direction, and the sizes of the gaps Gu and Gd are maintained. Then, as a result, a substantially same quantity of molten solder M1 is injected both along the top surface and along the bottom surface of the trowel section 39*d* so that the molten solder M1 that moves as the trowel section 39*d* moves shows a same flow state both in the gap Gu and in the gap Gd and hence molten solder M1 is supplied equally to the main surface of the glass substrate w3 and to the main surface of the glass substrate w4.

Besides, as ultrasonic vibrations are employed and applied to the guide section 39 during a molten solder filling operation, both the wettability of the guide section 39 and that of the glass substrates w3 and w4 relative to molten solder M1 are improved so that molten solder M1 is smoothly supplied if the gaps Gu and Gd are narrow. The ultrasonic vibrations also act on the main surfaces of the glass substrates w3 and w4 by way of molten solder M1 to remove the air bubbles and the foreign objects such as oxide film existing at the contact interfaces of molten solder M1 and the glass substrates w3 and w4. Then, the bonding performance of molten solder M1 relative to the glass substrates w3 and w4 is improved to effectively improve the bonding strength of the glass panel W.

As the operation of supplying molten solder M1 to one of the sides of the outer peripheral gap k is completed in a manner as described above, the casing 38*e* equipped with the supply cylinder 38 is driven to turn by 90° in the horizontal direction and then the glass substrates w3 and w4 are driven to move horizontally in the direction of a side thereof that is orthogonal to the above-described side. Then, molten solder M1 is supplied into the outer peripheral gap k at this side as in the case of the above-described side. This operation is repeated sequentially at each of the sides and molten solder M1 is supplied to all the sides of the outer peripheral gap k of the glass substrates w3 and w4. As the operation of supplying molten solder M1 to the glass substrates w3 and w4 is completed, the table on which the glass substrates w3 and w4 are placed is moved to the outside. The glass substrates w3 and w4 are then removed from the table that is moved to the outside but no molten solder M1 is adhering to the table so that no operation is required to remove solder from the table.

Subsequently, another table on which another pair of glass substrates w3 and w4 are placed and heated for preparation is brought in and another operation of supplying molten solder M1 same as the above-described operation is started to the outer peripheral gap k of the new glass substrates w3 and w4. Note, however, that the vertical position of the outer peripheral gap k of the new glass substrates w3 and w4 can be different from the position of the outer peripheral gap k of the former glass substrates due to the difference of thickness between the new and old glass substrates w4 and/or the difference of state where glass substrates w3 and w4 are fitted to the table. If such is the case, the supply apparatus of this example can insert the trowel section 39d into the vertical center position of the outer peripheral gap k and fill the outer peripheral gap k with molten solder M1 in a state where the size of the gaps Gu and Gd is maintained because the supply cylinder 38 is vertically supported by a floating mechanism and the contact sections 39b are provided with bevels c.

When the guide section 39 moves along the outer peripheral gap k, molten solder M1 permeates between the contact sections 39b and the main surfaces of the glass substrates w3 and w4 due to the capillary phenomenon. After the contact sections 39b contact and pass the respective main surfaces, molten solder M1 flows from the trowel section 39d and supplied to the contact regions of the contact sections 39b as it is drawn by the molten solder M1 that permeates. Molten solder M1 may not be supplied to all the contact regions of the contact sections if the length of the contact sections 39b is large so that the length of the contact sections 39b is preferably small and suitably about 10 to 20% of the width of the bonding section n. The top and bottom surfaces of the contact sections 39b may not necessarily be planes as shown in FIG. 45 but may alternatively be planes where grooves are formed or curved surfaces.

In the supply apparatus of Example No. 5, projecting bodies 39a are provided in the guide section 39 so as to operate as contact sections 39b and inserted into the supply cylinder 38 in order to maintain the gaps Gu and Gd between the trowel section 39d and the glass substrates w3 and w4 to respective constant values. However, as shown in FIG. 49(a), projecting bodies 39a may alternatively be formed only to a small distance from the corresponding end facet of the supply cylinder 45 so as to operate as contact sections 39b instead of the above-described projecting bodies 39a that are inserted into the supply cylinder 45. Still alternatively, projecting bodies 39a may be formed at a front end part of the plate-shaped body 39c so as to operate as contact sections 39b as shown in FIG. 49(b). Still alternatively, only a plate-shaped body 47a having a same thickness like the supply cylinder 47 as shown in FIG. 49(c) may be used without any projecting bodies. Such an arrangement can find applications where small size glass substrates having a side of several to tens of several centimeters and scarcely showing variances of thickness are employed with a glass substrate moving mechanism that vibrates minimally when guiding glass substrates and the gaps involved in the supply apparatus fluctuate only to a negligible extent. In such a case, a supply apparatus may not necessarily require a floating mechanism for supporting the supply cylinder.

Additionally, it is only necessary for the guide section 39 to be fitted to the supply cylinder so as to cross the discharge port 38h. In other words, the guide section 39 may not necessarily be fitted substantially at the vertical center and its fitting position may alternatively be displaced upwardly or downwardly. When the guide section 39 is displaced downwardly, for example, the leakage quantity of molten solder flowing down from the gap between the discharge surface of the supply cylinder and the glass substrates by gravity can be reduced, and the guide section is attached to the position where the molten solder from the discharge port does not leak from the lower side of the guide section. In such a case, the guide section is preferably provided with an appropriate through hole or a through groove so that molten solder may flow from the top surface side to the bottom surface side thereof.

| Explanation of Reference Symbols | |
|---|---|
| 2, 8, 11: | molten solder supply apparatus |
| 2a, 11d: | thread solder supply means |
| 3, 9: | heating/melting means |
| 3a, 9a, 10, 14, 17, 24, 23, 26a, 26c, 26e, 27, 32, 32b, 33, 34, 35, 38: | supply cylinder |
| 4, 4a, 4d, 4f, 10i: | oxide removing section |
| 2e, 8a: | moving means |
| 8d: | holding means |
| 11a: | placing means |
| 12: | molten solder supply means |
| 13, 22: | molten solder supply section |
| 15: | support section |
| 16, 18, 19, 20, 21, 22a, 22e, 22h, 22j, 25, 28, 39: | guide section |
| M1, n1, n2: | molten solder |
| W: | glass panel |
| w1, w2, w3, w4: | glass substrate |
| S, S1, S2: | main surface of glass substrate |
| k: | outer peripheral gap |
| n, m: | bonding section |

The invention claimed is:

1. A molten metal supply method of supplying molten metal by means of a molten metal supply cylinder for melting a wire-shaped low melting point metallic material in a solid phase and supplying the molten metal material,
  the molten metal supply cylinder comprising:
    a melting section to be directly or indirectly brought into contact with a wire-shaped low melting point metallic material to produce molten metal; and
    a substantially tubular flow path that has a first opening formed at an end thereof in the melting section and a second opening at the other end thereof and allows the molten metal produced in the melting section to flow from the first opening to the second opening, wherein
    a diameter of the first opening is less than a diameter of the wire-shaped low melting point metallic material, and
    an oxide on the surface of the wire-shaped low melting point metallic material is removed at an outer peripheral edge of the first opening on condition that the wire-shaped low melting point metallic material is molten,
  the molten metal supply method comprising:
    a plate-shaped body arranging step of arranging a pair of plate-shaped bodies in a state of producing a predetermined gap between them,
    a supply cylinder positioning step of positioning the supply cylinder in a state where the second opening and the gap are substantially connected to each other, and
    a molten metal supply step of supplying molten metal to the gap by way of the second opening.

2. A molten metal supply method of supplying molten metal by means of a molten metal supply cylinder for melting a wire-shaped low melting point metallic material in a solid phase and supplying the molten metal material,
the molten metal supply cylinder comprising:
a melting section to be directly or indirectly brought into contact with a wire-shaped low melting point metallic material to produce molten metal; and
a substantially tubular flow path that has a first opening formed at an end thereof in the melting section and a second opening at the other end thereof and allows the molten metal produced in the melting section to flow from the first opening to the second opening, wherein
a diameter of the first opening is less than a diameter of the wire-shaped low melting point metallic material, and
an oxide on the surface of the wire-shaped low melting point metallic material is removed at an outer peripheral edge of the first opening on condition that the wire-shaped low melting point metallic material is molten,
the molten metal supply method comprising:
a plate-shaped body arranging step of arranging a pair of plate-shaped bodies in a state of producing a predetermined gap between them,
a supply cylinder positioning step of inserting a guide section into the gap formed between the pair of plate-shaped bodies, and
a molten metal supply step of supplying molten metal into the gap by way of the second opening.

3. A molten metal supply method of supplying molten metal by means of a molten metal supply cylinder for melting a wire-shaped low melting point metallic material in a solid phase and supplying the molten metal material,
the molten metal supply cylinder comprising:
a melting section to be directly or indirectly brought into contact with a wire-shaped low melting point metallic material to produce molten metal;
a substantially tubular flow path that has a first opening formed at an end thereof in the melting section and a second opening at the other end thereof and allows the molten metal produced in the melting section to flow from the first opening to the second opening; and
a guide section that guides the molten metal produced from the melting section and discharged from the second opening,
wherein a diameter of the first opening is less than a diameter of the wire-shaped low melting point metallic material, and
wherein an oxide on the surface of the wire-shaped low melting point metallic material is removed at an outer peripheral edge of the first opening on condition that the wire-shaped low melting point metallic material is molten,
the molten metal supply method comprising:
a plate-shaped body arranging step of arranging a pair of plate-shaped bodies in a state of producing a predetermined gap between them,
a supply cylinder positioning step of inserting the guide section into the gap formed between the pair of plate-shaped bodies, and
a molten metal supply step of supplying molten metal into the gap by way of the second opening.

* * * * *